United States Patent
Sun et al.

(10) Patent No.: US 11,359,038 B2
(45) Date of Patent: Jun. 14, 2022

(54) CAPPED MULTI- OR DUAL-HEADED COMPOSITIONS USEFUL FOR CHAIN SHUTTLING AND PROCESS TO PREPARE THE SAME

(71) Applicant: Dow Global Technologies LLC, Midland, MI (US)

(72) Inventors: Lixin Sun, Sugar Land, TX (US); Zhe Zhou, Lake Jackson, TX (US); Edmund M. Carnahan, Pearland, TX (US); Kim L. Walton, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 367 days.

(21) Appl. No.: 16/338,164

(22) PCT Filed: Sep. 29, 2017

(86) PCT No.: PCT/US2017/054443
§ 371 (c)(1),
(2) Date: Mar. 29, 2019

(87) PCT Pub. No.: WO2018/064546
PCT Pub. Date: Apr. 5, 2018

(65) Prior Publication Data
US 2020/0024380 A1 Jan. 23, 2020

Related U.S. Application Data

(60) Provisional application No. 62/402,006, filed on Sep. 30, 2016.

(51) Int. Cl.
*C08F 4/50* (2006.01)
*C08F 210/02* (2006.01)
(Continued)

(52) U.S. Cl.
CPC ........ *C08F 210/02* (2013.01); *C08F 4/65908* (2013.01); *C08F 4/50* (2013.01);
(Continued)

(58) Field of Classification Search
None
See application file for complete search history.

(56) References Cited

U.S. PATENT DOCUMENTS 4,543,399 A 9/1985 Jenkins, III et al.
4,588,790 A 5/1986 Jenkins, III et al.
(Continued)

FOREIGN PATENT DOCUMENTS

EP 2450361 A1 5/2012
EP 2459598 A2 6/2012
(Continued)

OTHER PUBLICATIONS

Freijee, F. Et. Al, "The Synthesis and Structure of Zincacyclopentane, Zincacyclohexane and Zincacycloheptane". Journal of Organometallic Chem. 224, 217-221,1982.
(Continued)

*Primary Examiner* — Richard A Huhn
(74) *Attorney, Agent, or Firm* — Cheney Huang

(57) ABSTRACT

The present disclosure relates to a capped, multi- or dual-headed chain composition comprising derivatives of a strained olefin. The present disclosure further relates to a process for synthesizing the capped, multi- or dual-headed composition by using an organometallic compound and a co-catalyst in the presence of a catalyst precursor and a strained olefin. The present disclosure further relates to use of the compositions, as well as the process to make the same, in olefin polymerization.

20 Claims, 19 Drawing Sheets

(51) Int. Cl.
*C08F 4/659* (2006.01)
*C08F 4/64* (2006.01)
*C08F 4/642* (2006.01)

(52) U.S. Cl.
CPC .............. *C08F 4/64* (2013.01); *C08F 4/6425* (2013.01); *C08F 4/6426* (2013.01); *C08F 4/65912* (2013.01); *C08F 2410/01* (2013.01)

(56) References Cited

U.S. PATENT DOCUMENTS

| | | | |
|---|---|---|---|
| 5,028,670 | A | 7/1991 | Chinh et al. |
| 5,352,749 | A | 10/1994 | DeChellis et al. |
| 5,382,638 | A | 1/1995 | Bontemps et al. |
| 5,436,304 | A | 7/1995 | Griffin et al. |
| 5,453,471 | A | 9/1995 | Bernier et al. |
| 5,463,999 | A | 11/1995 | Taruya et al. |
| 6,827,976 | B2 | 12/2004 | Derflinger et al. |
| 7,858,706 | B2 | 12/2010 | Arriola et al. |
| 8,501,885 | B2 | 8/2013 | Arriola et al. |
| 8,791,284 | B2 | 7/2014 | Ochiai et al. |
| 10,167,360 | B2 | 1/2019 | Martinez et al. |
| 2004/0010103 | A1 | 1/2004 | Boussie et al. |
| 2019/0225719 | A1 | 7/2019 | Sun et al. |

FOREIGN PATENT DOCUMENTS

| | | |
|---|---|---|
| JP | 2003286321 A | 10/2003 |
| WO | 9507942 A1 | 3/1995 |
| WO | 2005/090427 A2 | 9/2005 |
| WO | 2011/002000 A1 | 1/2011 |
| WO | 2011014533 A1 | 2/2011 |
| WO | 2017/058910 A1 | 4/2017 |
| WO | 2018/064540 A1 | 4/2018 |

OTHER PUBLICATIONS

Bhanu Prasad, A. S. "The preparation of 1,3-dizincapropanes via a boron-zinc transmetallation". Journal of Organometallic Chemistry, 562, 133-139, 1998.

Makio, H. Et. Al. "Synthesis of Telechelic Olefin Polymers via Catalyzed Chain Growth on Multinuclear Alkylene Zinc Compounds" American Chemical Society, 135, 8177?8180, 2013.

Barrett A. G. M., Et. Al. "Bidirectional asymmetric allylboration and the synthesis of C2 symmetric 3-methylenepentane-1,5-diols" Chemical Communications, 1999, p. 459-460.

PCT/US2017/054443, International Search Report and Written Opinion dated Dec. 8, 2017.

PCT/US2017/054443, International Preliminary Report on Patentability dated Apr. 2, 2019.

Barrett, Anthony G. M. et al., Bidirectional Asymmetric Allylboration. A Convenient Asymmetric Synthesis of C2-Symmetric-Methylenepentane-1,5-diols and Rapid Access to C2-Symmetric Spiroketals, Journal of Organic Chemistry, 2000, V 65, N 2, p. 375-380.

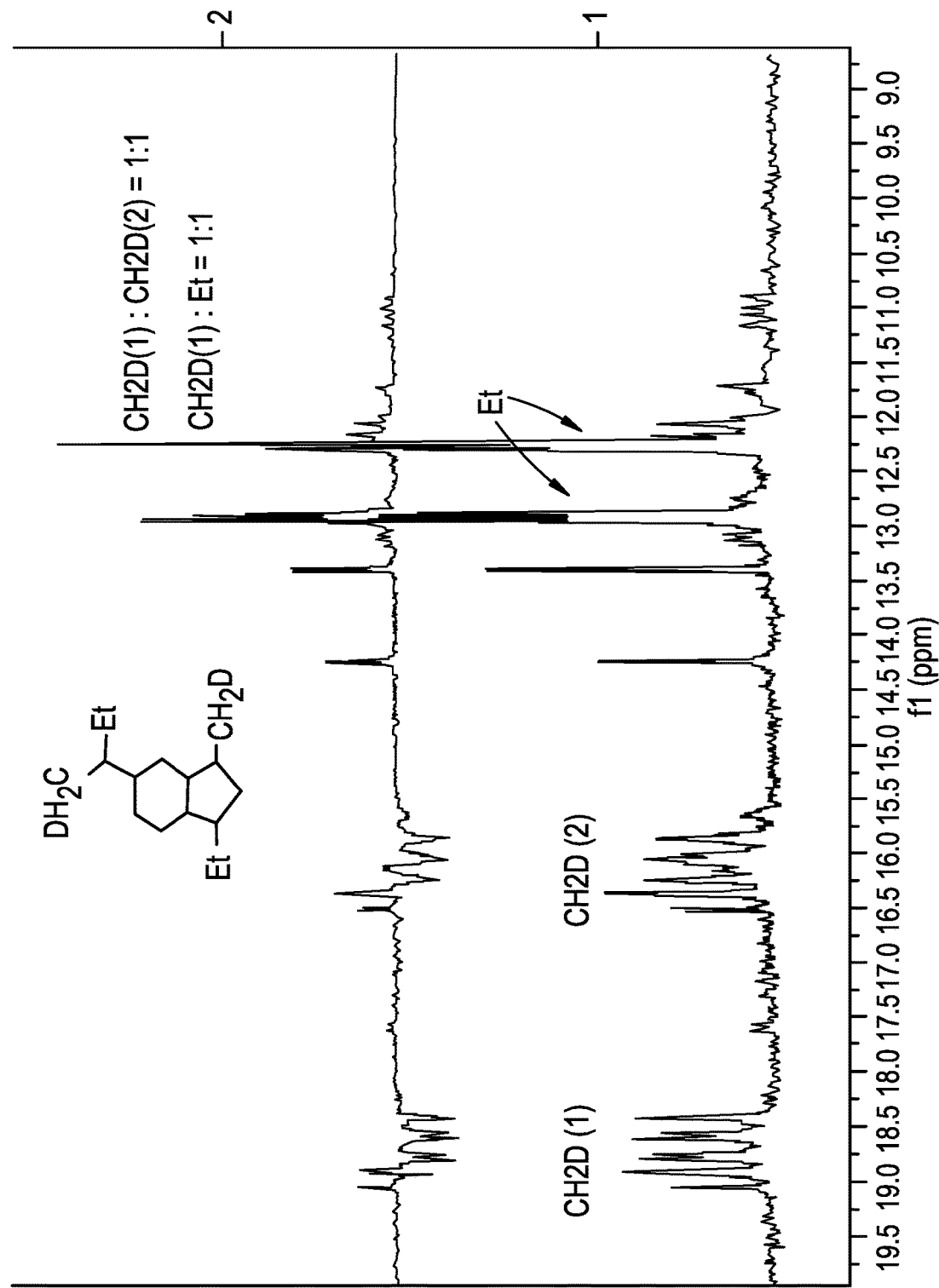

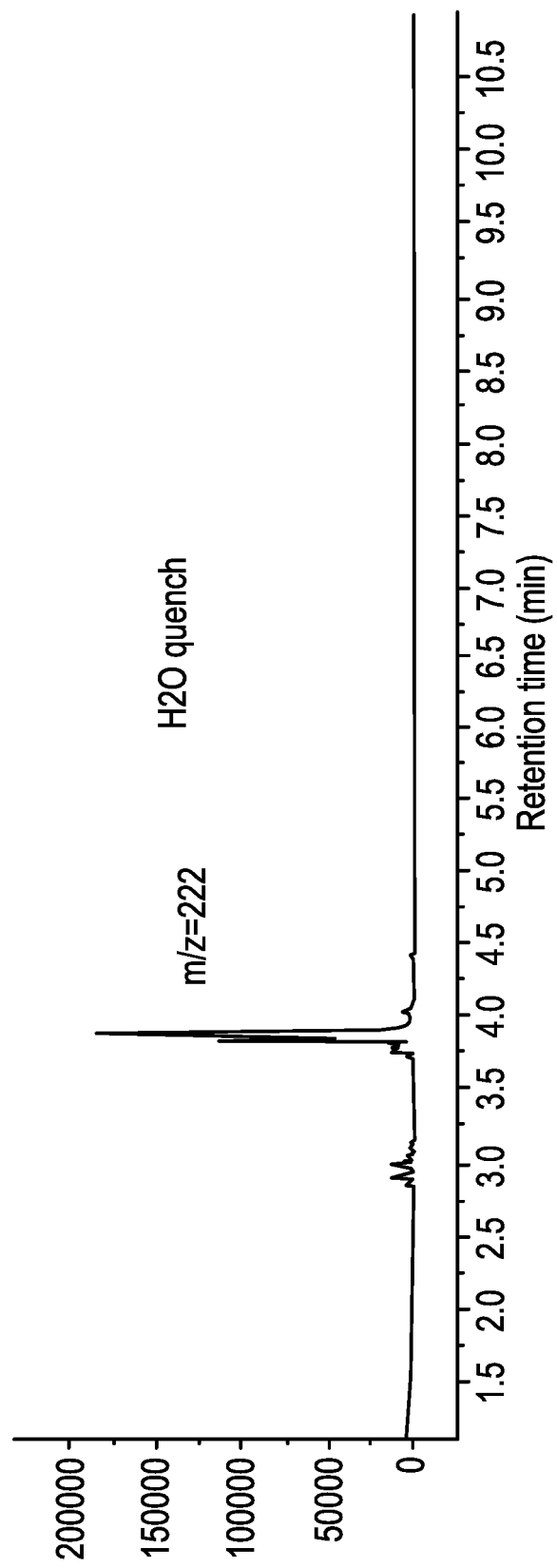

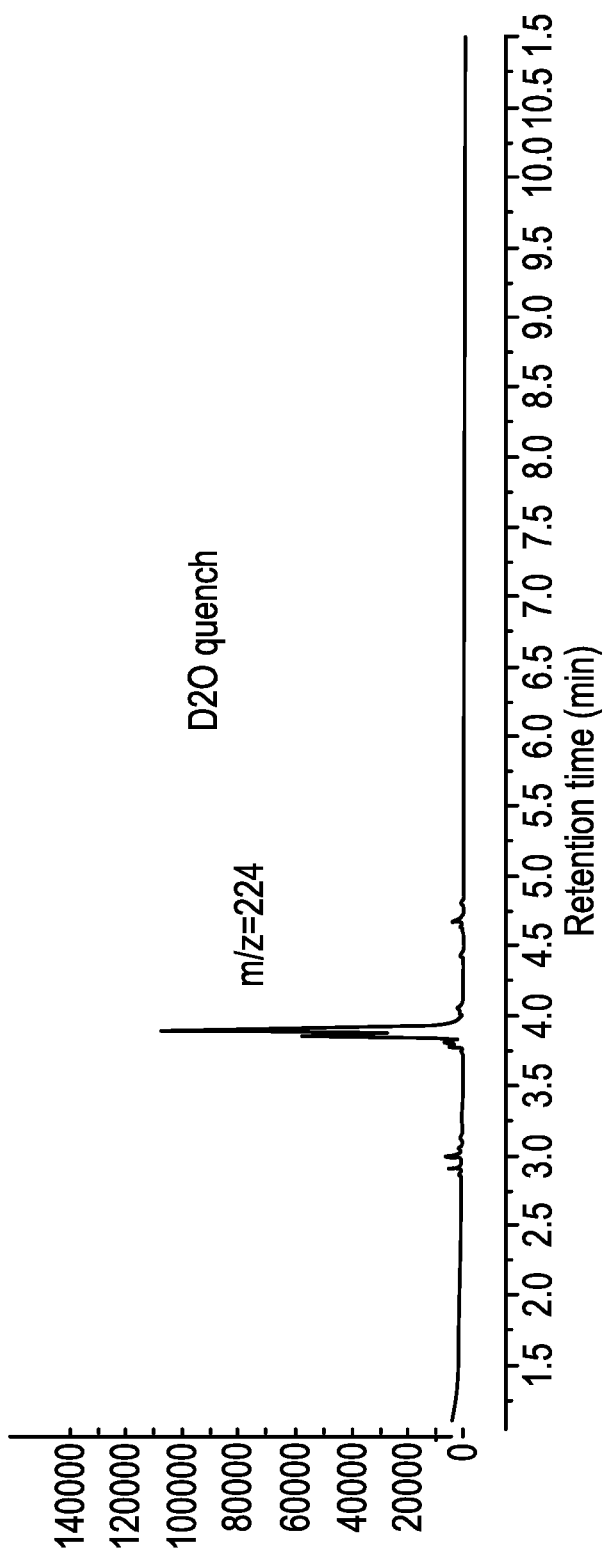

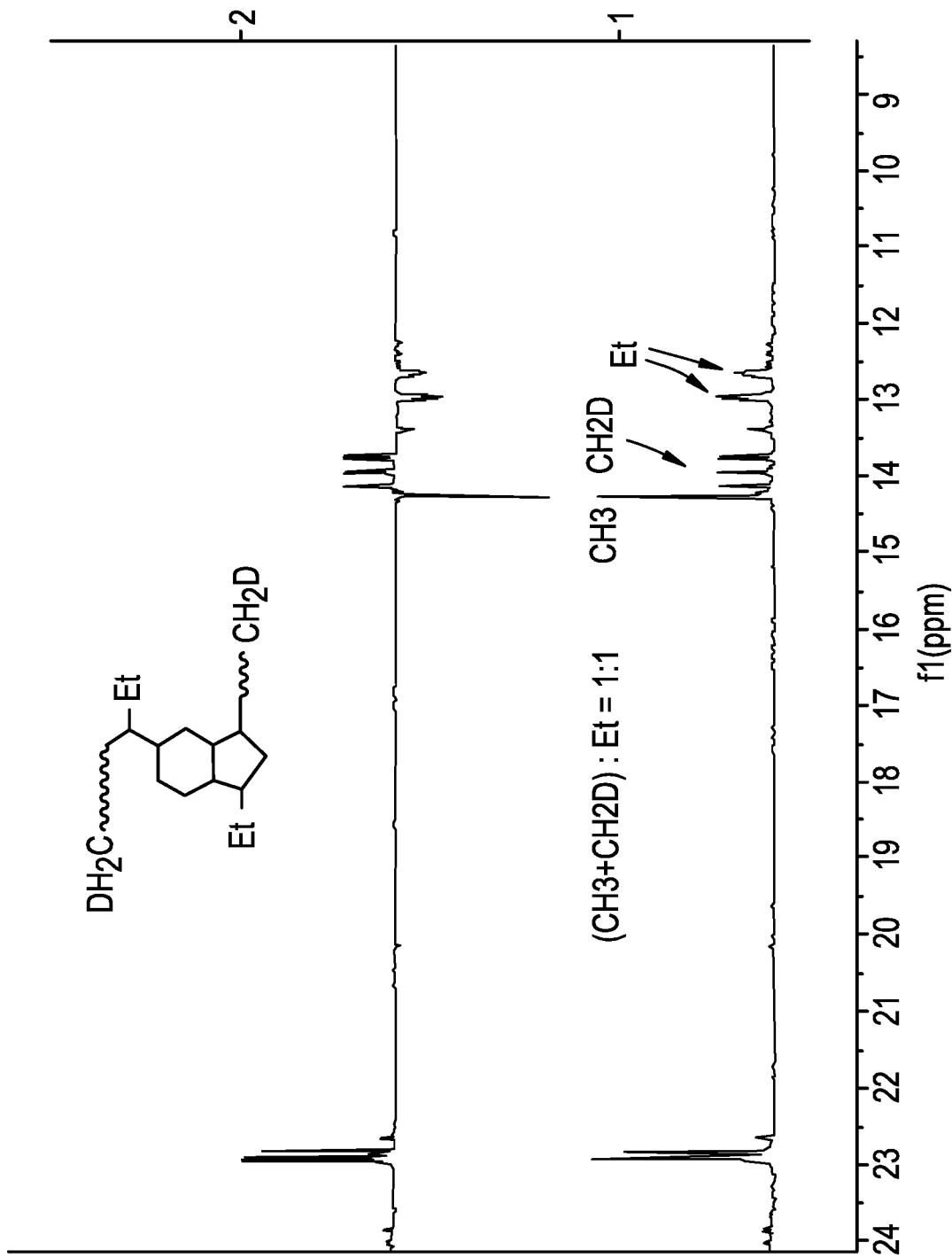

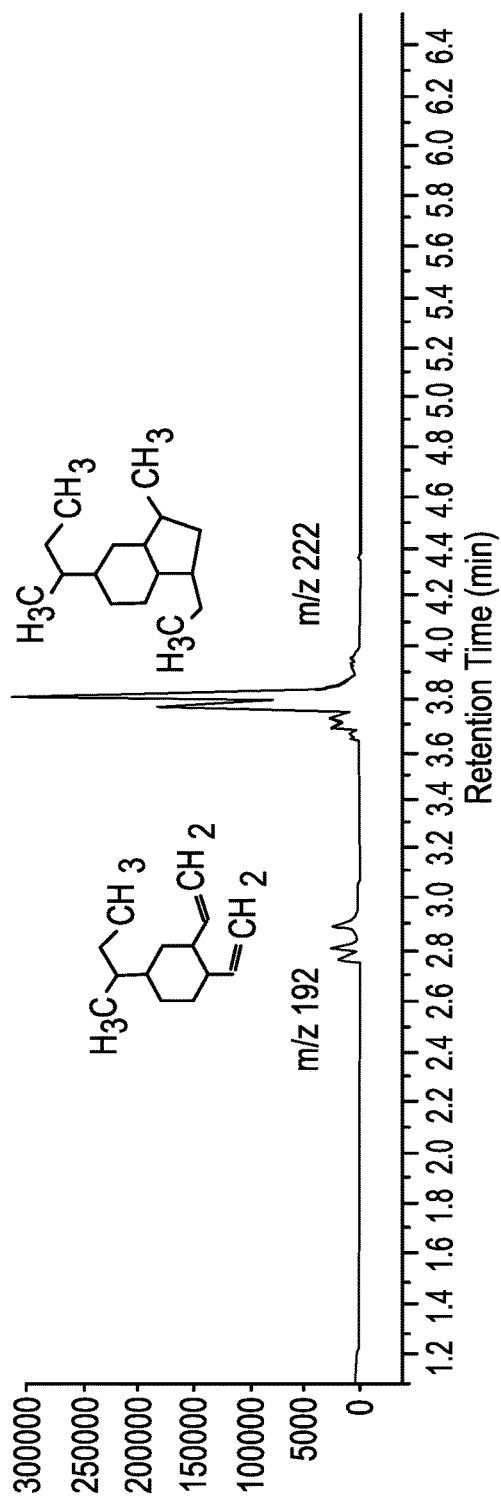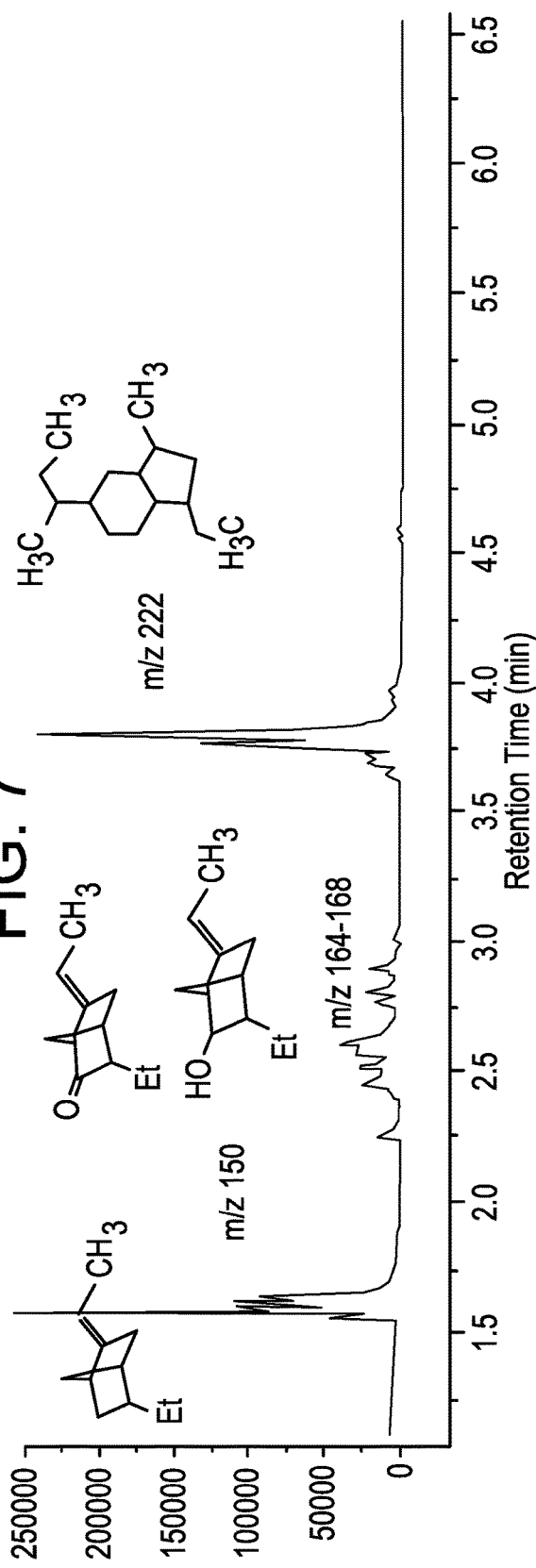

TGIG Curves

CAPPED MULTI- OR DUAL-HEADED COMPOSITIONS USEFUL FOR CHAIN SHUTTLING AND PROCESS TO PREPARE THE SAME

FIELD

Embodiments relate to capped multi- or dual-headed compositions useful for chain shuttling and a process to prepare the same. In one aspect, the capped compositions can be used in olefin polymerization.

INTRODUCTION

The properties and applications of polyolefins depend to varying degrees upon the specific features of the catalysts used in their preparation. Specific catalyst compositions, activation conditions, steric and electronic features, and the like all can factor into the characteristics of the resulting polymer product. Indeed, a multitude of polymer features, such as co-monomer incorporation, molecular weight, polydispersity, and long-chain branching, and the related physical properties, such as density, modulus, melt properties, tensile features, and optical properties, can all be affected by catalyst design.

In recent years, advances in polymer design have been seen with the use of compositions useful for chain shuttling. Such compositions have reversible chain transfer ability which can exchange a growing polymer chain between different catalytic sites such that portions of a single polymer molecule are synthesized by at least two different catalysts. These compositions also can extend the lifetime of a growing polymer chain such that sections of the polymer chain can be made in more than one zone or reactor under different process conditions. Currently, the best known compositions useful for chain shuttling are simple metal alkyls that typically contain only a single point of attachment to the metal for each polymer chain, such as diethyl zinc which produces polymer chains terminated with zinc metal at one end. More sophisticated compositions useful for chain shuttling, such as multi- or dual-headed chain shuttling agents (CSAs), with the alkane moiety attached to two metals, are also known. Indeed, multi- or dual-headed CSAs are of great interest since they can enable the production of new polyolefins, such as telechelic functional polymers. However, significant challenges exist for use of multi- or dual-headed CSAs to produce high purity telechelic polymer chains in reactors.

SUMMARY

In certain embodiments, the present disclosure relates to a composition having the formula (I):

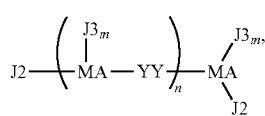

(I)

or an aggregate thereof, a Lewis base containing derivative thereof, or any combination thereof, wherein:
each MA independently is Al, B, Ga, Zn, or Mg;
when MA is Al, B, or Ga, then m is 1;
when MA is Zn or Mg, then m is 0;
n is a number from 1 to 100;
YY is a derivative of a linking group, wherein the linking group is a $C_{4-100}$ hydrocarbon comprising at least two vinyl groups and optionally includes at least one heteroatom; and
each J2 and J3 is a derivative of a strained olefin.

In certain embodiments, the present disclosure relates to a process for preparing the composition having the formula (I) comprising: (a) combining a linking group, an organometallic compound, a co-catalyst, a solvent, a first catalyst precursor, and a strained olefin, and (b) obtaining a final solution comprising the composition having the formula (I), wherein the linking group is a $C_{4-100}$ hydrocarbon comprising at least two vinyl groups and optionally includes at least one heteroatom.

In certain embodiments, the present disclosure relates to a polymerization process for preparing a polymer composition, the process comprising: contacting at least one olefin monomer with a catalyst composition, wherein the catalyst composition comprises the reaction product of a second catalyst precursor, a co-catalyst, and the composition having the formula (I).

In certain embodiments, the present disclosure relates to a polymerization process for preparing a polymer composition, the process comprising: contacting at least one olefin monomer with a catalyst composition; wherein the catalyst composition comprises the reaction product of a second catalyst precursor, a co-catalyst, and the composition having the formula (I), and wherein the second catalyst precursor may be the same compound as the first catalyst precursor used for preparing the composition having the formula (I).

In certain embodiments, the present disclosure relates to a catalyst composition comprising the reaction product of at least one catalyst precursor, at least one co-catalyst, and the composition having the formula (I).

BRIEF DESCRIPTION OF THE DRAWINGS

FIG. 2 provides the $^{13}$C NMR spectra of the composition of the Reference Example.

FIGS. 3A and 3B provide the GCMS of the composition of the Reference Example.

FIG. 4 provides the $^{13}$C NMR spectra of deuterium labeled polyethylene polymerized in the presence of the composition of the Reference Example.

FIGS. 6 and 7 provide the GCMS of the composition of Working Example 1.

DETAILED DESCRIPTION

Figure 1:
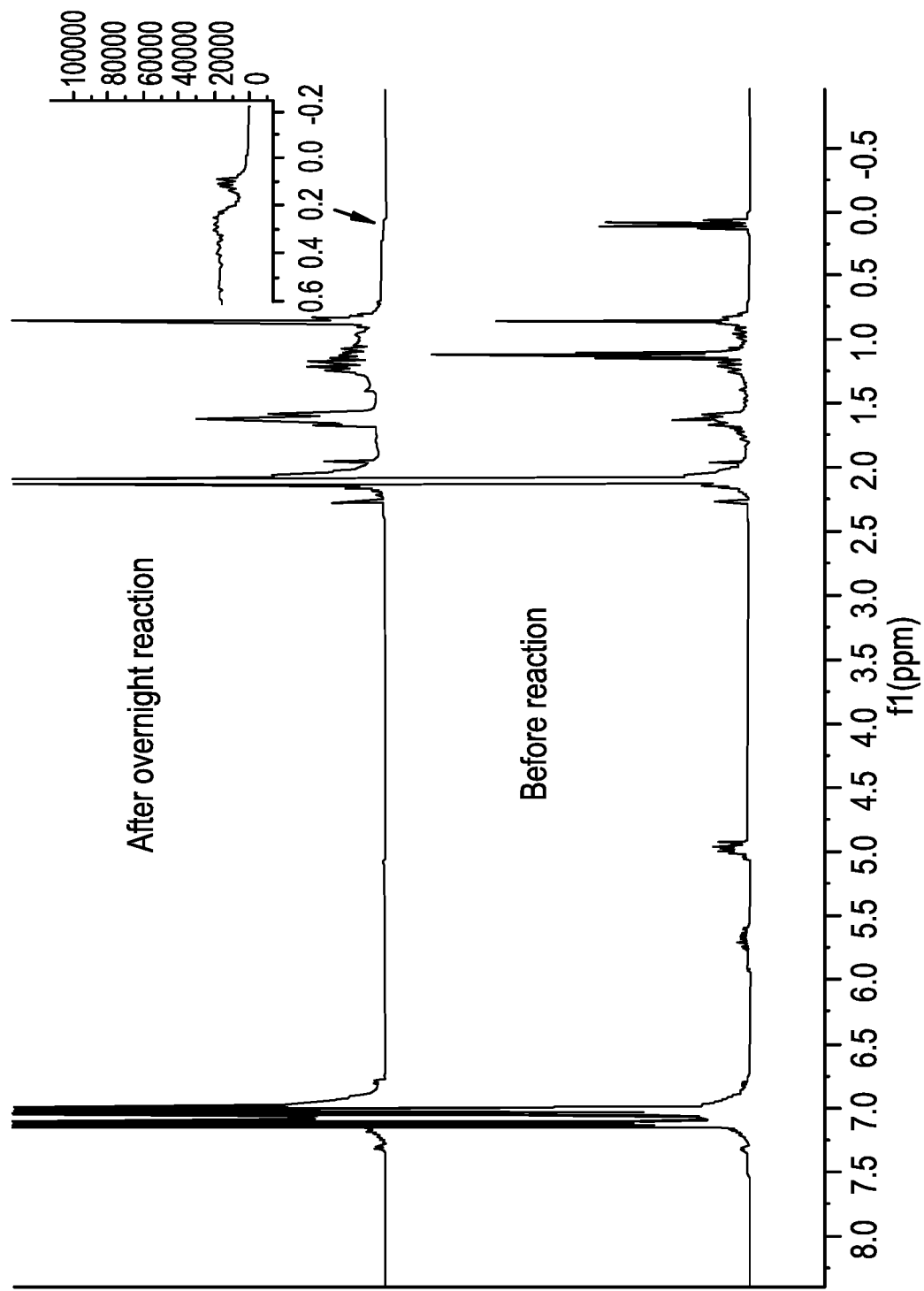
FIG. 1 provides the $^1$H NMR spectra of the composition of the Reference Example.

Embodiments of the present disclosure relate to a capped multi- or dual-headed composition (i.e., the composition having the formula (I)) as well as a process to prepare the same. In certain embodiments, the composition having the formula (I) may be a multi- or dual-headed chain shuttling agent. In further embodiments, the composition having the formula (I) may be a multi- or dual-headed chain transfer agent. In certain embodiments, the composition having the formula (I) may be capable of producing a telechelic functional polymer.

Definitions

All references to the Periodic Table of the Elements refer to the Periodic Table of the Elements published and copyrighted by CRC Press, Inc., 1990. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference in its entirety), especially with respect to the disclosure of synthetic techniques, product and processing designs, polymers, catalysts, definitions (to the extent not inconsistent with any definitions specifically provided in this disclosure), and general knowledge in the art.

Number ranges in this disclosure and as they relate to the composition having the formula (I) are approximate, and thus may include values outside of the range unless otherwise indicated. Number ranges include all values from and including the lower and the upper values, including fractional numbers or decimals.

In the event the name of a compound herein does not conform to the structural representation thereof, the structural representation shall control.

With reference to the composition having the formula (I), as one of ordinary skill in the art would understand, when MA, at each occurrence, is Al, B, or Ga, then m is 1 and J3 is included in the composition having the formula (I). Likewise, when MA, at each occurrence, is Zn or Mg, then m is 0 and J3 is excluded from the composition having the formula (I).

In certain embodiments, each of J1, J2, and J3 may be a hydrocarbyl group. Examples of the hydrocarbyl group include $C_{1-20}$ alkyl groups (branched or unbranched), aryl groups, and aryl alkyl groups. Specific examples of the hydrocarbyl group include but are not limited to methyl, ethyl, n-propyl, n-butyl, isobutyl, n-hexyl, isohexyl, n-octyl, isooctyl, or isomers thereof. In certain embodiments, the hydrocarbyl group may be a substituted hydrocarbyl group with at least one substituent containing a heteroatom. Heteroatom as used herein includes all atoms with the exception of hydrogen and carbon.

The terms "chain shuttling agent" and "chain transfer agent" refer to those known to one of ordinary skill in the art. Specifically, the term "shuttling agent" or "chain shuttling agent" refers to a compound or mixture of compounds that is capable of causing polymeryl transfer between various active catalyst sites under conditions of polymerization. That is, transfer of a polymer fragment occurs both to and from an active catalyst site in a facile and reversible manner. In contrast to a shuttling agent or chain shuttling agent, an agent that acts merely as a "chain transfer agent," such as some main-group alkyl compounds, may exchange, for example, an alkyl group on the chain transfer agent with the growing polymer chain on the catalyst, which generally results in termination of the polymer chain growth. In this event, the main-group center may act as a repository for a dead polymer chain, rather than engaging in reversible transfer with a catalyst site in the manner in which a chain shuttling agent does. Desirably, the intermediate formed between the chain shuttling agent and the polymeryl chain is not sufficiently stable relative to exchange between this intermediate and any other growing polymeryl chain, such that chain termination is relatively rare.

"Multi- or dual-headed chain shuttling agents," such as those disclosed in U.S. Pat. No. 8,501,885 B2 and those known in the art, include species with metal-alkyl bonds that engage in chain transfer during a transition-metal catalyzed polymerization. Because these chain shuttling agents can be oligomeric, can consist of blends of species, or both, it is difficult to precisely describe these agents because, as they are used in solution, the CSA solution typically comprises a complex mixture of different species. Therefore, the useful CSAs disclosed here are typically described using average compositions, average numbers of multi-headed site valencies, average numbers of single-headed site valencies, and ratios of these numbers.

The terms "dual-headed" or "multi-headed" refer to a compound or molecule containing more than one chain shuttling moiety joined by a polyvalent linking group. By way of illustration only, one example of a dual-headed CSA is provided in the compounds of the general formulas $R^1$—[Zn—$R^2$—]$_N$Zn—$R^1$ or $R^1$—[AlR$^1$—$R^2$—]$_N$AlR$^1_2$, in which $R^1$ is a monovalent hydrocarbyl group and $R^2$ is a divalent hydrocarbadiyl group. In practice, suitable chain shuttling moieties typically include metal centers derived from a metal selected from Groups 2-14 of the Periodic Table of the Elements and having one or more available valencies capable of reversibly binding a growing polymer chain prepared by a coordination polymerization catalyst. At the same time that the chain shuttling moiety binds to the growing polymer chain, the remnant of the polyvalent linking group remaining after loss of the chain shuttling moiety or moieties incorporates or otherwise bonds to one or more active catalyst sites, thereby forming a catalyst composition containing an active coordination polymerization site capable of polymer insertion at one terminus of what was originally the polyvalent linking group. Shuttling of the new polymer chain attached to the linking group back to the chain shuttling moiety effectively grows a fraction of polymer chains containing a linking group and attached to a main group metal CSA at both ends.

The term "derivative" used herein refers to the reaction product of a chemical group after the insertion reaction of said chemical group into metal alkyl bonds. For example, the "$R^2$" in $R^1$—[Zn—$R^2$—]$_N$Zn—$R^1$ can define the derivative reaction product of the linking group $CH_2$=$CH(CH_2)_6CH$=$CH_2$ and $Zn(Et)_2$ to form $EtZn[(CH_2C(Et)H(CH_2)_6C(Et)HCH_2)Zn]_N Et$. In this example, $R^2$ is —$CH_2C(Et)H(CH_2)_6C(Et)HCH_2$—, a derivative of the insertion of linking group $CH_2$=$CH(CH_2)_6CH$=$CH_2$ into Zn-Et bonds.

The term "linking group" is a chemical species whose derivative links multiple metal species together in a molecule by inserting into a metal alkyl bond of each metal. In the above example, $CH_2$=$CH(CH_2)_6CH$=$CH$ is a "linking group" which joins N+1 zinc species to form the species $EtZn[(CH_2C(Et)H(CH_2)_6C(Et)HCH_2)Zn]_N Et$.

As a further non-limiting example of the terms "derivative" and "linking group" used herein, the "Y" in R—[Zn—Y—]$_n$Zn—R can define the derivative (i.e., reaction product) of the linking group 1,2,4-trivinylcyclohexane (TVCH) to form the exemplary, non-limiting structure shown below. In this example, Y is the structure sandwiched between zinc atoms; said structure is a derivative of the insertion of linking group TVCH into Zn—R bonds.

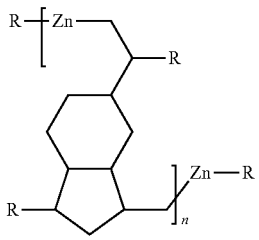

The term "precursor" or "catalyst precursor" used herein refers to a transition metal species that, once combined with an activator co-catalyst, is capable of polymerization of unsaturated monomers. For example, $Cp2Zr(CH_3)_2$ is a catalyst precursor, which, when combined with an activating cocatalyst, becomes the active catalyst species "$Cp_2Zr(CH_3)^+$" which is capable of polymerization of unsaturated monomers.

A "capping group" is a species that will insert into a primary metal alkyl bond essentially irreversibly such that the rate of further chain transfer or chain shuttling reactions from this derivative is very low.

With reference to the composition having the formula (I) or any structural formulae falling within the definition of formula (I), the symbol "*" used herein refers to a carbon-metal bond serving as the point of attachment between the carbon of a substituent group and the metal MA of the composition having the formula (I).

"Catalyst precursors" include those known in the art and those disclosed in WO 2005/090426, WO 2005/090427, WO 2007/035485, WO 2009/012215, WO 2014/105411, U.S. Patent Publication Nos. 2006/0199930, 2007/0167578, 2008/0311812, and U.S. Pat. Nos. 7,355,089 B2, 8,058,373 B2, and 8,785,554 B2, all of which are incorporated herein by reference in their entirety. The terms "transition metal catalysts," "transition metal catalyst precursors," "catalysts," "catalyst precursors," "polymerization catalysts or catalyst precursors," "procatalysts," "metal complexes," "complexes," "metal-ligand complexes," and like terms are to be interchangeable in the present disclosure.

"Organometallic compound" refers to any compound that contains a metal-carbon bond, R-M, and includes those known in the art as it relates to the present disclosure.

"Co-catalyst" refers to those known in the art, e.g., those disclosed in WO 2005/090427 and U.S. Pat. No. 8,501,885 B2, that can activate the catalyst precursor to form an active catalyst composition. "Activator" and like terms are used interchangeably with "co-catalyst."

The term "catalyst system," "active catalyst," "activated catalyst," "active catalyst composition," "olefin polymerization catalyst," and like terms are interchangeable and refer to a catalyst precursor/co-catalyst pair. Such terms can also include more than one catalyst precursor and/or more than one activator and optionally a co-activator. Likewise, these terms can also include more than one activated catalyst and one or more activator or other charge-balancing moiety, and optionally a co-activator.

"Solvent" refers to those known in the art and those known as appropriate by one of ordinary skill in the art for the present disclosures. Suitable solvents include aromatic hydrocarbons, such as toluene, and aliphatic hydrocarbons, such as Isopar™ and heptane.

"Polymer" refers to a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc.

"Interpolymer" and "copolymer" refer to a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g., polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalysts.

Capped Multi- or Dual-Headed Compositions Having the Formula (I)

All schemes and discussions below are by way of example only and are not meant to be limiting in any way. As noted herein, multi- or dual-headed compositions (e.g., multi- or dual-headed CSAs) are of great interest since they can enable production of telechelic functional polymers. Specifically, with reference to the generic dual-headed composition of exemplary, non-limiting Scheme 1, the core YY group sandwiched between two zinc atoms can grow into a polymer chain with both terminal ends of the chain bonded to the zinc atoms via terminal polymeryl-metal bonds. Subsequently, the terminal polymeryl-metal bonds may be transformed to desired functional groups via functionalization chemistry, thereby resulting in a desired di-functional polymer chain. The composition of exemplary, non-limiting Scheme 1 may be in monomeric (n=1) or oligomeric (n>1) forms. In this case, zinc is an exemplary, non-limiting metal. In this case, YY may be a derivative of a linking group, where the linking group is a $C_{4-100}$ hydrocarbon comprising at least two vinyl groups and optionally includes at least one heteroatom.

<p style="text-align:center">Scheme 1.</p>

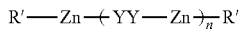

However, significant challenges exist for producing high-purity telechelic polymers in reactors. For example, as seen in exemplary, non-limiting Scheme 1, the zinc atoms at the terminal ends of an oligomeric, dual-headed composition bear pendant/terminal R' groups. In this case, the pendant R' groups may be alkyl groups, which may be more reactive for chain transfer reactions than the core YY group moiety in the middle of the composition. Thus, during polymerization, the terminal R' groups will grow into polymer chains that become unwanted mono-functional polymer chains after functionalization. One way to reduce the amount of unwanted mono-functional polymer chains relative to the desired di-functional polymer chains is to increase the (n) value of the oligomer; however, such an approach will result in higher in-reactor molecular weight chains which will cause reactor operability issues (e.g., high viscosity), especially for solution processes. Accordingly, there is a critical need in the state of the art for a way to prevent the terminal R' groups from growing into unwanted mono-functional polymers in order to produce, from the core YY group, di-functional polymers with acceptable purity.

In certain embodiments, the present disclosure relates, for example, to replacing the terminal R' groups of exemplary, non-limiting Scheme 1 with capping groups that have very low rates of chain transfer or chain shuttling with the polymerization catalyst, and will therefore not grow into polymer chains (i.e., no unwanted mono-functional polymer chains will be produced). As a result, only desired di-functional polymer chains will grow from the core YY group via olefin polymerization and functionalization, thereby enabling production of pure telechelic polymers.

Accordingly, in certain embodiments, the present disclosure relates to a multi- or dual-headed composition having terminal capping groups, as seen in the composition having the formula (I) with regard to J2 and J3, which are each a derivative of a strained olefin.

Additionally, certain embodiments of the present disclosure relate to a process for preparing the composition having the formula (I) comprising: (a) combining a linking group, an organometallic compound, a co-catalyst, a solvent, a catalyst precursor, and a strained olefin, and (b) obtaining a final solution comprising the composition having the formula (I), wherein the linking group is a $C_{4-100}$ hydrocarbon comprising at least two vinyl groups and optionally includes at least one heteroatom. In this case, the terminal capping groups of the composition having the formula (I) prepared by this process will be J2 and J3, which are each a derivative of the strained olefin.

In further embodiments, the process for preparing the composition having the formula (I) comprises: (a) combining a linking group, an organometallic compound, a co-catalyst, a solvent, and a catalyst precursor to form a first solution; and (b) combining the first solution with a strained olefin to form a final solution comprising the composition having the formula (I), wherein the linking group is a $C_{4-100}$ hydrocarbon comprising at least two vinyl groups and optionally includes at least one heteroatom. In this regard, additional organometallic compound and co-catalyst may optionally be added during (b).

In certain embodiments, the process for preparing the composition having the formula (I) is a one-pot process without any isolation, purification, or separation requirements. In further embodiments, the process for preparing the composition having the formula (I) is a one-pot process; the catalyst precursor (in combination with the co-catalyst) remains as an active catalyst in the final solution, can further function as an active catalyst for subsequent olefin polymerization, and need not be removed prior to subsequent olefin polymerization. In certain embodiments, the catalyst precursor has no detrimental effect on subsequent olefin polymerization and is a good higher alpha-olefin incorporating (i.e., good comonomer incorporating) catalyst.

In certain embodiments, the composition having the formula (I) remains active in the final solution and can further function as a chain shuttling agent or chain transfer agent during olefin polymerization. Thus, in certain embodiments, the process of the present disclosure is a one-pot process, and the final solution of the process (containing the active catalyst and the composition having the formula (I)) can be directly used in olefin polymerization reactions without any isolation, purification, or separation requirements and without the requirement of having a removable supported catalyst.

Accordingly, in certain embodiments, the present disclosure relates to a polymerization process for the polymerization of at least one addition polymerizable monomer (i.e., olefin monomer) to form a polymer composition, the process comprising: contacting at least one addition polymerizable monomer (i.e., olefin monomer) with a catalyst composition under polymerization conditions; wherein the catalyst composition comprises the contact product (i.e., reaction product) of at least one catalyst precursor, at least one co-catalyst, and the composition having the formula (I). In further embodiments, the present disclosure relates to a polymerization process for the polymerization of at least one addition polymerizable monomer (i.e., olefin monomer) to form a polymer composition, the process comprising: contacting at least one addition polymerizable monomer (i.e., olefin monomer) with a catalyst composition under polymerization conditions; wherein the catalyst composition comprises the contact product (i.e., reaction product) of at least one catalyst precursor, at least one co-catalyst, and the composition having the formula (I), and wherein the catalyst precursor for the polymerization process is also the catalyst precursor used for preparing the composition having the formula (I). In other words, the catalyst precursor used to form the composition having the formula (I) is the same compound as the catalyst precursor used for olefin polymerization reactions.

While the catalyst remaining in the final solution can be directly used for polymerization, in certain embodiments, the catalyst in the final solution may optionally be removed from the final solution prior to polymerization by means known to those of ordinary skill in the art, such as passing the final solution through a plug of silica, alumina, or other bed media that will remove the active catalyst without reaction with or removal of more than a small percentage of the composition having the formula (I). Preferably, the removal process uses dehydrated amorphous silica.

Strained Olefin Capping Groups

The terminal capping groups of the composition having the formula (I) may be selected from "strained olefins," which include alkenes that form sterically hindered metal-carbon bonds. The chain transfer on these sterically hindered sites are kinetically disfavored in competition with the less hindered bonds between metal and the core YY group (i.e., the derivative of a linking group). Accordingly, unwanted mono-functional polymer chains are prevented from growing, as the capping groups make the chain transfer reaction and polymer growth occur selectively on the less-hindered, core YY group of the composition having the formula (I).

Accordingly, in certain embodiments, the present disclosure relates to adding a strained olefin to cap the terminal ends of a multi- or dual-headed composition, as seen in Scheme 2, which is exemplary and non-limiting:

Scheme 2.

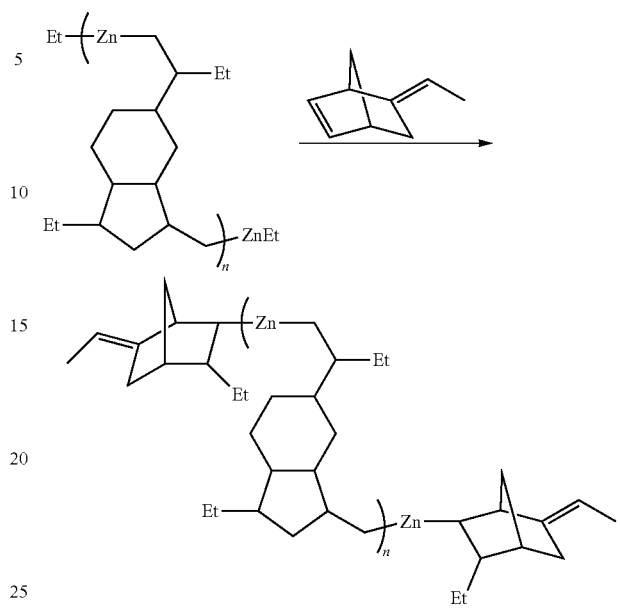

The catalytic process for exemplary, non-limiting Scheme 2 is further detailed in Scheme 3, which is also exemplary and non-limiting.

Scheme 3.

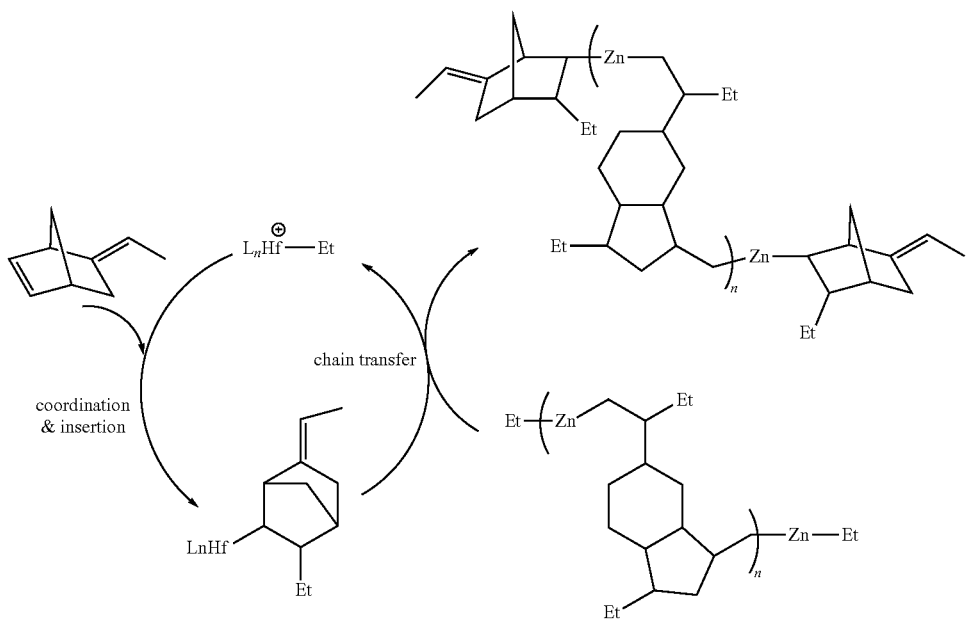

In certain embodiments, the capping groups are selected from "strained olefins," which include but are not limited to the following structural formulae:

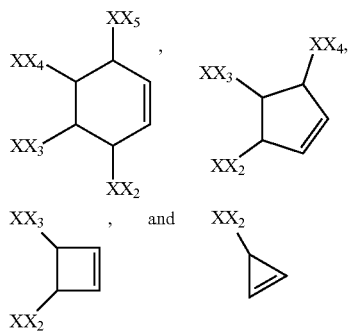

wherein:
each XX2, XX3, XX4, and XX5 is hydrogen, a substituted or unsubstituted $C_{1-20}$ alkyl group, or a substituted or unsubstituted $C_{6-20}$ aryl group,
wherein XX2, XX3, XX4, and XX5 may be the same or different,
wherein each XX2, XX3, XX4, and XX5 optionally includes at least one heteroatom, and
wherein two of XX2, XX3, XX4, and XX5 may optionally form cyclic rings or cyclic structures.

In further embodiments, the capping groups are selected from strained olefins, which include but are not limited to the following structural formulae:

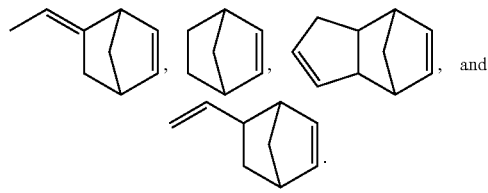

Accordingly, in certain embodiments, the composition having the formula (I) comprises capping groups as seen in formula (I) with regard to J2 and J3, which are derivatives of strained olefins in accordance with the following structural formulae:

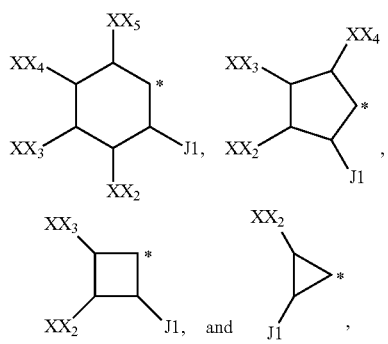

wherein:
J1 is hydrogen or a $C_{1-20}$ alkyl group; and
each XX2, XX3, XX4, and XX5 is hydrogen, a substituted or unsubstituted $C_{1-20}$ alkyl group, or a substituted or unsubstituted $C_{6-20}$ aryl group,
wherein XX2, XX3, XX4, and XX5 may be the same or different,
wherein each XX2, XX3, XX4, and XX5 optionally includes at least one heteroatom, and
wherein two of XX2, XX3, XX4, and XX5 may optionally form cyclic rings or structures.

In further embodiments, the composition having the formula (I) comprises capping groups as seen in formula (I) with regard to J2 and J3, which are derivatives of strained olefins in accordance with the following structural formulae:

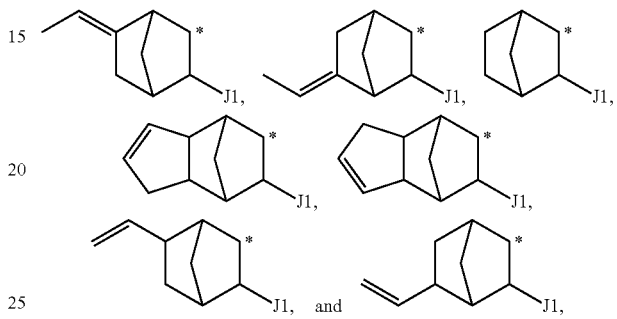

wherein J1 is hydrogen or a $C_{1-20}$ alkyl group.

In certain embodiments, J1 of the structural formulae of the capping groups of the composition having the formula (I) may be methyl, ethyl, n-propyl, n-butyl, isobutyl, n-hexyl, isohexyl, n-octyl, or isooctyl.

Core Structure

With reference to the composition having the formula (I), the core YY group (i.e., the derivative of a linking group), during olefin polymerization, will grow into polymer chains with both ends attached to the metal atoms to enable production of telechelic polymers. In certain embodiments, YY is a derivative of a $C_{4-100}$ linking group comprising at least two vinyl groups and optionally includes at least one heteroatom. In the case where YY is a derivative of a C4 linking group, two vinyl groups will be directly bound to each other.

In certain embodiments of the present disclosure, YY is a derivative of a 1,2,4-trivinylcyclohexane (TVCH) linking group. Specifically, in certain embodiments, the compositions having the formula (I) formed with TVCH are formed via the exemplary, non-limiting mechanism illustrated below in Scheme 4 (which does not include insertion of the capping groups). With reference to exemplary, non-limiting Scheme 4, the vinyl double bond on the top and one of the vinyl groups on the bottom of the TVCH ring coordinate with the catalyst precursor and insert into the metal-carbon bond to form (1). The remaining neighboring vinyl inserts to form (2), a 5-member ring, which then transfers to metal to form a dual-headed metal species (3). The recovered metal catalyst precursor goes back to the catalyst cycle to react with another TVCH molecule. The dual headed metal species (3) undergoes further chain transfer with (2) using the remaining terminal ZnR2, resulting in "polymeric" dual headed metal species. This catalyst process continues until TVCH is exhausted. The length of the dual headed zinc chain is primarily determined by the metal/TVCH ratio. The closer the ratio to unity, the greater is the n value.

Scheme 4.

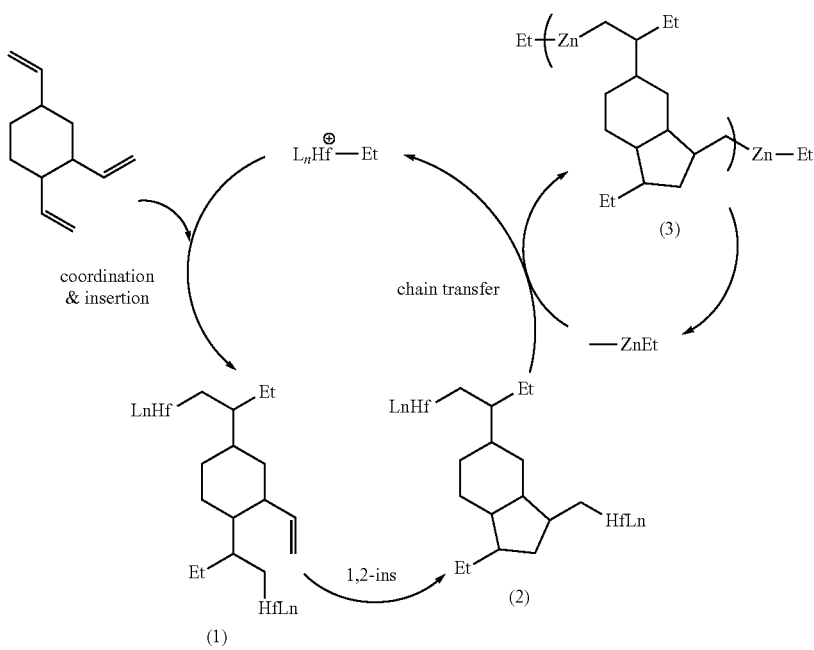

Accordingly, in certain embodiments, the composition having the formula (I) has the following structural formulae with a YY core group being a derivative of a TVCH linking group:

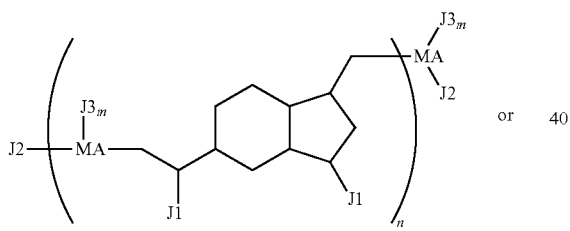

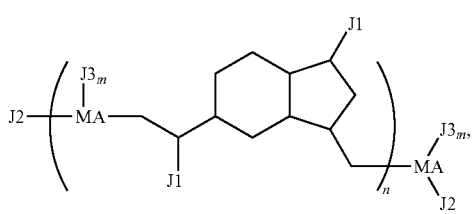

or aggregates thereof, Lewis base-containing derivatives thereof, or any combination thereof, wherein J1 is hydrogen or a $C_{1-20}$ alkyl group. In further embodiments, J1 of the derivative of TVCH may be methyl, ethyl, n-propyl, n-butyl, isobutyl, n-hexyl, isohexyl, n-octyl, or isooctyl.

In certain embodiments, YY of the composition having the formula (I) has the following structural formula:

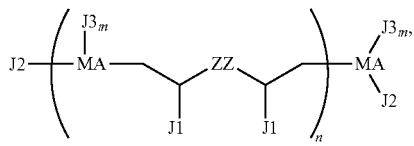

wherein:
J1 is hydrogen or a $C_{1-20}$ alkyl group; and
ZZ is a linear or branched $C_{4-100}$ hydrocarbyl group that optionally includes at least one heteroatom, and wherein ZZ may be aliphatic or aromatic.

In further embodiments of the immediately preceding structural formula, J1 may be methyl, ethyl, n-propyl, n-butyl, isobutyl, n-hexyl, isohexyl, n-octyl, or isooctyl.

In further embodiments of the immediately preceding structural formula, YY is a derivative of a diene, such as an alpha,omega diene ($\alpha,\omega$-diene). In certain embodiments, dienes suitable for the present disclosure must be able to coordinate with the catalyst precursor and insert into the metal-carbon bond to form $\delta$-bond with the metal, then immediately transfer to the MA metal (of the organometallic compound) of the present disclosure. In certain embodiments of the present disclosure, the consecutive insertion of a second diene is kinetically disfavored because the rate of olefin insertion is much slower than the rate of chain transfer to the MA metal (of the organometallic compound), resulting in only one diene molecule sandwiched between two MA metals.

As used here, the term "$\alpha,\omega$-diene" is used interchangeably with "$\alpha,\omega$-diene-containing" molecules or species to refer to any compound that contains at least two terminal olefin moieties (—CH═CH$_2$), and are not intended to be limiting to strictly hydrocarbon species. Examples of suitable $\alpha,\omega$-diene-containing species include hydrocarbyl $\alpha,\omega$-dienes, functionalized hydrocarbyl $\alpha,\omega$-dienes, such as heteroatom-functionalized diene compounds, and other $\alpha,\omega$- diene-containing compounds, such as 1,3-di(ω-alkenyl)-tetramethyldisiloxanes and di(ω-alkenyl)ethers.

Suitable hydrocarbyl α,ω-dienes as referred to herein include α,ω-dienes having the formula $CH_2=CH(CH_2)_nCH=CH_2$, where n is an integer from 0 to 20, preferably n is an integer from 1 to 20, including cyclic and bicyclic analogs thereof. Examples of these hydrocarbyl α,ω-dienes include but are not limited to 1,3-butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, vinyl norbornene, norbornadiene, dicyclopentadiene, cyclooctadiene, vinyl cyclohexene, and the like, typically containing from 5 to 40 carbon atoms.

Functionalized hydrocarbyl α,ω-dienes as referred to herein include α,ω-dienes which are heteroatom-substituted by at least one O, S, N, or Si atom, or a combination of atoms. Specific examples of functionalized hydrocarbyl α,ω-dienes include but are not limited to compounds having the formulas $O[(CH_2)_nCH=CH_2]_2$, $S[(CH_2)_nCH=CH_2]_2$, $R^A N[(CH_2)_nCH=CH_2]_2$, $(R^B)_2Si[(CH_2)_nCH=CH_2]_2$, $(R^B)_3SiOSiR^B[(CH_2)_nCH=CH_2]_2$, and $[Si(R^B)_2(CH_2)_nCH=CH_2]_{20}$; wherein n in each occurrence is independently an integer from 0 to 20, inclusive, preferably 1 to 20 inclusive; $R^A$ is H or a hydrocarbyl having from 1 to 12 carbon atoms, inclusive; and, $R^B$ in each occurrence is independently a hydrocarbyl having from 1 to 12 carbon atoms, inclusive.

Examples of functionalized hydrocarbyl α,ω-dienes include but are not limited to divinyl ether, di(2-propenyl) ether, di(3-butenyl)ether, di(4-pentenyl)ether, di(5-hexenyl) ether, divinyl amine, di(2-propenyl)amine, di(3-butenyl) amine, di(4-pentenyl) amine, di(5-hexenyl)amine, divinyl methylamine, di(2-propenyl)methylamine, di(3-butenyl) methylamine, di(4-pentenyl)methylamine, di(5-hexenyl) methylamine, divinyl thioether, di(2-propenyl)thioether), di(3-butenyl)thioether, di(4-pentenyl)thioether, di(5-hexenyl)thioether, divinyl dimethylsilane, di(2-propenyl) dimethylsilane, di(3-butenyl) dimethylsilane, di(4-pentenyl) dimethylsilane, di(5-hexenyl) dimethylsilane, and the like, typically containing from 4 to 40 carbon atoms.

Further examples of suitable functionalized hydrocarbyl α,ω-dienes include but are not limited to the disiloxane compounds, such as the 1,1- and the 1,3-isomers of divinyl tetramethyldisiloxane (also referred to here as di(ethan-1,2-diyl) tetramethyldisiloxane), di(2-propenyl)tetramethyldisiloxane, di(3-butenyl)tetramethyldisiloxane, di(4-pentenyl) tetramethyldisiloxane, di(5-hexenyl)tetramethyldisiloxane, di(6-heptenyl)tetramethyldisiloxane, di(7-octenyl)tetramethyldisiloxane, di(8-nonenyl)tetramethyldisiloxane, di(9-decenyl)-tetramethyldisiloxane, divinyltetraethyldisiloxane, di(2-propenyl)tetraethyldisiloxane, di(3-butenyl)tetraethyldisiloxane, di(4-pentenyl)tetraethyldisiloxane, di(5-hexenyl)-tetraethyldisiloxane, di(6-heptenyl)tetraethyldisiloxane, di(7-octenyl)tetraethyldisiloxane, di(8-nonenyl) tetraethyldisiloxane, di(9-decenyl)tetraethyldisiloxane, and the like.

Specific examples of the diene compound include conjugated diene compounds such as 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene, and 2-phenyl-1,3-butadiene;

chain non-conjugated diene compounds such as 1,4-pentadiene, 3-methyl-1,4-pentadiene, 1,4-hexadiene, 3-methyl-1,4-hexadiene, 4-methyl-1,4-hexadiene, 5-methyl-1,4-hexadiene, 4,5-dimethyl-1,4-hexadiene, 1,5-hexadiene, 3-methyl-1,5-hexadiene, 1,5-heptadiene, 3-methyl-1,5-heptadiene, 1,6-heptadiene, 4-methyl-1,6-heptadiene, 1,6-octadiene, 4-methyl-1,6-octadiene, 7-methyl-1,6-octadiene, 1,7-octadiene, 4-methyl-1,7-octadiene, 1,7-nonadiene, 4-methyl-1,7-nonadiene, 1,8-nonadiene, 4-methyl-1,8-nonadiene, 1,8-decadiene, 5-methyl-1,8-decadiene, 1,9-decadiene, 5-methyl-1,9-decadiene, 1,10-undecadiene, and 1,11-dodecadiene;

triene compounds such as 1,4,7-octatriene, 3-methyl-1,4,7-octatriene, 1,5,9-decatriene, and 4-methyl-1,5,9-decatriene;

cyclic olefin compounds such as 5-methylene-2-norbornene, 5-vinyl-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene, dicyclopentadiene, 5-ethylidene-2-norbornene, 5-isopropylidene-2-norbornene, 1,1'-bi(3-cyclopentene), di(3-cyclopentenyl)methane, 1,3-di(3-cyclopentenyl)propane, 1,4-di(3-cyclopentenyl)butane, 1,5-di(3-cyclopentenyl)pentane, 3-methyl-1,1'-bi(3-cyclopentene), 4-(3-cyclopentenylmethyl)-1 ethyl-1-cyclopentene, 4-(3-(3-cyclopentenyl)propyl)-1-methyl-1-cyclopentene, 4-(4-(3-cyclopentenyl)butyl)-1-methyl-1-cyclopentene, 1,1'-bi(3-cyclohexene), di(3-cyclohexenyl) methane, 1,3-di(3-cyclohexenyl)propane, 1,4-di(3-cyclohexenyl)butane, and 1,5-di(3-cyclohexenyl)pentane;

cyclic diene compounds such as 6-chloromethyl-5-isopropenyl-2-norbornene;

halogen-containing diene compounds such as 3-chloro-1,4-pentadiene, 3-bromo-3-methyl-1,4-pentadiene, 3-chloro-1,4-hexadiene, 3-chloro-3-methyl-1,4-hexadiene, 3-bromo-4-methyl-1,4-hexadiene, 3-chloro-5-methyl-1,4-hexadiene, 3-bromo-4,5-dimethyl-1,4-hexadiene, 3-bromo-1,5-hexadiene, 3-chloro-3-methyl-1,5-hexadiene, 3-bromo-1,5-heptadiene, 3-chloro-3-methyl-1,5-heptadiene, 4-bromo-1,6-heptadiene, 3-chloro-4-methyl-1,6-heptadiene, 4-bromo-1,6-octadiene, 3-chloro-4-methyl-1,6-octadiene, 4-bromo-7-methyl-1,6-octadiene, 4-chloro-1,7-octadiene, 3-chloro-4-methyl-1,7-octadiene, 4-bromo-1,7-nonadiene, 4-bromo-4-methyl-1,7-nonadiene, 4-bromo-1,8-nonadiene, 3-chloro-4-methyl 1,8-nonadiene, 5-bromo-1,8-decadiene, 3-chloro-5-methyl-1,8-decadiene, 5-bromo-1,9-decadiene, 3-chloro-5-methyl-1,9-decadiene, 5-bromo-1,10-undecadiene, and 5-bromo-1,1'-dodecadiene;

silane-containing dienes such as bisvinyloxy silane, dimethyl bisvinyloxy silane, bisallyloxy silane, dimethylbis allyloxy silane, di(3-butenyl)dimethyl silane, bis(3-butenyloxy)silane, dimethylbis(3-butenyloxy)silane, di(4-pentenyl)dimethyl silane, bis(4-pentenyloxy)silane, bis(4-pentenyloxy)dimethylsilane, di(5-hexenyl)dimethylsilane, bis(5-hexenyloxy)silane, and bis(5-hexenyloxy)dimethylsilane;

ester-containing diene compounds such as 3-butenyl-4-pentenoate, 4-pentenyl-4-pentenoate, 4-methoxycarbonyl-1,7-octadiene, and 4-methoxycarbonyl-1,9-decadiene;

ether-containing diene compounds such as divinyl ether, diallyl ether, di(4-butenyloxy)ether, and di(5-hexenyloxy) ether;

siloxy-containing diene compounds such as 4-trimethyl siloxymethyl-1,7-octadiene, and 4-trimethyl siloxymethyl-1,9-decadiene.

These diene compounds are generally available or can be produced by known methods.

Organometallic Compound

In certain embodiments of the process of the present disclosure, the organometallic compound is a metal alkyl. In certain embodiments of the process of the present disclosure, the organometallic compound is a metal alkyl containing a divalent metal (e.g., Zn or Mg), a trivalent metal (e.g., Al, B, or Ga), or a mixture of divalent metal and trivalent metal. In certain embodiments of the process of the present disclosure, the organometallic compound is a divalent metal alkyl, such as dialkylzinc. In certain embodiments of the process of the present disclosure, the organometallic compound is a trivalent metal alkyl, such as trialkylaluminum. In certain embodiments of the process of the present disclosure, the organometallic compound is a mixture of divalent metal alkyl (e.g., dialkylzinc) and trivalent metal alkyl (e.g., trialkylaluminum).

Exemplary divalent metals suitable for the organometallic compound of the present disclosure include but are not limited to dimethyl zinc, diethyl zinc, dipropyl zinc, dibutyl zinc, diisobutyl zinc, dihexyl zinc, diisohexyl zinc, dioctyl zinc, and diisooctyl zinc. Exemplary divalent metals suitable for the organometallic compound of the present disclosure further include but are not limited to organomagnesium compounds, such as dimethyl magnesium, diethyl magnesium, dipropyl magnesium, dibutyl magnesium, diisobutyl magnesium, dihexyl magnesium, diisohexyl magnesium, dioctyl magnesium, and diisooctyl magnesium.

Exemplary trivalent metals suitable for the organometallic compound of the present disclosure include but are not limited to trimethyl aluminum, triethyl aluminum, tripropyl aluminum, tributyl aluminum, triisobutyl aluminum, trihexyl aluminum, triisohexyl aluminum, trioctyl aluminum, triisooctyl aluminum, tripentyl aluminum, tridecyl aluminum, tribranched alkyl aluminums, tricycloalkyl aluminums, triphenyl aluminum, tritolyl aluminum, dialkyl and aluminum hydrides. Further trivalent metals include but are not limited to organogallium compounds, such as trimethyl gallium, triethyl gallium, tripropyl gallium, tributyl gallium, triisobutyl gallium, trihexyl gallium, triisohexyl gallium, trioctyl gallium, and triisooctyl gallium.

In certain embodiments, J1, J2, and J3 of any and all of the structural formulae discussed herein as they relate to the composition having the formula (I) may correspond to the alkyl group of the organometallic compound of the process of the present disclosure.

In certain embodiments of the process of the present disclosure, the organometallic compound, as it relates to "m" of formula (I), is a metal alkyl containing a mixture of trivalent metal and divalent metal at a trivalent metal/divalent metal ratio from 99:1 to 1:99 (e.g., from 95:5 to 50:50, from 90:10 to 80:20, from 90:10 to 70:30, etc.). In certain embodiments of the process of the present disclosure, the organometallic compound is a metal alkyl containing a mixture of aluminum and zinc metals at an aluminum/zinc ratio from 99:1 to 1:99 (e.g., from 95:5 to 50:50, from 90:10 to 80:20, from 90:10 to 70:30, etc.).

In certain embodiments of the present disclosure, methods are considered to control the formation of insoluble gel that can easily form due to trivalent metals. In certain embodiments of the process of the present disclosure, the formation of the insoluble gel with trivalent metals is prevented by controlling the ratio of metal to linking group, where the linking group (i.e., the derivative of which becomes the YY group) is a $C_{4-100}$ hydrocarbon comprising at least two vinyl groups and optionally includes at least one heteroatom. The higher the metal/linking group ratio, the smaller the size of the oligomer and, thus, the lower the chance is for the formation of insoluble gel. In further embodiments, the structure and size of the composition of having the formula (I) may be tailored as desired via selection of the organometallic compound and the metal/linking group ratio. Indeed, the length (n) of the composition having the formula (I) may be controlled by the metal/linking group ratio, where metal/linking group=(n+1)/n. Thus, for example, the metal/linking group ratio is 2 for n=1, the metal/linking group ratio is 1.5 for n=2, the metal/linking group ratio is 1.33333 for n=3, etc. At very large "n" values, the metal/linking group ratio approaches 1.

In certain embodiments, the metal/linking group ratio is from 2:1 to 1:1 (where the length (n) of the composition having the formula (I) is a number from 1 to infinity). In further embodiments, the metal/linking group ratio is from 3:2 to 11:10 (where the length (n) of the composition having the formula (I) is a number from 2 to 10).

Catalyst or Catalyst Precursor

Suitable catalyst precursors for use herein include any compound or combination of compounds that is adapted for preparing polymers of the desired composition or type and capable of reversible chain transfer with a chain shuttling agent. Both heterogeneous and homogeneous catalysts may be employed. Examples of heterogeneous catalysts include the well known Ziegler-Natta compositions, especially Group 4 metal halides supported on Group 2 metal halides or mixed halides and alkoxides and the well known chromium or vanadium based catalysts. Preferably, the catalysts for use herein are homogeneous catalysts comprising a relatively pure organometallic compound or metal complex, especially compounds or complexes based on metals selected from Groups 3-10 or the Lanthanide series of the Periodic Table of the Elements.

Metal complexes for use herein may be selected from Groups 3 to 15 of the Periodic Table of the Elements containing one or more delocalized, π-bonded ligands or polyvalent Lewis base ligands. Examples include metallocene, half-metallocene, constrained geometry, and polyvalent pyridylamine, or other polychelating base complexes. The complexes are generically depicted by the formula: $MK_kX_xZ_z$, or a dimer thereof, wherein M is a metal selected from Groups 3-15, preferably 3-10, more preferably 4-10, and most preferably Group 4 of the Periodic Table of the Elements;

K independently at each occurrence is a group containing delocalized 71-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X or to both Z and X;

X independently at each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is both covalently bound to M and coordinated thereto; or two X groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state, and Z independently at each occurrence is a neutral, Lewis base donor ligand of up to 50 non-hydrogen atoms containing at least one unshared electron pair through which Z is coordinated to M;

k is an integer from 0 to 3; x is an integer from 1 to 4; z is a number from 0 to 3; and the sum, k+x, is equal to the formal oxidation state of M.

Suitable metal complexes include those containing from 1 to 3 π-bonded anionic or neutral ligand groups, which may be cyclic or non-cyclic delocalized i-bonded anionic ligand groups. Exemplary of such π-bonded groups are conjugated or nonconjugated, cyclic or non-cyclic diene and dienyl groups, allyl groups, boratabenzene groups, phosphole, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted heteroatoms wherein the heteroatom is selected from Group 14-16 of the Periodic Table of the Elements, and such hydrocarbyl-substituted heteroatom radicals further substituted with a Group 15 or 16 hetero atom containing moiety. In addition two or more such radicals may together form a fused ring system, including partially or fully hydrogenated fused ring systems, or they may form a metallocycle with the metal. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. Suitable hydrocarbyl-substituted heteroatom radicals include mono-, di- and tri-substituted radicals of boron, silicon, germanium, nitrogen, phosphorus or oxygen wherein each of the hydrocarbyl groups contains from 1 to 20 carbon atoms. Examples include N,N-dimethylamino, pyrrolidinyl, trimethylsilyl, triethylsilyl, t-butyldimethylsilyl, methyldi(t-butyl)silyl, triphenylgermyl, and trimethylgermyl groups. Examples of Group 15 or 16 hetero atom containing moieties include amino, phosphino, alkoxy, or alkylthio moieties or divalent derivatives thereof, for example, amide, phosphide, alkyleneoxy or alkylenethio groups bonded to the transition metal or Lanthanide metal, and bonded to the hydrocarbyl group, π-bonded group, or hydrocarbyl-substituted heteroatom.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzyl groups, as well as inertly substituted derivatives thereof, especially $C_{1-10}$ hydrocarbyl-substituted or tris($C_{1-10}$ hydrocarbyl)silyl-substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cyclopenta(1)phenanthren-1-yl, and tetrahydroindenyl.

The boratabenzenyl ligands are anionic ligands which are boron containing analogues to benzene. They are previously known in the art having been described by G. Herberich, et al., in *Organometallics*, 14, 1, 471-480 (1995). Preferred boratabenzenyl ligands correspond to the formula:

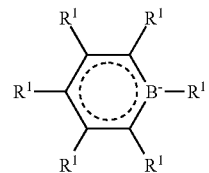

wherein $R^1$ is an inert substituent, preferably selected from the group consisting of hydrogen, hydrocarbyl, silyl, halo or germyl, said $R^1$ having up to 20 atoms not counting hydrogen, and optionally two adjacent $R^1$ groups may be joined together. In complexes involving divalent derivatives of such delocalized π-bonded groups one atom thereof is bonded by means of a covalent bond or a covalently bonded divalent group to another atom of the complex thereby forming a bridged system.

Phospholes are anionic ligands that are phosphorus containing analogues to a cyclopentadienyl group. They are previously known in the art having been described by WO 98/50392, and elsewhere. Preferred phosphole ligands correspond to the formula:

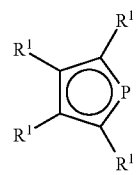

wherein $R^1$ is as previously defined.

Suitable transition metal complexes for use herein correspond to the formula: $MK_kX_xZ_z$, or a dimer thereof, wherein:

M is a Group 4 metal;

K is a group containing delocalized π-electrons through which K is bound to M, said K group containing up to 50 atoms not counting hydrogen atoms, optionally two K groups may be joined together forming a bridged structure, and further optionally one K may be bound to X or Z;

X at each occurrence is a monovalent, anionic moiety having up to 40 non-hydrogen atoms, optionally one or more X and one or more K groups are bonded together to form a metallocycle, and further optionally one or more X and one or more Z groups are bonded together thereby forming a moiety that is both covalently bound to M and coordinated thereto;

Z independently at each occurrence is a neutral, Lewis base donor ligand of up to 50 non-hydrogen atoms containing at least one unshared electron pair through which Z is coordinated to M;

k is an integer from 0 to 3; x is an integer from 1 to 4; z is a number from 0 to 3; and the sum, k+x, is equal to the formal oxidation state of M.

Suitable complexes include those containing either one or two K groups. The latter complexes include those containing a bridging group linking the two K groups. Suitable bridging groups are those corresponding to the formula $(ER'_2)_e$ wherein E is silicon, germanium, tin, or carbon, R' independently at each occurrence is hydrogen or a group selected from silyl, hydrocarbyl, hydrocarbyloxy and combinations thereof, said R' having up to 30 carbon or silicon atoms, and e is 1 to 8. Illustratively, R' independently at each occurrence is methyl, ethyl, propyl, benzyl, tert-butyl, phenyl, methoxy, ethoxy or phenoxy.

Examples of the complexes containing two K groups are compounds corresponding to the formula:

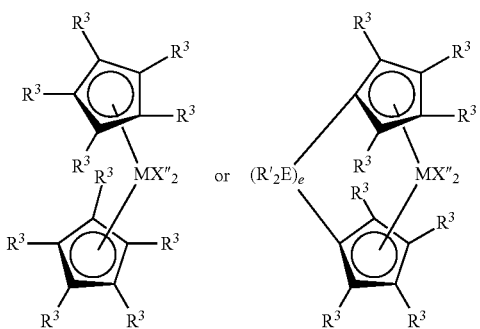

wherein:

M is titanium, zirconium or hafnium, preferably zirconium or hafnium, in the +2 or +4 formal oxidation state; $R^3$ at each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently at each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state, and R', E and e are as previously defined.

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl)propane, dimethylbis(inden-1-yl)silane, dimethylbis(tetrahydroinden-1-yl)silane, dimethylbis(fluoren-1-yl)silane, dimethylbis(tetrahydrofluoren-1-yl)silane, dimethylbis(2-methyl-4-phenylinden-1-yl)-silane, dimethylbis(2-methylinden-1-yl)silane, dimethyl(cyclopentadienyl)(fluoren-1-yl)silane, dimethyl(cyclopentadienyl)(octahydrofluoren-1-yl)silane, dimethyl(cyclopentadienyl)(tetrahydrofluoren-1-yl)silane, (1, 1, 2, 2-tetramethy)-1, 2-bis(cyclopentadienyl)disilane, (1, 2-bis(cyclopentadienyl)ethane, and dimethyl(cyclopentadienyl)-1-(fluoren-1-yl)methane.

Suitable X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Exemplary X" groups are C1-20 hydrocarbyl groups.

Examples of metal complexes of the foregoing formula suitable for use in the present disclosure include:
bis(cyclopentadienyl)zirconiumdimethyl,
bis(cyclopentadienyl)zirconium dibenzyl,
bis(cyclopentadienyl)zirconium methyl benzyl,
bis(cyclopentadienyl)zirconium methyl phenyl,
bis(cyclopentadienyl)zirconiumdiphenyl,
bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl,
bis(pentamethylcyclopentadienyl)titaniumdimethyl,
bis(indenyl)zirconiumdimethyl,
indenylfluorenylzirconiumdimethyl,
bis(indenyl)zirconiummethyl(2-(dimethylamino)benzyl),
bis(indenyl)zirconiummethyltrimethylsilyl,
bis(tetrahydroindenyl)zirconiummethyltrimethylsilyl,
bis(pentamethylcyclopentadienyl)zirconiummethylbenzyl,
bis(pentamethylcyclopentadienyl)zirconiumdibenzyl,
bis(pentamethylcyclopentadienyl)zirconiummethylmethoxide,
bis(pentamethylcyclopentadienyl)zirconiummethylchloride,
bis(methylethylcyclopentadienyl)zirconiumdimethyl,
bis(butylcyclopentadienyl)zirconiumdibenzyl,
bis(t-butylcyclopentadienyl)zirconiumdimethyl,
bis(ethyltetramethylcyclopentadienyl)zirconiumdimethyl,
bis(methylpropylcyclopentadienyl)zirconiumdibenzyl,
bis(trimethylsilylcyclopentadienyl)zirconiumdibenzyl,
dimethylsilylbis(cyclopentadienyl)zirconiumdichloride,
dimethylsilylbis(cyclopentadienyl)zirconiumdimethyl,
dimethylsilylbis(tetramethylcyclopentadienyl)titanium (III) allyl dimethylsilylbis(t-butylcyclopentadienyl)zirconiumdichloride,
dimethylsilylbis(n-butylcyclopentadienyl)zirconiumdichloride,
(dimethylsilylbis(tetramethylcyclopentadienyl)titanium(III) 2-(dimethylamino)benzyl,
(dimethylsilylbis(n-butylcyclopentadienyl)titanium(III) 2-(dimethylamino)benzyl, dimethylsilylbis(indenyl)zirconiumdichloride,
dimethylsilylbis(indenyl)zirconiumdimethyl,
dimethylsilylbis(2-methylindenyl)zirconiumdimethyl,
dimethylsilylbis(2-methyl-4-phenylindenyl)zirconiumdimethyl,
dimethylsilylbis(2-methylindenyl)zirconium-1,4-diphenyl-1,3-butadiene,
dimethylsilylbis(2-methyl-4-phenylindenyl)zirconium (II) 1,4-diphenyl-1,3-butadiene, dimethylsilylbis(4,5,6,7-tetrahydroinden-1-yl)zirconiumdichloride,
dimethylsilylbis(4,5,6,7-tetrahydroinden-1-yl)zirconiumdimethyl,
dimethylsilylbis(tetrahydroindenyl)zirconium(II) 1,4-diphenyl-1,3-butadiene,
dimethylsilylbis(tetramethylcyclopentadienyl)zirconium dimethyl,
dimethylsilylbis(fluorenyl)zirconiumdimethyl,
dimethylsilylbis(tetrahydrofluorenyl)zirconium bis(trimethylsilyl),
ethylenebis(indbnyl)zirconiumdichloride,
ethylenebis(indenyl)zirconiumdimethyl,
ethylenebis(4,5,6,7-tetrahydroindenyl)zirconiumdichloride,
ethylenebis(4,5,6,7-tetrahydroindenyl)zirconiumdimethyl,
(isopropylidene)(cyclopentadienyl)(fluorenyl)zirconiumdibenzyl, and
dimethylsilyl(tetramethylcyclopentadienyl)(fluorenyl)zirconium dimethyl.

A further class of metal complexes utilized in the present disclosure corresponds to the preceding formula: $MKZ_zX_x$, or a dimer thereof, wherein M, K, X, x and z are as previously defined, and Z is a substituent of up to 50 non-hydrogen atoms that together with K forms a metallocycle with M.

Suitable Z substituents include groups containing up to 30 non-hydrogen atoms comprising at least one atom that is oxygen, sulfur, boron or a member of Group 14 of the Periodic Table of the Elements directly attached to K, and a different atom, selected from the group consisting of nitrogen, phosphorus, oxygen or sulfur that is covalently bonded to M.

More specifically this class of Group 4 metal complexes used according to the present invention includes "constrained geometry catalysts" corresponding to the formula:

wherein: M is titanium or zirconium, preferably titanium in the +2, +3, or +4 formal oxidation state;

$K^1$ is a delocalized, π-bonded ligand group optionally substituted with from 1 to 5 $R^2$ groups, $R^2$ at each occurrence independently is selected from the group consisting of hydrogen, hydrocarbyl, silyl, germyl, cyano, halo and combinations thereof, said $R^2$ having up to 20 non-hydrogen atoms, or adjacent $R^2$ groups together form a divalent derivative (that is, a hydrocarbadiyl, siladiyl or germadiyl group) thereby forming a fused ring system, each X is a halo, hydrocarbyl, heterohydrocarbyl, hydrocarbyloxy or silyl group, said group having up to 20 non-hydrogen atoms, or two X groups together form a neutral C5-30 conjugated diene or a divalent derivative thereof;

x is 1 or 2;

Y is —O—, —S—, —NR'—, —PR'—;

and X' is $SiR'_2$, $CR'_2$, $SiR'_2SiR'_2$, $CR'_2CR'_2$, $CR'=CR'$, $CR'_2SiR'_2$, or $GeR'_2$, wherein R' independently at each occurrence is hydrogen or a group selected from silyl, hydrocarbyl, hydrocarbyloxy and combinations thereof, said R' having up to 30 carbon or silicon atoms.

Specific examples of the foregoing constrained geometry metal complexes include compounds corresponding to the formula:

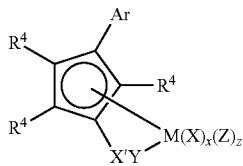

wherein,

Ar is an aryl group of from 6 to 30 atoms not counting hydrogen;

$R^4$ independently at each occurrence is hydrogen, Ar, or a group other than Ar selected from hydrocarbyl, trihydrocarbylsilyl, trihydrocarbylgermyl, halide, hydrocarbyloxy, trihydrocarbylsiloxy, bis(trihydrocarbylsilyl)amino, di(hydrocarbyl)amino, hydrocarbadiylamino, hydrocarbylimino, di(hydrocarbyl)phosphino, hydrocarbadiylphosphino, hydrocarbylsulfido, halo-substituted hydrocarbyl, hydrocarbyloxy-substituted hydrocarbyl, trihydrocarbylsilyl-substituted hydrocarbyl, trihydrocarbylsiloxy-substituted hydrocarbyl, bis(trihydrocarbylsilyl)amino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R group having up to 40 atoms not counting hydrogen atoms, and optionally two adjacent $R^4$ groups may be joined together forming a polycyclic fused ring group;

M is titanium;

X' is $SiR^6_2$, $CR^6_2$, $SiR^6_2SiR^6_2$, $CR^6_2CR^6_2$, $CR^6=CR^6$, $CR^6_2SiR^6_2$, $BR^6$, $BR^6L''$, or $GeR^6_2$;

Y is —O—, —S—, —$NR^5$—, —$PR^5$—; —$NR^5_2$, or —$PR^5_2$;

$R^5$, independently at each occurrence is hydrocarbyl, trihydrocarbylsilyl, or trihydrocarbylsilylhydrocarbyl, said $R^5$ having up to 20 atoms other than hydrogen, and optionally two $R^5$ groups or $R^5$ together with Y or Z form a ring system;

$R^6$, independently at each occurrence, is hydrogen, or a member selected from hydrocarbyl, hydrocarbyloxy, silyl, halogenated alkyl, halogenated aryl, —$NR^{52}$, and combinations thereof, said $R^6$ having up to 20 non-hydrogen atoms, and optionally, two $R^6$ groups or $R^6$ together with Z forms a ring system;

Z is a neutral diene or a monodentate or polydentate Lewis base optionally bonded to $R^5$, $R^6$, or X;

X is hydrogen, a monovalent anionic ligand group having up to 6.0 atoms not counting hydrogen, or two X groups are joined together thereby forming a divalent ligand group;

x is 1 or 2; and z is 0, 1 or 2.

Suitable examples of the foregoing metal complexes are substituted at both the 3- and 4-positions of a cyclopentadienyl or indenyl group with an Ar group. Examples of the foregoing metal complexes include:

(3-phenylcyclopentadien-1-yl)dimethyl(t-butylamido)silanetitanium dichloride, (3-phenylcyclopentadien-1-yl)dimethyl(t-butylamido)silanetitanium dimethyl, (3-phenylcyclopentadien-1-yl)dimethyl(t-butylamido)silanetitanium (II) 1,3-diphenyl-1,3-butadiene;

(3-(pyrrol-1-yl)cyclopentadien-1-yl)dimethyl(t-butylamido) silanetitanium dichloride, (3-(pyrrol-1-yl)cyclopentadien-1-yl)dimethyl(t-butylamido) silanetitanium dimethyl, (3-(pyrrol-1-yl)cyclopentadien-1-yl))dimethyl(t-butylamido)silanetitanium (II) 1,4-diphenyl-1,3-butadiene;

(3-(1-methylpyrrol-3-yl)cyclopentadien-1-yl)dimethyl(t-butylamido)silanetitanium dichloride, (3-(1-methylpyrrol-3-yl)cyclopentadien-1-yl)dimethyl(t-butylamido)silanetitanium dimethyl, (3-(1-methylpyrrol-3-yl)cyclopentadien-1-yl)dimethyl(t-butylamido)silanetitanium (II) 1,4-diphenyl-1,3-butadiene;

(3,4-diphenylcyclopentadien-1-yl)dimethyl(t-butylamido) silanetitanium dichloride, (3,4-diphenylcyclopentadien-1-yl)dimethyl(t-butylamido) silanetitanium dimethyl, (3,4-diphenylcyclopentadien-1-yl)dimethyl(t-butylamido) silanetitanium (11) 1,3-pentadiene;

(3-(3-N,N-dimethylamino)phenyl)cyclopentadien-1-yl)dimethyl(t-butylamido)silanetitanium dichloride, (3-(3-N,N-dimethylamino)phenylcyclopentadien-1-yl)dimethyl(t-butylamido)silanetitanium dimethyl, (3-(3-N,N-dimethylamino)phenylcyclopentadien-1-yl)dimethyl(t-butylamido)silanetitanium (II) 1,4-diphenyl-1,3-butadiene;

(3-(4-methoxyphenyl)-4-methylcyclopentadien-1-yl)dimethyl(t-butylamido)silanetitanium dichloride, (3-(4-methoxyphenyl)-4-phenylcyclopentadien-1-yl)dimethyl(t-butylamido)silanetitanium dimethyl, (3-4-methoxyphenyl)-4-phenylcyclopentadien-1-yl)dimethyl(t-butylamido)silanetitanium (II) 1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium (1) 1,4-diphenyl-1,3-butadiene;
(3-phenyl-4-(N,N-dimethylamino)cyclopentadien-1-yl)dimethyl(t-butylamido)silanetitanium dichloride,
(3-phenyl-4-(N,N-dimethylamino)cyclopentadien-1-yl)dimethyl(t-butylamido)silanetitanium dimethyl,
(3-phenyl-4-(N,N-dimethylamino)cyclopentadien-1-yl)dimethyl(t-butylamido)silanetitanium (II) 1,4-diphenyl-1,3-butadiene;
2-methyl-(3,4-di(4-methylphenyl)cyclopentadien-1-yl)dimethyl(t-butylamido)silanetitanium dichloride,
2-methyl-(3,4-di(4-methylphenyl)cyclopentadien-1-yl)dimethyl(t-butylamido)silanetitanium dimethyl,
2-methyl-(3,4-di(4-methylphenyl)cyclopentadien-1-yl)dimethyl(t-butylamido)silanetitanium (II) 1,4-diphenyl-1,3-butadiene;
((2,3-diphenyl)-4-(N,N-dimethylamino)cyclopentadien-1-yl)dimethyl(t-butylamido)silane titanium dichloride,
((2,3-diphenyl)-4-(N,N-dimethylamino)cyclopentadien-1-yl)dimethyl(t-butylamido)silane titanium dimethyl,
((2,3-diphenyl)-4-(N,N-dimethylamino)cyclopentadien-1-yl)dimethyl(t-butylamido)silanetitanium (II) 1,4-diphenyl-1,3-butadiene;
(2,3,4-triphenyl-5-methylcyclopentadien-1-yl)dimethyl(t-butylamido)silanetitanium dichloride,
(2,3,4-triphenyl-5-methylcyclopentadien-1-yl)dimethyl(t-butylamido)silanetitanium dimethyl,
(2,3,4-triphenyl-5-methylcyclopentadien-1-yl)dimethyl(t-butylamido)silanetitanium (II) 1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium (11) 1,4-diphenyl-1,3-butadiene;
(2,3-diphenyl-4-(n-butyl)cyclopentadien-1-yl)dimethyl(t-butylamido)silanetitanium dichloride,
(2,3-diphenyl-4-(n-butyl)cyclopentadien-1-yl)dimethyl(t-butylamido)silanetitanium dimethyl,
(2,3-diphenyl-4-(n-butyl)cyclopentadien-1-yl)dimethyl(t-butylamido)silanetitanium (II) 1,4-diphenyl-1,3-butadiene;
(2,3,4,5-tetraphenylcyclopentadien-1-yl)dimethyl(t-butylamido)silanetitanium dichloride,
(2,3,4,5-tetraphenylcyclopentadien-1-yl)dimethyl(t-butylamido)silanetitanium dimethyl, and (2,3,4,5-tetraphenylcyclopentadien-1-yl)dimethyl(t-butylamido)silanetitanium (II) 1,4-diphenyl-1,3-butadiene.

Additional examples of suitable metal complexes herein are polycyclic complexes corresponding to the formula:

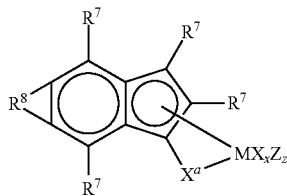

where M is titanium in the +2, +3 or +4 formal oxidation state;

$R^7$ independently at each occurrence is hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl) phosphino-substituted hydrocarbyl, hydrocarbylene-phosphino-substituted hydrocarbyl, or hydrocarbylsulfido-substituted hydrocarbyl, said $R^7$ group having up to 40 atoms not counting hydrogen, and optionally two or more of the foregoing groups may together form a divalent derivative;

$R^8$ is a divalent hydrocarbylene- or substituted hydrocarbylene group forming a fused system with the remainder of the metal complex, said $R^8$ containing from 1 to 30 atoms not counting hydrogen;

$X^a$ is a divalent moiety, or a moiety comprising one σ-bond and a neutral two electron pair able to form a coordinate-covalent bond to M, said $X^a$ comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic, delocalized, n-bound ligand groups and optionally two X groups together form a divalent ligand group;

Z independently at each occurrence is a neutral ligating compound having up to 20 atoms;

x is 0, 1 or 2; and z is zero or 1.

Suitable examples of such complexes are 3-phenyl-substituted s-indecenyl complexes corresponding to the formula:

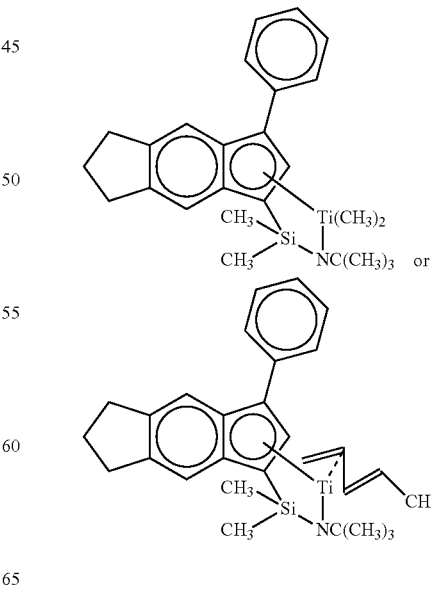

2,3-dimethyl-substituted s-indecenyl complexes corresponding to the formulas:

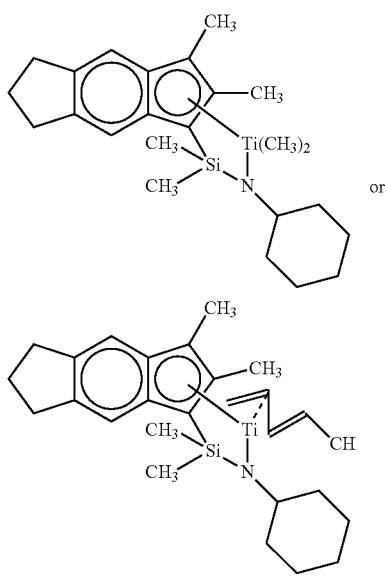

or 2-methyl-substituted s-indecenyl complexes corresponding to the formula:

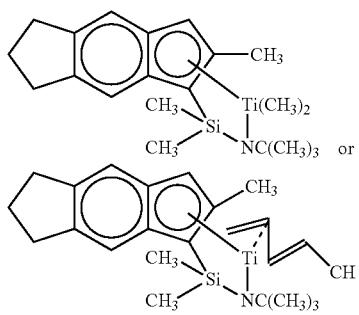

Additional examples of metal complexes that are usefully employed as catalysts according to the present invention include those of the formula:

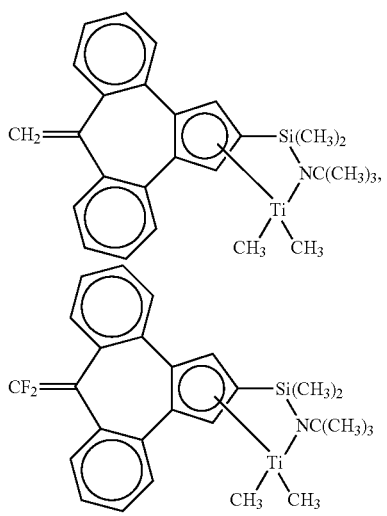

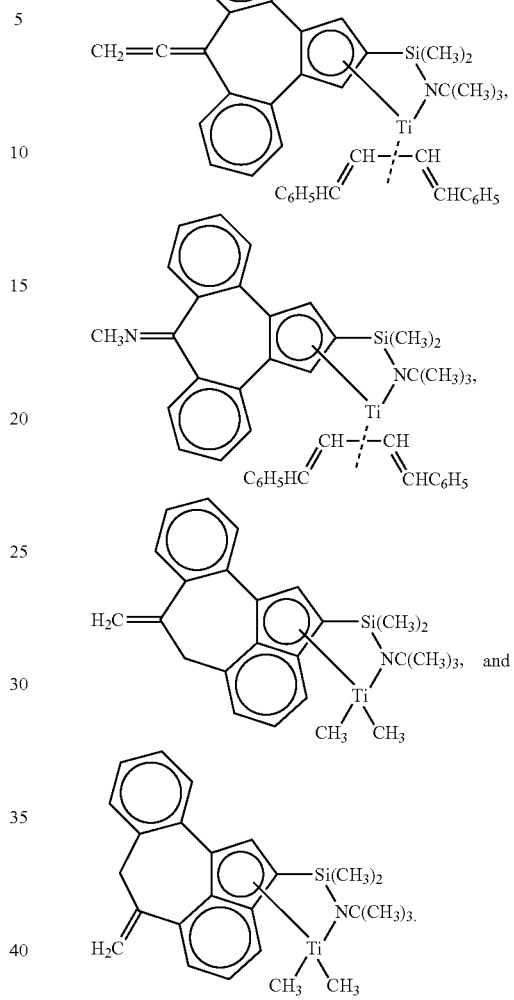

Specific metal complexes include:
(8-methylene-1,8-dihydrodibenzo[e,h]azulen-1-yl)-N-(1,1-dimethylethyl)dimethylsilanamide titanium (II) 1,4-diphenyl-1,3-butadiene,
(8-methylene-1,8-dihydrodibenzo[e,h]azulen-1-yl)-N-(1,1-dimethylethyl)dimethylsilanamide titanium (II) 1,3-pentadiene,
(8-methylene-1,8-dihydrodibenzo[e,h]azulen-1-yl)-N-(1,1-dimethylethyl)dimethylsilanamide titanium (III) 2-(N,N-dimethylamino)benzyl,
(8-methylene-1,8-dihydrodibenzo[e,h]azulen-1-yl)-N-(1,1-dimethylethyl)dimethylsilanamide titanium (IV) dichloride,
(8-methylene-1,8-dihydrodibenzo[e,h]azulen-1-yl)-N-(1,1-dimethylethyl)dimethylsilanamide titanium (IV) dimethyl,
(8-methylene-1,8-dihydrodibenzo[e,h]azulen-1-yl)-N-(1,1-dimethylethyl)dimethylsilanamide titanium (IV) dibenzyl,
(8-difluoromethylene-1,8-dihydrodibenzo[e,h]azulen-1-yl)-N-(1,1-dimethylethyl)dimethylsilanamide titanium (II) 1,4-diphenyl-1,3-butadiene,
(8-difluoromethylene-1,8-dihydrodibenzo[e,h]azulen-1-yl)-N-(1,1-dimethylethyl)dimethylsilanamide titanium (II) 1,3-pentadiene, (8-difluoromethylene-1,8-dihydrodibenzo[e,h]azulen-1-yl)-N-(1,1-dimethylethyl)dimethylsilanamide titanium (III) 2-(N,N-dimethylamino)benzyl,
(8-difluoromethylene-1,8-dihydrodibenzo[e,h]azulen-1-yl)-N-(1,1-dimethylethyl)dimethylsilanamide titanium (IV) dichloride,
(8-difluoromethylene-1,8-dihydrodibenzo[e,h]azulen-1-yl)-N-(1,1-dimethylethyl)dimethylsilanamide titanium (IV) dimethyl,
(8-difluoromethylene-1,8-dihydrodibenzo[e,h]azulen-1-yl)-N-(1,1-dimethylethyl)dimethylsilanamide titanium (IV) dibenzyl,
(8-methylene-1,8-dihydrodibenzo[e,h]azulen-2-yl)-N-(1,1-dimethylethyl)dimethylsilanamide titanium (II) 1,4-diphenyl-1,3-butadiene,
(8-methylene-1,8-dihydrodibenzo[e,h]azulen-2-yl)-N-(1,1-dimethylethyl)dimethylsilanamide titanium (II) 1,3-pentadiene,
(8-methylene-1,8-dihydrodibenzo[e,h]azulen-2-yl)-N-(1,1-dimethylethyl)dimethylsilanamide titanium (III) 2-(N,N-dimethylamino)benzyl,
(8-methylene-1,8-dihydrodibenzo[e,h]azulen-2-yl)-N-(1,1-dimethylethyl)dimethylsilanamide titanium (IV) dichloride,
(8-methylene-1,8-dihydrodibenzo[e,h]azulen-2-yl)-N-(1,1-dimethylethyl)dimethylsilanamide titanium (IV) dimethyl,
(8-methylene-1,8-dihydrodibenzo[e,h]azulen-2-yl)-N-(1,1-dimethylethyl)dimethylsilanamide titanium (IV) dibenzyl,
(8-difluoromethylene-1,8-dihydrodibenzo[e,h]azulen-2-yl)-N-(1,1-dimethylethyl)dimethylsilanamide titanium (II) 1,4-diphenyl-1,3-butadiene,
(8-difluoromethylene-1,8-dihydrodibenzo[e,h]azulen-2-yl)-N-(1,1-dimethylethyl)dimethylsilanamide titanium (II) 1,3-pentadiene,
(8-difluoromethylene-1,8-dihydrodibenzo[e,h]azulen-2-yl)-N-(1,1-dimethylethyl)dimethylsilanamide titanium (III) 2-(N,N-dimethylamino)benzyl,
(8-difluoromethylene-1,8-dihydrodibenzo[e,h]azulen-2-yl)-N-(1,1-dimethylethyl)dimethylsilanamide titanium (IV) dichloride,
(8-difluoromethylene-1,8-dihydrodibenzo[e,h]azulen-2-yl)-N-(1,1-dimethylethyl)dimethylsilanamide titanium (IV) dimethyl,
(8-difluoromethylene-1,8-dihydrodibenzo[e,h]azulen-2-yl)-N-(1,1-dimethylethyl)dimethylsilanamide titanium (IV) dibenzyl, and mixtures thereof,
especially mixtures of positional isomers.

Further illustrative examples of metal complexes for use according to the present invention correspond to the formula:

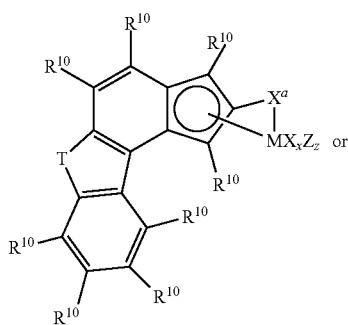

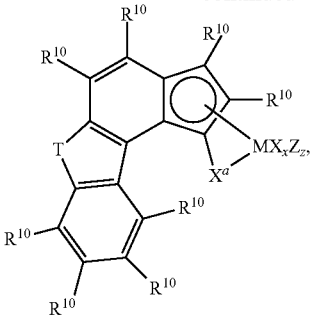

where M is titanium in the +2, +3 or +4 formal oxidation state;

T is —NR$^9$— or —O—;

R$^9$ is hydrocarbyl, silyl, germyl, dihydrocarbylboryl, or halohydrocarbyl or up to 10 atoms not counting hydrogen;

R$^{10}$ independently at each occurrence is hydrogen, hydrocarbyl, trihydrocarbylsilyl, trihydrocarbylsilylhydrocarbyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R$^{10}$ group having up to 40 atoms not counting hydrogen atoms, and optionally two or more of the foregoing adjacent R$^{10}$ groups may together form a divalent derivative thereby forming a saturated or unsaturated fused ring;

X$^a$ is a divalent moiety lacking in delocalized π-electrons, or such a moiety comprising one σ-bond and a neutral two electron pair able to form a coordinate-covalent bond to M, said X$^a$ comprising boron, or a member of Group 14 of the Periodic Table of the Elements, and also comprising nitrogen, phosphorus, sulfur or oxygen; X is a monovalent anionic ligand group having up to 60 atoms exclusive of the class of ligands that are cyclic ligand groups bound to M through delocalized n-electrons or two X groups together are a divalent anionic ligand group;

Z independently at each occurrence is a neutral ligating compound having up to 20 atoms;

x is 0, 1, 2, or 3;

and z is 0 or 1.

Illustratively, T is =N(CH$_3$), X is halo or hydrocarbyl, x is 2, X$^a$ is dimethylsilane, z is 0, and R$^{10}$ at each occurrence is hydrogen, a hydrocarbyl, hydrocarbyloxy, dihydrocarbylamino, hydrocarbyleneamino, dihydrocarbylamino-substituted hydrocarbyl group, or hydrocarbyleneamino-substituted hydrocarbyl group of up to 20 atoms not counting hydrogen, and optionally two R$^{10}$ groups may be joined together.

Illustrative metal complexes of the foregoing formula that may be employed in the practice of the present invention further include the following compounds:
(t-butylamido)dimethyl-[6,7]benzo-[4,5:2',3'](1-methylisoindol)-(3H)-indene-2-yl)silanetitanium (II) 1,4-diphenyl-1,3-butadiene, (t-butylamido)dimethyl-[6,7]benzo-[4,5:2',3'](1-methylisoindol)-(3H)-indene-2-yl)silanetitanium (II) 1,3-pentadiene,
(t-butylamido)dimethyl-[6,7]benzo-[4,5:2',3'](1-methylisoindol)-(3H)-indene-2-yl)silanetitanium (III) 2-(N,N-dimethylamino)benzyl,
(t-butylamido)dimethyl-[6,7]benzo-[4,5:2',3'](1-methylisoindol)-(3H)-indene-2-yl)silanetitanium (IV) dichloride,
(t-butylamido)dimethyl-[6,7]benzo-[4,5:2',3'](1-methylisoindol)-(3H)-indene-2-yl)silanetitanium (IV) dimethyl,
(t-butylamido)dimethyl-[6J]benzo-[4,5:2',3'](1-methylisoindol)-(3H)-indene-2-yl)silanetitanium (IV) dibenzyl,
(t-butylamido)dimethyl-[6,7]benzo-[4,5:2',3'](1-methylisoindol)-(3H)-indene-2-yl)silanetitanium (IV) bis(trimethylsilyl),
(cyclohexylamido)dimethyl-[6,7]benzo-[4,5:2',3'](1-methylisoindol)-(3H)-indene-2-yl)silanetitanium (II) 1,4-diphenyl-1,3-butadiene,
(cyclohexylamido)dimethyl-[6,7]benzo-[4,5:2',3'](1-methylisoindol)-(3H)-indene-2-yl)silanetitanium (II) 1,3-pentadiene,
(cyclohexylamido)dimethyl-[6,7]benzo-[4,5:2',3'](1-methylisoindol)-(3H)-indene-2-yl)silanetitanium (III) 2-(N,N-dimethylamino)benzyl,
(cyclohexylamido)dimethyl-[6,7]benzo-[4,5:2',3'](1-methylisoindol)-(3H)-indene-2-yl)silanetitanium (IV) dichloride,
(cyclohexylamido)dimethyl-[6,7]benzo-[4,5:2',3'](1-methylisoindol)-(3H)-indene-2-yl)silanetitanium (IV) dimethyl,
(cyclohexylamido)dimethyl-[6,7]benzo-[4,5:2',3'](1-methylisoindol)-(3H)-indene-2-yl)silanetitanium (IV) dibenzyl,
(cyclohexylamido)dimethyl-[6,7]benzo-[4,5:2',3'](1-methylisoindol)-(3H)-indene-2-yl)silanetitanium (IV) bis (trimethylsilyl),
(t-butylamido)di(p-methylphenyl)-[6,7]benzo-[4,5:2',3'](1-methylisoindol)-(3H)-indene-2-yl)silanetitanium (II) 1,4-diphenyl-1,3-butadiene,
(t-butylamido)di(p-methylphenyl)-[6,7]benzo-[4,5:2',3'](1-methylisoindol)-(3H)-indene-2-yl)silanetitanium (II) 1,3-pentadiene,
(t-butylamido)di(p-methylphenyl)-[6,7]benzo-[4,5:2',3'](1-methylisoindol)-(3H)-indene-2-yl)silanetitanium (III) 2-(N,N-dimethylamino)benzyl,
(t-butylamido)di(p-methylphenyl)-[6,7]benzo-[4,5:2',3' ](1-methylisoindol)-(3H)-indene-2-yl)silanetitanium (IV) dichloride,
(t-butylamido)di(p-methylphenyl)-[6,7]benzo-[4,5:2',3'](1-methylisoindol)-(3H)-indene-2-yl)silanetitanium (IV) dimethyl,
(t-butylamido)di(p-methylphenyl)-[6,7]benzo-[4,5:2',3'](1-methylisoindol)-(3H)-indene-2-yl)silanetitanium (IV) dibenzyl,
(t-butylamido)di(p-methylphenyl)-[6,7]benzo-[4,5:2',3'](1-methylisoindol)-(3H)-indene-2-yl)silanetitanium (IV) bis (trimethylsilyl),
(cyclohexylamido)di(p-methylphenyl)-[6,7]benzo-[4,5:2',3' ](1-methylisoindol)-(3H)-indene-2-yl)silanetitanium (II) 1,4-diphenyl-1,3-butadiene,
(cyclohexylamido)di(p-methylphenyl)-[6,7]benzo-[4,5:2', 3'](1-methylisoindol)-(3H)-indene-2-yl)silanetitanium (II) 1,3-pentadiene,
(cyclohexylamido)di(p-methylphenyl)-[6,7]benzo-[4,5:2', 3'](1-methylisoindol)-(3H)-indene-2-yl)silanetitanium (III) 2-(N,N-dimethylamino)benzyl,
(cyclohexylamido)di(p-methylphenyl)-[6,7]benzo-[4,5:2',3' ](1-methylisoindol)-(3H)-indene-2-yl)silanetitanium (IV) dichloride,
(cyclohexylamido)di(p-methylphenyl)-[6,7]benzo-[4,5:2', 3'](1-methylisoindol)-(3H)-indene-2-yl)silanetitanium (IV) dimethyl,
(cyclohexylamido)di(p-methylphenyl)-[6,7]benzo-[4,5:2', 3'](1-methylisoindol)-(3H)-indene-2-yl)silanetitanium (IV) dibenzyl; and
(cyclohexylamido)di(p-methylphenyl)-[6,7]benzo-[4,5:2', 3'](1-methylisoindol)-(3H)-indene-2-yl)silanetitanium (IV) bis(trimethylsilyl).

Illustrative Group 4 metal complexes that may be employed in the practice of the present disclosure further include:

(tert-butylamido)(1,1-dimethyl-2,3,4,9,10-$\eta$-1,4,5,6,7,8-hexahydronaphthalenyl)dimethylsilanetitaniumdimethyl
(tert-butylamido)(1,1,2,3-tetramethyl-2,3,4,9,10-$\eta$-1,4,5,6,7,8-hexahydronaphthalenyl)dimethylsilanetitaniumdimethyl,
(tert-butylamido)(tetramethyl-$\eta^5$-cyclopentadienyl) dimethylsilanetitanium dibenzyl,
(tert-butylamido)(tetramethyl-$\eta^5$-cyclopentadienyl)dimethylsilanetitanium dimethyl,
(tert-butylamido)(tetramethyl-$\eta^5$-cyclopentadienyl)-1,2-ethanediyltitanium dimethyl,
(tert-butylamido)(tetramethyl-$\eta^5$-indenyl)dimethylsilanetitanium dimethyl,
(tert-butylamido)(tetramethyl-$\eta^5$-cyclopentadienyl)dimethylsilane titanium (III) 2-(dimethylamino)benzyl;
(tert-butylamido)(tetramethyl-$\eta^5$-cyclopentadienyl)dimethylsilanetitanium (III) allyl,
(tert-butylamido)(tetramethyl-$\eta^5$-cyclopentadienyl)dimethylsilanetitanium (III) 2,4-dimethylpentadienyl,
(tert-butylamido)(tetramethyl-$\eta^5$-cyclopentadienyl)dimethylsilanetitanium (II) 1,4-diphenyl-1,3-butadiene,
(tert-butylamido)(tetramethyl-$\eta^5$-cyclopentadienyl)dimethylsilanetitanium (II) 1,3-pentadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (II) 2,4-hexadiene,
(tert-butylamido)(2-methylindenyl)dimethylsilanetitanium (IV) 2,3-dimethyl-1,3-butadiene,
(tert-butylamido)(2-methylindenyl)dimethylsilanetitanium (IV) isoprene,
(tert-butylamido)(2-methylindenyl)dimethylsilanetitanium (IV) 1,3-butadiene,
(tert-butylamido)(2,3-dimethylindenyl)dimethylsilanetitanium (IV) 2,3-dimethyl-1,3-butadiene,
(tert-butylamido)(2,3-dimethylindenyl)dimethylsilanetitanium (IV) isoprene,
(tert-butylamido)(2,3-dimethylindenyl)dimethylsilanetitanium (IV) dimethyl,
(tert-butylamido)(2,3-dimethylindenyl)dimethylsilanetitanium (IV) dibenzyl,
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadiene,
(tert-butylamido)(2,3-dimethylindenyl)dimethylsilanetitanium (II) 1,4-diphenyl-1,3-butadiene,
(tert-butylamido)(2-methylindenyl)dimethylsilanetitanium (II) 1,3-pentadiene,
(tert-butylamido)(2-methylindenyl)dimethylsilanetitanium (IV) dimethyl, (tert-butylamido)(2-methylindenyl)dimethylsilanetitanium (IV) dibenzyl,
(tert-butylamido)(2-methyl-4-phenylindenyl)dimethylsilanetitanium (II) 1,4-diphenyl-1,3-butadiene,
(tert-butylamido)(2-methyl-4-phenylindenyl)dimethylsilanetitanium (II) 1,3-pentadiene,
(tert-butylamido)(2-methyl-4-phenylindenyl)dimethylsilanetitanium (II) 2,4-hexadiene,
(tert-butylamido)(tetramethyl-$\eta^5$-cyclopentadienyl)dimethyl-silanetitanium (IV) 1,3-butadiene,
(tert-butylamido)(tetramethyl-$\eta^5$-cyclopentadienyl)dimethylsilanetitanium (IV) 2,3-dimethyl-1,3-butadiene,
(tert-butylamido)(tetramethyl-$\eta^5$-cyclopentadienyl)dimethylsilanetitanium (IV) isoprene,
(tert-butylamido)(tetramethyl-$\eta^5$-cyclopentadienyl)dimethyl-silanetitanium (II) 1,4-dibenzyl-1,3-butadiene,
(tert-butylamido)(tetramethyl-$\eta^5$-cyclopentadienyl)dimethylsilanetitanium (II) 2,4-hexadiene,
(tert-butylamido)(tetramethyl-$\eta^5$-cyclopentadienyl)dimethyl-silanetitanium (II) 3-methyl-1,3-pentadiene,
(tert-butylamido)(2,4-dimethylpentadien-3-yl)dimethylsilanetitaniumdimethyl,
(tert-butylamido)(6,6-dimethylcyclohexadienyl)dimethylsilanetitaniumdimethyl,
(tert-butylamido)(1,1-dimethyl-2,3,4,9,10-$\eta$-1,4,5,6,7,8-hexahydronaphthalen-4-yl)dimethylsilanetitaniumdimethyl,
(tert-butylamido)(1,1,2,3-tetramethyl-2,3,4,9,10-$\eta$-1,4,5,6,7,8-hexahydronaphthalen-4-yl)dimethylsilanetitaniumdimethyl,
(tert-butylamido)(tetramethyl-$\eta^5$-cyclopentadienyl methylphenylsilanetitanium (IV) dimethyl,
(tert-butylamido)(tetramethyl-$\eta^5$-cyclopentadienyl methylphenylsilanetitanium (II) 1,4-diphenyl-1,3-butadiene,
1-(tert-butylamido)-2-(tetramethyl-$\eta^5$-cyclopentadienyl) ethanediyltitanium (IV) dimethyl, and
1-(tert-butylamido)-2-(tetramethyl-$\eta^5$-cyclopentadienyl) ethanediyl-titanium (II) 1,4-diphenyl-1,3-butadiene.

Other delocalized, $\pi$-bonded complexes, especially those containing other Group 4 metals, will, of course, be apparent to those skilled in the art, and are disclosed among other places in: WO 03/78480, WO 03/78483, WO 02/92610, WO 02/02577, US 2003/0004286 and U.S. Pat. Nos. 6,515,155, 6,555,634, 6,150,297, 6,034,022, 6,268,444, 6,015,868, 5,866,704, and 5,470,993.

Additional examples of metal complexes that are usefully employed as catalysts are complexes of polyvalent Lewis bases, such as compounds corresponding to the formula:

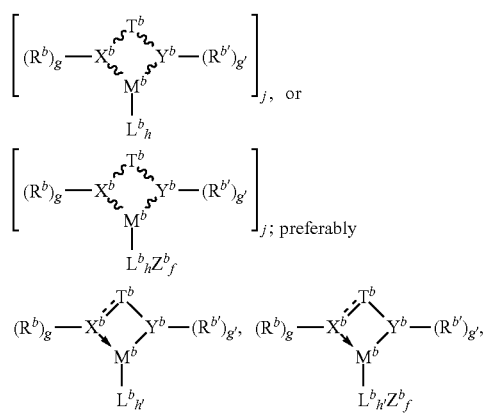

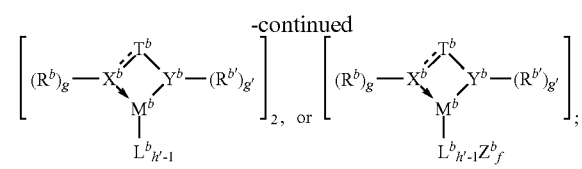

wherein $T^b$ is a bridging group, preferably containing 2 or more atoms other than hydrogen, $X^b$ and $Y^b$ are each independently selected from the group consisting of nitrogen, sulfur, oxygen and phosphorus; more preferably both $X^b$ and $Y^b$ are nitrogen, $R^b$ and $R^{b'}$ independently each occurrence are hydrogen or C-so hydrocarbyl groups optionally containing one or more heteroatoms or inertly substituted derivative thereof. Non-limiting examples of suitable $R^b$ and $R^{b'}$ groups include alkyl, alkenyl, aryl, aralkyl, (poly)alkylaryl and cycloalkyl groups, as well as nitrogen, phosphorus, oxygen and halogen substituted derivatives thereof. Specific examples of suitable Rb and Rb' groups include methyl, ethyl, isopropyl, octyl, phenyl, 2,6-dimethylphenyl, 2,6-di(isopropyl)phenyl, 2,4,6-trimethylphenyl, pentafluorophenyl, 3,5-trifluoromethylphenyl, and benzyl;

g and g' are each independently 0 or 1;

$M^b$ is a metallic element selected from Groups 3 to 15, or the Lanthanide series of the Periodic Table of the Elements. Preferably, $M^b$ is a Group 3-13 metal, more preferably $M^b$ is a Group 4-10 metal;

$L^b$ is a monovalent, divalent, or trivalent anionic ligand containing from 1 to 50 atoms, not counting hydrogen. Examples of suitable $L^b$ groups include halide; hydride; hydrocarbyl, hydrocarbyloxy; di(hydrocarbyl)amido, hydrocarbyleneamido, di(hydrocarbyl)phosphido; hydrocarbylsulfido; hydrocarbyloxy, tri(hydrocarbylsilyl)alkyl; and carboxylates. More preferred $L^b$ groups are C1-20 alkyl, $C_{7\text{-}20}$ aralkyl, and chloride;

h and h' are each independently an integer from 1 to 6, preferably from 1 to 4, more preferably from 1 to 3, and j is 1 or 2, with the value h×j selected to provide charge balance;

$Z^b$ is a neutral ligand group coordinated to $M^b$, and containing up to 50 atoms not counting hydrogen. Preferred $Z^b$ groups include aliphatic and aromatic amines, phosphines, and ethers, alkenes, alkadienes, and inertly substituted derivatives thereof. Suitable inert substituents include halogen, alkoxy, aryloxy, alkoxycarbonyl, aryloxycarbonyl, di(hydrocarbyl)amine, tri(hydrocarbyl)silyl, and nitrile groups. Preferred $Z^b$ groups include triphenylphosphine, tetrahydrofuran, pyridine, and 1,4-diphenylbutadiene;

f is an integer from 1 to 3;

two or three of $T^b$, $R^b$ and $R^{b'}$ may be joined together to form a single or multiple ring structure;

h is an integer from 1 to 6, preferably from 1 to 4, more preferably from 1 to 3;

⁓ indicates any form of electronic interaction, especially coordinate or covalent bonds, including multiple bonds, arrows signify coordinate bonds, and dotted lines indicate optional double bonds.

In one embodiment, it is preferred that $R^b$ have relatively low steric hindrance with respect to $X^b$. In this embodiment, most preferred $R^b$ groups are straight chain alkyl groups, straight chain alkenyl groups, branched chain alkyl groups wherein the closest branching point is at least 3 atoms removed from $X^b$, and halo, dihydrocarbylamino, alkoxy or trihydrocarbylsilyl substituted derivatives thereof. Highly preferred $R^b$ groups in this embodiment are C1-8 straight chain alkyl groups.

At the same time, in this embodiment $R^{b'}$ preferably has relatively high steric hindrance with respect to $Y^b$. Non-limiting examples of suitable $R^{b'}$ groups for this embodiment include alkyl or alkenyl groups containing one or more secondary or tertiary carbon centers, cycloalkyl, aryl, alkaryl, aliphatic or aromatic heterocyclic groups, organic or inorganic oligomeric, polymeric or cyclic groups, and halo, dihydrocarbylamino, alkoxy or trihydrocarbylsilyl substituted derivatives thereof. Preferred $R^{b'}$ groups in this embodiment contain from 3 to 40, more preferably from 3 to 30, and most preferably from 4 to 20 atoms not counting hydrogen and are branched or cyclic. Examples of preferred $T^b$ groups are structures corresponding to the following formulas:

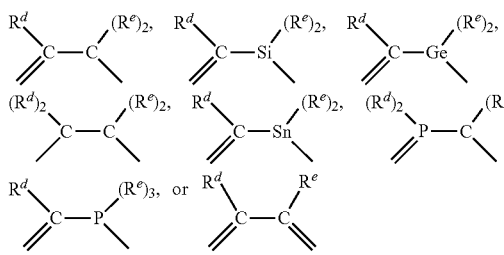

wherein

Each $R^d$ is C1-10 hydrocarbyl group, preferably methyl, ethyl, n-propyl, i-propyl, t-butyl, phenyl, 2,6-dimethylphenyl, benzyl, or tolyl. Each $R^e$ is C1-10 hydrocarbyl, preferably methyl, ethyl, n-propyl, i-propyl, t-butyl, phenyl, 2,6-dimethylphenyl, benzyl, or tolyl. In addition, two or more $R^d$ or $R^e$ groups, or mixtures of Rd and Re groups may together form a polyvalent derivative of a hydrocarbyl group, such as, 1,4-butylene, 1,5-pentylene, or a multicyclic, fused ring, polyvalent hydrocarbyl- or heterohydrocarbyl-group, such as naphthalene-1,8-diyl.

Suitable examples of the foregoing polyvalent Lewis base complexes include:

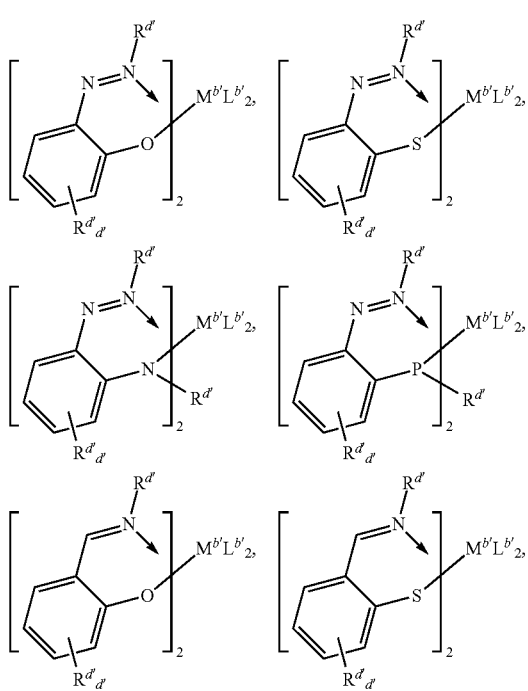

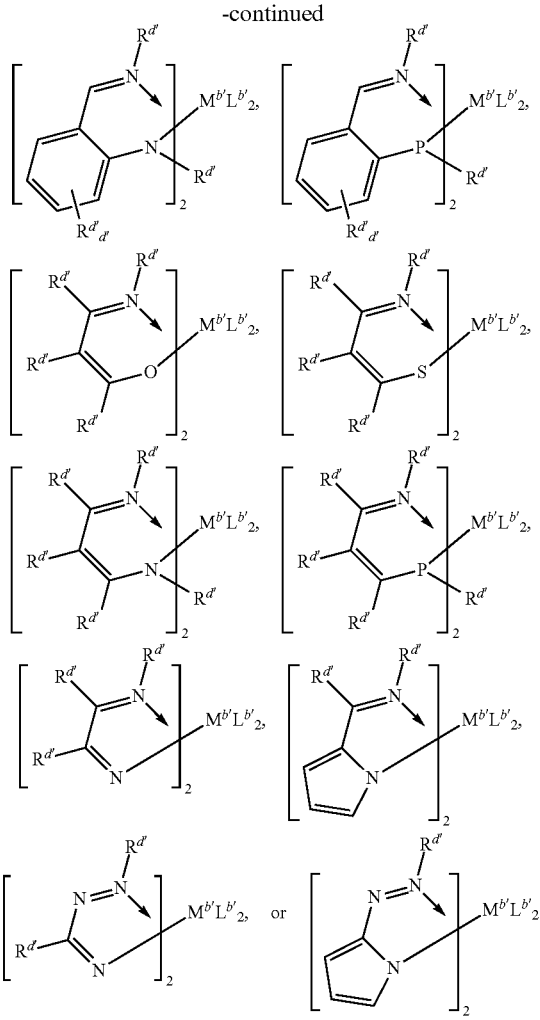

wherein $R^{d'}$ at each occurrence is independently selected from the group consisting of hydrogen and C1-50 hydrocarbyl groups optionally containing one or more heteroatoms, or inertly substituted derivative thereof, or further optionally, two adjacent $R^{d'}$ groups may together form a divalent bridging group;

d' is 4;

$M^{b'}$ is a Group 4 metal, preferably titanium or hafnium, or a Group 10 metal, preferably Ni or Pd;

$L^{b'}$ is a monovalent ligand of up to 50 atoms not counting hydrogen, preferably halide or hydrocarbyl, or two $L^{b'}$ groups together are a divalent or neutral ligand group, preferably a $C_{2-50}$ hydrocarbylene, hydrocarbadiyl or diene group.

The polyvalent Lewis base complexes for use in the present invention especially include Group 4 metal derivatives, especially hafnium derivatives of hydrocarbylamine substituted heteroaryl compounds corresponding to the formula:

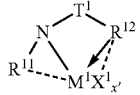

wherein:

R$^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

T$^1$ is a divalent bridging group of from 1 to 41 atoms other than hydrogen, preferably 1 to 20 atoms other than hydrogen, and most preferably a mono- or di-C1-20 hydrocarbyl substituted methylene or silane group; and R$^{12}$ is a C$_{5-20}$ heteroaryl group containing Lewis base functionality, especially a pyridin-2-yl- or substituted pyridin-2-yl group or a divalent derivative thereof;

M$^1$ is a Group 4 metal, preferably hafnium;

X$^1$ is an anionic, neutral or dianionic ligand group;

x' is a number from 0 to 5 indicating the number of such X$^1$ groups; and bonds, optional bonds and electron donative interactions are represented by lines, dotted lines and arrows respectively.

Suitable complexes are those wherein ligand formation results from hydrogen elimination from the amine group and optionally from the loss of one or more additional groups, especially from R$^{12}$. In addition, electron donation from the Lewis base functionality, preferably an electron pair, provides additional stability to the metal center. Suitable metal complexes correspond to the formula:

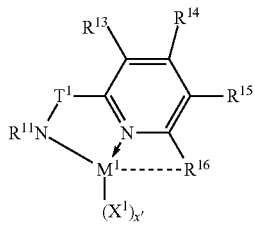

wherein M$^1$, X$^1$, x', R$^{11}$ and T$^1$ are as previously defined,

R$^{13}$, R$^{14}$, R$^{15}$ and R$^{16}$ are hydrogen, halo, or an alkyl, cycloalkyl, heteroalkyl, heterocycloalkyl, aryl, or silyl group of up to 20 atoms not counting hydrogen, or adjacent R$^{13}$, R$^{14}$, R$^{15}$ or R$^{16}$ groups may be joined together thereby forming fused ring derivatives, and bonds, optional bonds and electron pair donative interactions are represented by lines, dotted lines and arrows respectively. Suitable examples of the foregoing metal complexes correspond to the formula:

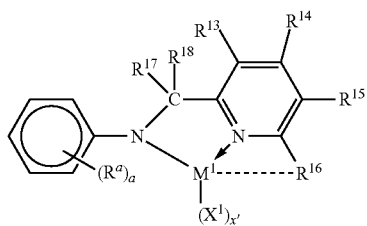

wherein

M$^1$, X$^1$, and x' are as previously defined,

R$^{13}$, R$^{14}$, R$^{15}$ and R$^{16}$ are as previously defined, preferably R$^{13}$, R$^{14}$, and R$^{15}$ are hydrogen, or C1-4 alkyl, and R$^{16}$ is C$_{6-20}$ aryl, most preferably naphthalenyl;

R$^a$ independently at each occurrence is C$_{1-4}$ alkyl, and a is 1-5, most preferably R$^a$ in two ortho-positions to the nitrogen is isopropyl or t-butyl;

R$^{17}$ and R$^{18}$ independently at each occurrence are hydrogen, halogen, or a C$_{1-20}$ alkyl or aryl group, most preferably one of R$^{17}$ and R$^{18}$ is hydrogen and the other is a C6-20 aryl group, especially 2-isopropyl, phenyl or a fused polycyclic aryl group, most preferably an anthracenyl group, and bonds, optional bonds and electron pair donative interactions are represented by lines, dotted lines and arrows respectively.

Exemplary metal complexes for use herein as catalysts correspond to the formula:

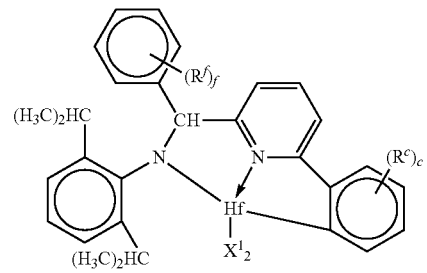

wherein X$^1$ at each occurrence is halide, N,N-dimethylamido, or C$_{1-4}$ alkyl, and preferably at each occurrence X$^1$ is methyl;

R$^f$ independently at each occurrence is hydrogen, halogen, C1-20 alkyl, or C6-20 aryl, or two adjacent R$^f$ groups are joined together thereby forming a ring, and f is 1-5; and R$^c$ independently at each occurrence is hydrogen, halogen, C$_{1-20}$ alkyl, or C$_{6-20}$ aryl, or two adjacent R$^c$ groups are joined together thereby forming a ring, and c is 1-5.

Suitable examples of metal complexes for use as catalysts according to the present invention are complexes of the following formulas:

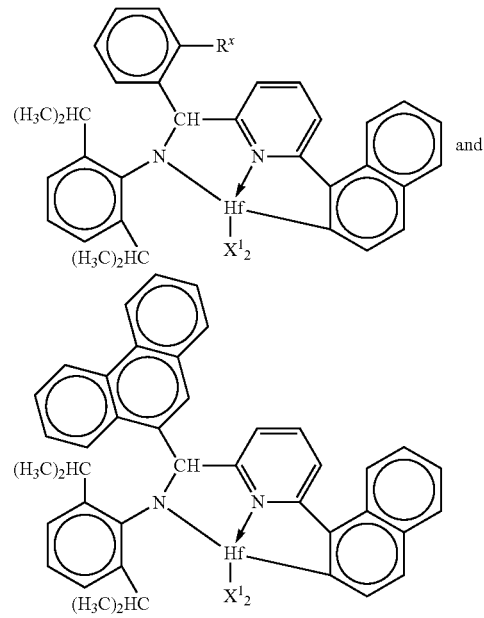

wherein R$^x$ is C1-4 alkyl or cycloalkyl, preferably methyl, isopropyl, t-butyl or cyclohexyl; and X$^1$ at each occurrence is halide, N,N-dimethylamido, or C1-4 alkyl, preferably methyl.

Examples of metal complexes usefully employed as catalysts according to the present invention include:

[N-(2,6-di(1-methylethyl)phenyl)amido)(o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido)(o-tolyl)((α-naphthalen-2-diyl(6-pyridin-2-diyl)methane)]hafnium dichloride;

[N-(2,6-di(1-methylethyl)phenyl)amido)(2-isopropylphenyl)(α-naphthalen-2-diyl(6-pyridin-2-diyl)methane)]hafnium dimethyl;

[N-(2,6-di(1-methylethyl)phenyl)amido)(2-isopropylphenyl)(α-naphthalen-2-diyl(6-pyridin-2-diyl)methane)]hafnium di(N,N-dimethylamido);

[N-(2,6-di(1-methylethyl)phenyl)amido)(2-isopropylphenyl)(α-naphthalen-2-diyl(6-pyridin-2-diyl)methane)]hafnium dichloride;

[N-(2,6-di(1-methylethyl)phenyl)amido)(phenanthren-5-yl)(α-naphthalen-2-diyl(6-pyridin-2-diyl)methane)]hafnium dimethyl;

[N-(2,6-di(1-methylethyl)phenyl)amido)(phenanthren-5-yl)(α-naphthalen-2-diyl(6-pyridin-2-diyl)methane)]hafnium di(N,N-dimethylamido); and

[N-(2,6-di(1-methylethyl)phenyl)amido)(phenanthren-5-yl)(α-naphthalen-2-diyl(6-pyridin-2-diyl)methane)]hafnium dichloride.

Under the reaction conditions used to prepare the metal complexes used in the present disclosure, the hydrogen of the 2-position of the α-naphthalene group substituted at the 6-position of the pyridin-2-yl group is subject to elimination, thereby uniquely forming metal complexes wherein the metal is covalently bonded to both the resulting amide group and to the 2-position of the α-naphthalenyl group, as well as stabilized by coordination to the pyridinyl nitrogen atom through the electron pair of the nitrogen atom.

Additional suitable metal complexes of polyvalent Lewis bases for use herein include compounds corresponding to the formula:

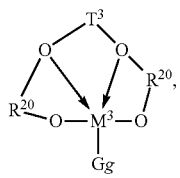

wherein:

$R^{20}$ is an aromatic or inertly substituted aromatic group containing from 5 to 20 atoms not counting hydrogen, or a polyvalent derivative thereof;

$T^3$ is a hydrocarbylene or hydrocarbyl silane group having from 1 to 20 atoms not counting hydrogen, or an inertly substituted derivative thereof;

$M^3$ is a Group 4 metal, preferably zirconium or hafnium;

G is an anionic, neutral or dianionic ligand group; preferably a halide, hydrocarbyl, silane, trihydrocarbylsilylhydrocarbyl, trihydrocarbylsilyl, or dihydrocarbylamide group having up to 20 atoms not counting hydrogen;

g is a number from 1 to 5 indicating the number of such G groups; and bonds and electron donative interactions are represented by lines and arrows respectively.

Illustratively, such complexes correspond to the formula:

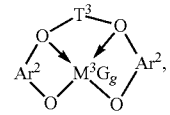

wherein:

$T^3$ is a divalent bridging group of from 2 to 20 atoms not counting hydrogen, preferably a substituted or unsubstituted, C3-6 alkylene group;

and $Ar^2$ independently at each occurrence is an arylene or an alkyl- or aryl-substituted arylene group of from 6 to 20 atoms not counting hydrogen;

$M^3$ is a Group 4 metal, preferably hafnium or zirconium;

G independently at each occurrence is an anionic, neutral or dianionic ligand group;

g is a number from 1 to 5 indicating the number of such X groups; and electron donative interactions are represented by arrows.

Suitable examples of metal complexes of foregoing formula include the following compounds

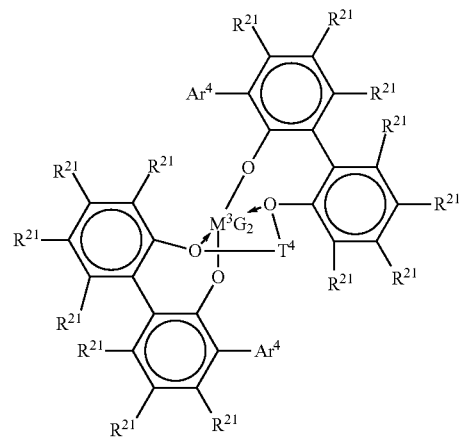

where $M^3$ is Hf or Zr;

$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently at each occurrence comprises a $C_{3-6}$ alkylene group, a $C_{3-6}$ cycloalkylene group, or an inertly substituted derivative thereof;

$R^{21}$ independently at each occurrence is hydrogen, halo, hydrocarbyl, trihydrocarbylsilyl, or trihydrocarbylsilylhydrocarbyl of up to 50 atoms not counting hydrogen; and G, independently at each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Suitable compounds are compounds of the formulas:

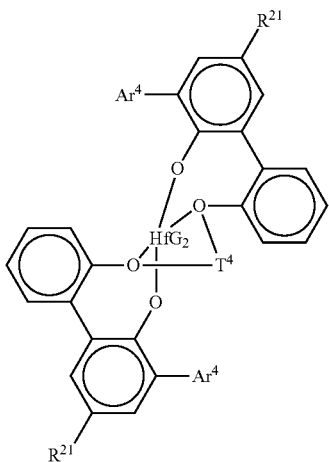

wherein Ar$^4$ is 3,5-di(isopropyl)phenyl, 3,5-di(isobutyl)phenyl, dibenzo-1H-pyrrole-1-yl, or anthracen-5-yl, R$^{21}$ is hydrogen, halo, or C1-4 alkyl, especially methyl T$^4$ is propan-1,3-diyl or butan-1,4-diyl, and G is chloro, methyl or benzyl.

An exemplary metal complex of the foregoing formula is:

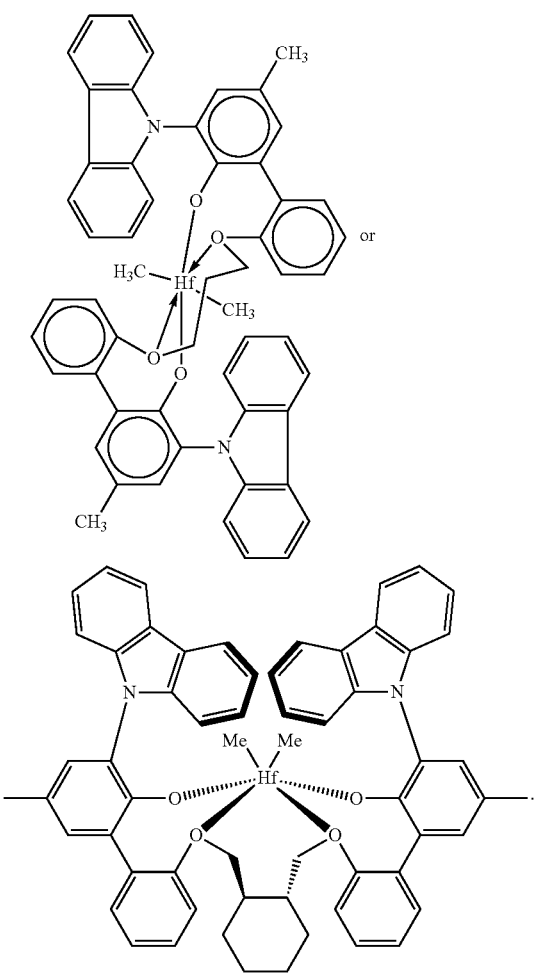

Suitable metal complexes for use according to the present disclosure further include compounds corresponding to the formula:

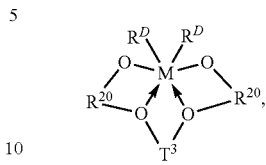

where:

M is zirconium or hafnium;

R$^{20}$ independently at each occurrence is a divalent aromatic or inertly substituted aromatic group containing from 5 to 20 atoms not counting hydrogen;

T$^3$ is a divalent hydrocarbon or silane group having from 3 to 20 atoms not counting hydrogen, or an inertly substituted derivative thereof; and R$^D$ independently at each occurrence is a monovalent ligand group of from 1 to 20 atoms, not counting hydrogen, or two R$^D$ groups together are a divalent ligand group of from 1 to 20 atoms, not counting hydrogen.

Such complexes may correspond to the formula:

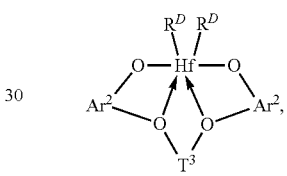

wherein:

Ar$^2$ independently at each occurrence is an arylene or an alkyl-, aryl-, alkoxy- or amino-substituted arylene group of from 6 to 20 atoms not counting hydrogen or any atoms of any substituent;

T$^3$ is a divalent hydrocarbon bridging group of from 3 to 20 atoms not counting hydrogen, preferably a divalent substituted or unsubstituted C$_{3-6}$ aliphatic, cycloaliphatic, or bis(alkylene)-substituted cycloaliphatic group having at least 3 carbon atoms separating oxygen atoms; and R$^D$ independently at each occurrence is a monovalent ligand group of from 1 to 20 atoms, not counting hydrogen, or two R$^D$ groups together are a divalent ligand group of from 1 to 40 atoms, not counting hydrogen.

Further examples of metal complexes suitable for use herein include compounds of the formula:

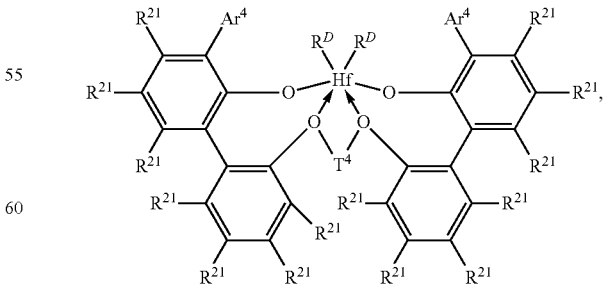

where

Ar$^4$ independently at each occurrence is C$_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl;

$T^4$ independently at each occurrence is a propylene-1,3-diyl group, a bis(alkylene)cyclohexan-1,2-diyl group, or an inertly substituted derivative thereof substituted with from 1 to 5 alkyl, aryl or aralkyl substituents having up to 20 carbons each;

$R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen; and $R^D$, independently at each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

Exemplary metal complexes are compounds of the formula:

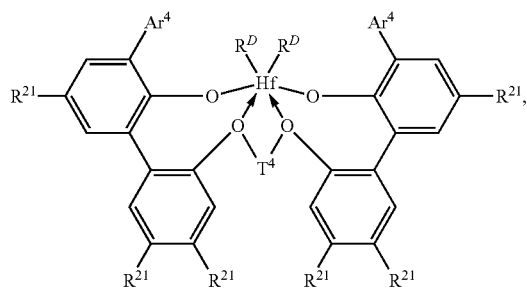

where, $Ar^4$, independently at each occurrence, is 3,5-di(isopropyl)phenyl, 3,5-di(isobutyl)phenyl, dibenzo-1H-pyrrole-1-yl, or anthracen-5-yl, $R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen;

$T^4$ is propan-1,3-diyl or bis(methylene)cyclohexan-1,2-diyl; and $R^D$, independently at each occurrence is halo or a hydrocarbyl or trihydrocarbylsilyl group of up to 20 atoms not counting hydrogen, or 2 $R^D$ groups together are a hydrocarbylene, hydrocarbadiyl or hydrocarbylsilanediyl group of up to 40 atoms not counting hydrogen.

Suitable metal complexes according to the present disclosure correspond to the formulas:

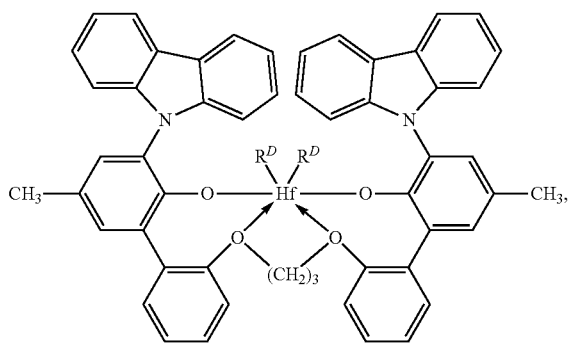

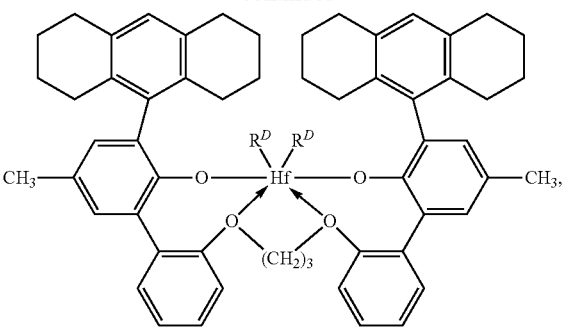

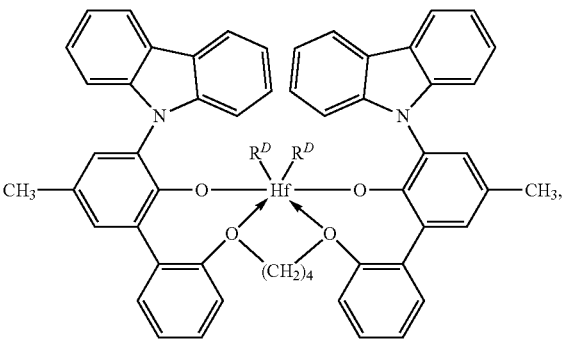

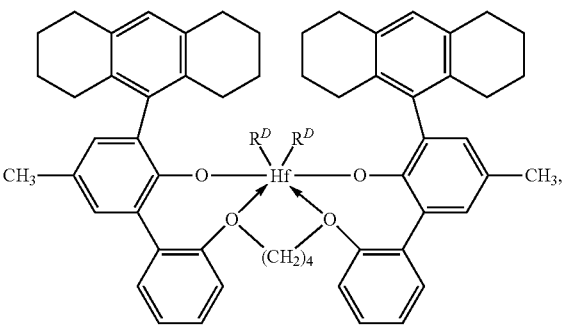

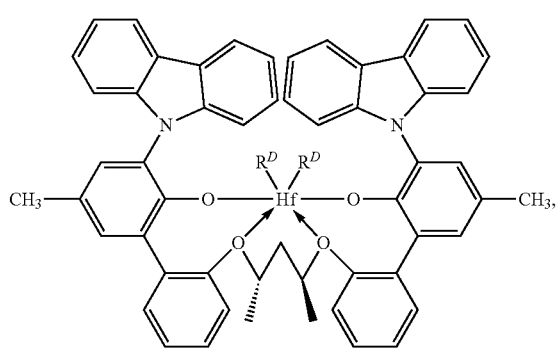

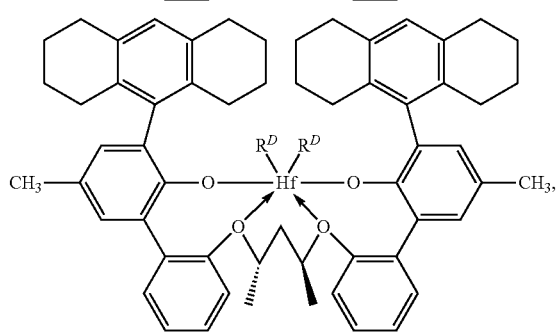

-continued

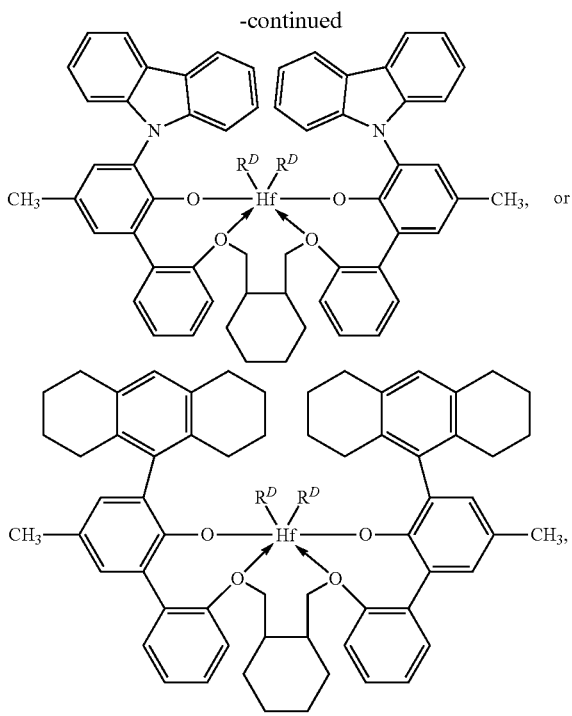

wherein, R independently at each occurrence is chloro, methyl or benzyl.

Specific examples of suitable metal complexes are the following compounds:

A) bis((2-oxoyl-3-(1,2,3,4,6,7,8,9-octahydroanthracen-5-yl)-5-(methyl)phenyl)-2-phenoxy)-1,3-propanediylhafnium (IV) dimethyl,
bis((2-oxoyl-3-(1,2,3,4,6,7,8,9-octahydroanthracen-5-yl)-5-(methyl)phenyl)-2-phenoxy)-1,3-propanediylhafnium (IV) dichloride,
bis((2-oxoyl-3-(1,2,3,4,6,7,8,9-octahydroanthracen-5-yl)-5-(methyl)phenyl)-2-phenoxy)-1,3-propanediylhafnium (IV) dibenzyl,
bis((2-oxoyl-3-(dibenzo-1H-pyrrole-1-yl)-5-(methyl)phenyl)-2-phenoxy)-1,3-propanediylhafnium (IV) dimethyl,
bis((2-oxoyl-3-(dibenzo-1H-pyrrole-1-yl)-5-(methyl)phenyl)-2-phenoxy)-1,3-propanediylhafnium (IV) dichloride,
bis((2-oxoyl-3-(dibenzo-1H-pyrrole-1-yl)-5-(methyl)phenyl)-2-phenoxy)-1,3-propanediylhafnium (IV) dibenzyl, B) bis((2-oxoyl-3-(1,2,3,4,6,7,8,9-octahydroanthracen-5-yl)-5-(methyl)phenyl)-2-phenoxymethyl)-1,4-butanediylhafnium (IV) dimethyl,
bis((2-oxoyl-3-(1,2,3,4,6,7,8,9-octahydroanthracen-5-yl)-5-(methyl)phenyl)-2-phenoxymethyl)-1,4-butanediylhafnium (IV) dichloride,
bis((2-oxoyl-3-(1,2,3,4,6,7,8,9-octahydroanthracen-5-yl)-5-(methyl)phenyl)-2-phenoxymethyl)-1,4-butanediylhafnium (IV) dibenzyl,
bis((2-oxoyl-3-(dibenzo-1H-pyrrole-1-yl)-5-(methyl)phenyl)-2-phenoxymethyl)-1,4-butanediylhafnium (IV) dimethyl,
bis((2-oxoyl-3-(dibenzo-1H-pyrrole-1-yl)-5-(methyl)phenyl)-2-phenoxymethyl)-1,4-butanediylhafnium (IV) dichloride,
bis((2-oxoyl-3-(dibenzo-1H-pyrrole-1-yl)-5-(methyl)phenyl)-2-phenoxymethyl)-1,4-butanediylhafnium (IV) dibenzyl, C) bis((2-oxoyl-3-(1,2,3,4,6,7,8,9-octahydroanthracen-5-yl)-5-(methyl)phenyl)-2-phenoxy)-2,4-pentanediylhafnium (IV) dimethyl,
bis((2-oxoyl-3-(1,2,3,4,6,7,8,9-octahydroanthracen-5-yl)-5-(methyl)phenyl)-2-phenoxy)-2,4-pentanediylhafnium (IV) dichloride,
bis((2-oxoyl-3-(1,2,3,4,6,7,8,9-octahydroanthracen-5-yl)-5-(methyl)phenyl)-2-phenoxy)-2,4-pentanediylhafnium (IV) dibenzyl,
bis((2-oxoyl-3-(dibenzo-1H-pyrrole-1-yl)-5-(methyl)phenyl)-2-phenoxy)-2,4-pentanediylhafnium (IV) dimethyl,
bis((2-oxoyl-3-(dibenzo-1H-pyrrole-1-yl)-5-(methyl)phenyl)-2-phenoxy)-2,4-pentanediylhafnium (IV) dichloride,
bis((2-oxoyl-3-(dibenzo-1H-pyrrole-1-yl)-5-(methyl)phenyl)-2-phenoxy)-2,4-pentanediylhafnium (IV) dibenzyl, D) bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dimethyl,
bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dichloride,
bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dibenzyl,
bis((2-oxoyl-3-(dibenzo-1H-pyrrole-1-yl)-5-(methyl)phenyl)-2-phenoxymethyl)-methylenetrans-1,2-cyclohexanediylhafnium (IV) dimethyl,
bis((2-oxoyl-3-(dibenzo-1H-pyrrole-1-yl)-5-(methyl)phenyl)-2-phenoxymethyl)-methylenetrans-1,2-cyclohexanediylhafnium (IV) dichloride, and
bis((2-oxoyl-3-(dibenzo-1H-pyrrole-1-yl)-5-(methyl)phenyl)-2-phenoxymethyl)-methylenetrans-1,2-cyclohexanediylhafnium (IV) dibenzyl.

The foregoing metal complexes may be conveniently prepared by standard metalation and ligand exchange procedures involving a source of the transition metal and a neutral polyfunctional ligand source. The techniques employed are the same as or analogous to those disclosed in U.S. Pat. No. 6,827,976 and US2004/0010103, and elsewhere.

The metal complex is activated to form the active catalyst composition by combination with the cocatalyst. The activation may occur prior to addition of the catalyst composition to the reactor with or without the presence of other components of the reaction mixture, or in situ through separate addition of the metal complex and activating cocatalyst to the reactor.

The foregoing polyvalent Lewis base complexes are conveniently prepared by standard metalation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, WO 02/38628, WO 03/40195, and U.S. Ser. No. 04/022,0050.

Catalysts having high comonomer incorporation properties are also known to reincorporate in situ prepared long chain olefins resulting incidentally during the polymerization through β-hydride elimination and chain termination of growing polymer, or other process. The concentration of such long chain olefins is particularly enhanced by use of continuous solution polymerization conditions at high conversions, especially ethylene conversions of 95 percent or greater, more preferably at ethylene conversions of 97 percent or greater. Under such conditions a small but detectable quantity of olefin terminated polymer may be reincorporated into a growing polymer chain, resulting in the formation of long chain branches, that is, branches of a carbon length greater than would result from other deliberately added comonomer. Moreover, such chains reflect the presence of other comonomers present in the reaction mixture. That is, the chains may include short chain or long chain branching as well, depending on the comonomer composition of the reaction mixture. Long chain branching of olefin polymers is further described in U.S. Pat. Nos. 5,272,236, 5,278,272, and 5,665,800.

Alternatively, branching, including hyper-branching, may be induced in a particular segment of the present multi-block copolymers by the use of specific catalysts known to result in "chain-walking" in the resulting polymer. For example, certain homogeneous bridged bis indenyl- or partially hydrogenated bis indenyl-zirconium catalysts, disclosed by Kaminski, et al., *J. Mol. Catal. A: Chemical*, 102 (1995) 59-65; Zambelli, et al., *Macromolecules*, 1988, 21, 617-622; or Dias, et al., *J. Mol. Catal. A: Chemical*, 185 (2002) 57-64 may be used to prepare branched copolymers from single monomers, including ethylene. Higher transition metal catalysts, especially nickel and palladium catalysts are also known to lead to hyper-branched polymers (the branches of which are also branched) as disclosed in Brookhart, et al., *J. Am. Chem. Soc.*, 1995, 117, 64145-6415.

Additional complexes suitable for use include Group 4-10 derivatives corresponding to the formula:

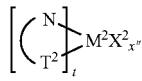

wherein $M^2$ is a metal of Groups 4-10 of the Periodic Table of the elements, preferably Group 4 metals, Ni(II) or Pd(II), most preferably zirconium;

$T^2$ is a nitrogen, oxygen or phosphorus containing group;

$X^2$ is halo, hydrocarbyl, or hydrocarbyloxy;

t is one or two;

x" is a number selected to provide charge balance;

and $T^2$ and N are linked by a bridging ligand.

Such catalysts have been previously disclosed in *J. Am. Chem. Soc.*, 118, 267-268 (1996), *J. Am. Chem. Soc.*, 117, 6414-6415 (1995), and *Organometallics*, 16, 1514-1516, (1997), among other disclosures.

Suitable examples of the foregoing metal complexes for use as catalysts are aromatic diimine or aromatic dioxyimine complexes of Group 4 metals, especially zirconium, corresponding to the formula:

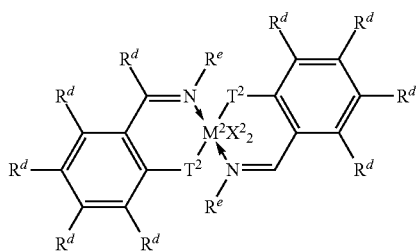

wherein;

$M^2$, $X^2$ and $T^2$ are as previously defined;

$R^d$ independently in each occurrence is hydrogen, halogen, or $R^e$; and $R^e$ independently in each occurrence is C1-20 hydrocarbyl or a heteroatom-, especially a F, N, S or P-substituted derivative thereof, more preferably C1-20 hydrocarbyl or a F or N substituted derivative thereof, most preferably alkyl, dialkylaminoalkyl, pyrrolyl, piperidenyl, perfluorophenyl, cycloalkyl, (poly)alkylaryl, or aralkyl.

Suitable examples of the foregoing metal complexes for use as catalysts are aromatic dioxyimine complexes of zirconium, corresponding to the formula:

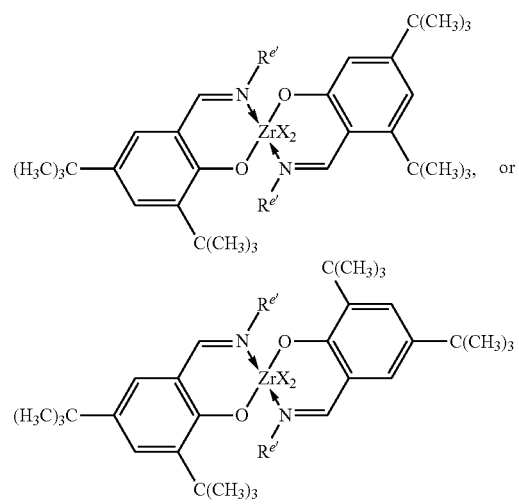

wherein;

$X^2$ is as previously defined, preferably C1-10 hydrocarbyl, most preferably methyl or benzyl; and $R^{e'}$ is methyl, isopropyl, t-butyl, cyclopentyl, cyclohexyl, 2-methylcyclohexyl, 2,4-dimethylcyclohexyl, 2-pyrrolyl, N-methyl-2-pyrrolyl, 2-piperidenyl, N-methyl-2-piperidenyl, benzyl, o-tolyl, 2,6-dimethylphenyl, perfluorophenyl, 2,6-di(isopropyl)phenyl, or 2,4,6-trimethylphenyl.

The foregoing complexes for use as also include certain phosphinimine complexes are disclosed in EP-A-890581. These complexes correspond to the formula: $[(R^f)_3—P=N]_f M(K^2)(R^f)_{3-f}$ wherein: $R^f$ is a monovalent ligand or two $R^f$ groups together are a divalent ligand, preferably $R^f$ is hydrogen or C1-4 alkyl;

M is a Group 4 metal, $K^2$ is a group containing delocalized π-electrons through which $K^2$ is bound to M, said $K^2$ group containing up to 50 atoms not counting hydrogen atoms, and f is 1 or 2.

With reference to the above discussion of the process for preparing the composition having the formula (I), the catalyst precursor (in combination with the co-catalyst) may remain active in the final solution and can further function as an active catalyst in-subsequent polymerization. Accordingly, the final solution of the process of the present disclosure (the final solution comprising the catalyst and the composition having the formula (I)) can be directly used for olefin polymerization without any isolation, purification, or separation requirements and without the requirement of having a removable supported catalyst.

Exemplary, non-limiting catalyst precursors for the present disclosure include any catalyst having good chain transfer ability with organometallic compounds. Exemplary, non-limiting catalyst precursors should have no detrimental effect on subsequent polymerization and, therefore, need not be removed from the final solution prior to olefin polymerization. Exemplary, non-limiting catalyst precursors may be good comonomer incorporating catalysts, can be used to make the compositions having the formula (I), and can also continue to remain active (in combination with co-catalyst) as active catalysts to make desired polymers in polymerization reactors, as discussed below.

Exemplary catalyst precursors that can be used in accordance with the present disclosure include but are not limited to Catalysts (A1)-(A7), as listed below.

Catalyst (A1): [N-(2,6-di(1-methylethyl)phenyl)amido)(2-isopropylphenyl)(α-naphthalen-2-diyl(6-pyridin-2-diyl)methane)]hafnium dimethyl] prepared according to the teachings of WO 03/40195 and WO 04/24740 as well as methods known in the art.

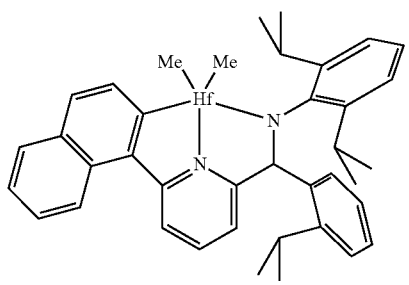

(A1)

Catalyst (A2): (E)-((2,6-diisopropylphenyl)(2-methyl-3-(octylimino)butan-2-yl)amino)trimethyl hafnium prepared according to methods known in the art.

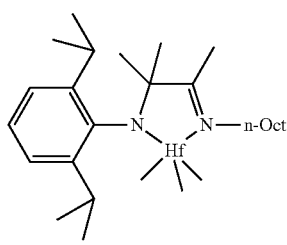

(A2)

Catalyst (A3): [[2',2'''-[1,2-cyclohexanediylbis(methyleneoxy-κO)]bis[3-(9H-carbazol-9-yl)-5-methyl[1,1'-biphenyl]-2-olato-κO]](2-)]dimethyl hafnium prepared according to methods known in the art.

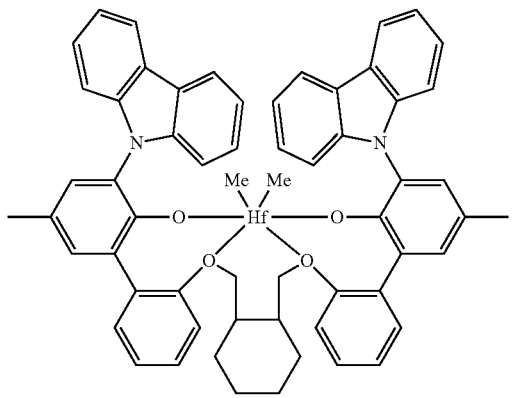

(A3)

Catalyst (A4): [[2',2'-[1,4-butanediylbis(oxy-κO)]bis[3-(9H-carbazol-9-yl)-3'-fluoro-5-methyl[1,1'-biphenyl]-2-olato-κO]](2-)]-dimethyl hafnium prepared according to methods known in the art.

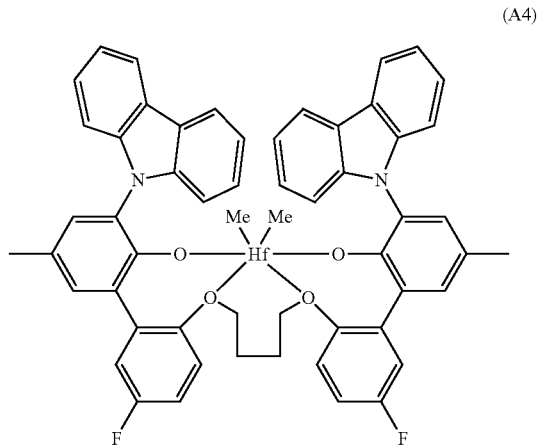

(A4)

Catalyst (A5): Cyclopentadienylbis((trimethylsilyl)methyl)scandium tetrahydrofuran complex prepared according to methods known in the art.

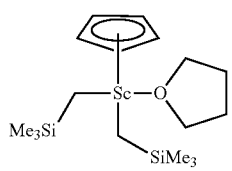

(A5)

Catalyst (A6): (Mesityl(pyridin-2-ylmethyl)amino)tribenzyl hafnium prepared according to methods known in the art.

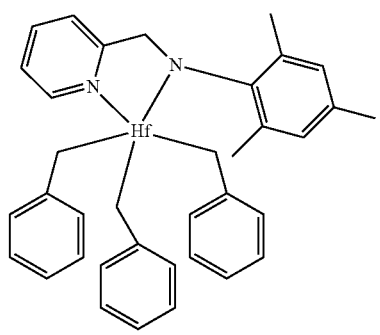

(A6)

Catalyst (A7): (N-((6E)-6-(Butylimino-κN)-1-cyclohexen-1-yl)-2,6-bis(1-methylethyl)benzenaminato-κN)trimethyl-hafnium prepared according to the disclosures of WO2010/022228 as well as methods known in the art.

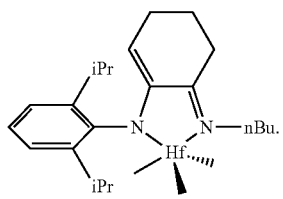

(A7)

Co-Catalyst

Each of the catalyst precursors of the present disclosure may be activated to form an active catalyst composition by combination with a co-catalyst, preferably a cation forming co-catalyst, a strong Lewis acid, or a combination thereof. Thus, this disclosure also provides for the use of at least one co-catalyst in a catalyst composition and various methods, along with at least one catalyst precursor, and the composition having the formula (I) as disclosed herein.

The catalyst precursors desirably are rendered catalytically active by combination with a cation forming cocatalyst. Suitable cation forming co-catalysts include those previously known in the art for metal olefin polymerization complexes. Examples include neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluoro-phenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, lead- or silver salts of compatible, noncoordinating anions; and combinations of the foregoing cation forming cocatalysts and techniques. The foregoing activating co-catalysts and activating techniques have been previously taught with respect to different metal complexes for olefin polymerizations in the following references: EP-A-277,003; U.S. Pat. Nos. 5,153,157; 5,064,802; 5,321,106; 5,721,185; 5,350,723; 5,425,872; 5,625,087; 5,883,204; 5,919,983; 5,783,512; WO 99/15534, and WO99/42467.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane may be used as activating cocatalysts. Exemplary molar ratios of metal complex:tris(pentafluorophenylborane:alumoxane are from 1:1:1 to 1:5:20, such as from 1:1:1.5 to 1:5:10.

Suitable ion forming compounds useful as co-catalysts in one embodiment of the present disclosure comprise a cation which is a Brønsted acid capable of donating a proton, and a compatible, noncoordinating anion, $A^-$. As used herein, the term "noncoordinating" refers to an anion or substance which either does not coordinate to the Group 4 metal containing precursor complex and the catalytic derivative derived there from, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Suitable anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

In one aspect, suitable cocatalysts may be represented by the following general formula:

$(L^*-H)_g^+(A)^{g-}$, wherein:

$L^*$ is a neutral Lewis base;
$(L^*-H)^+$ is a conjugate Brønsted acid of $L^*$;
$A^{g-}$ is a noncoordinating, compatible anion having a charge of g−, and g is an integer from 1 to 3.

More particularly, $A^{g-}$ corresponds to the formula: $[M'Q_4]^-$; wherein:

M' is boron or aluminum in the +3 formal oxidation state; and

Q independently in each occurrence is selected from hydride, dialkyl-amido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), each Q having up to 20 carbons with the proviso that in not more than one occurrence is Q halide. Examples of suitable hydrocarbyloxide Q groups are disclosed in U.S. Pat. No. 5,296,433.

In an exemplary embodiment, d is one, that is, the counter ion has a single negative charge and is $A^-$. Activating cocatalysts comprising boron which are particularly useful in the preparation of catalysts of this disclosure may be represented by the following general formula:

$(L^*-H)^+(BQ_4)^-$; wherein:

$L^*$ is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Especially useful Lewis base salts are ammonium salts, more preferably trialkyl-ammonium salts containing one or more $C_{12-40}$ alkyl groups. In this aspect, for example, Q in each occurrence can be a fluorinated aryl group, especially, a pentafluorophenyl group.

Illustrative, but not limiting, examples of boron compounds which may be used as an activating cocatalyst in the preparation of the improved catalysts of this disclosure include the tri-substituted ammonium salts such as:
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-dimethylanilinium n-butyltris(pentafluorophenyl)borate,
N,N-dimethylanilinium benzyltris(pentafluorophenyl)borate,
N,N-dimethylanilinium tetrakis(4-(t-butyldimethylsilyl)-2,3,5,6 tetrafluorophenyl)borate,
N,N-dimethylanilinium tetrakis(4-(triisopropylsilyl)-2,3,5,6-tetrafluorophenyl)borate,
N,N-dimethylanilinium pentafluorophenoxytris(pentafluorophenyl)borate,
N,N-diethylanilinium tetrakis(pentafluorophenyl)borate,
N,N-dimethyl-2,4,6-trimethylanilinium tetrakis(pentafluorophenyl)borate,
dimethyloctadecylammonium tetrakis(pentafluorophenyl)borate,
methyldioctadecylammonium tetrakis(pentafluorophenyl)borate;
a number of dialkyl ammonium salts such as:
di-(i-propyl)ammonium tetrakis(pentafluorophenyl)borate,
methyloctadecylammonium tetrakis(pentafluorophenyl)borate,
methyloctadodecylammonium tetrakis(pentafluorophenyl)borate, and
dioctadecylammonium tetrakis(pentafluorophenyl)borate;
various tri-substituted phosphonium salts such as:
triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate;
di-substituted oxonium salts such as:
diphenyloxonium tetrakis(pentafluorophenyl)borate,
di(o-tolyl)oxonium tetrakis(pentafluorophenyl)borate, and
di(octadecyl)oxonium tetrakis(pentafluorophenyl)borate; and
di-substituted sulfonium salts such as:
di(o-tolyl)sulfonium tetrakis(pentafluorophenyl)borate, and
methylcotadecylsulfonium tetrakis(pentafluorophenyl)borate.

Further to this aspect of the disclosure, examples of useful $(L^*-H)^+$ cations include, but are not limited to, methyldioctadecylammonium cations, dimethyloctadecylammonium cations, and ammonium cations derived from mixtures of trialkyl amines containing one or two $C_{14-18}$ alkyl groups.

Another suitable ion forming, activating cocatalyst comprises a salt of a cationic oxidizing agent and a noncoordinating, compatible anion represented by the formula:

$(Ox^{h+})_g(A^{g-})_h$, wherein:

$Ox^{h+}$ is a cationic oxidizing agent having a charge of h+;
h is an integer from 1 to 3; and
$A^{g-}$ and g are as previously defined.

Examples of cationic oxidizing agents include: ferrocenium, hydrocarbyl-substituted ferrocenium, $Ag^+$, or $Pb^{+2}$. Particularly useful examples of $A^{g-}$ are those anions previously defined with respect to the Bronsted acid containing activating cocatalysts, especially tetrakis(pentafluorophenyl)borate.

Another suitable ion forming, activating cocatalyst can be a compound which is a salt of a carbenium ion and a noncoordinating, compatible anion represented by the following formula:

$[C]^+A^-$ wherein:
$[C]^+$ is a $C_{1-20}$ carbenium ion; and
is a noncoordinating, compatible anion having a charge of −1. For example, one carbenium ion that works well is the trityl cation, that is triphenylmethylium.

A further suitable ion forming, activating cocatalyst comprises a compound which is a salt of a silylium ion and a noncoordinating, compatible anion represented by the formula:

$(Q^1_3Si)^+A^-$ wherein:
$Q^1$ is $C_{1-10}$ hydrocarbyl, and $A^-$ is as previously defined.

Suitable silylium salt activating cocatalysts include trimethylsilylium tetrakispentafluorophenylborate, triethylsilylium tetrakispentafluorophenylborate, and ether substituted adducts thereof. Silylium salts have been previously generically disclosed in *J. Chem. Soc. Chem. Comm.* 1993, 383-384, as well as in Lambert, J. B., et al., *Organometallics* 1994, 13, 2430-2443. The use of the above silylium salts as activating cocatalysts for addition polymerization catalysts is also described in U.S. Pat. No. 5,625,087.

Certain complexes of alcohols, mercaptans, silanols, and oximes with tris(pentafluorophenyl)borane are also effective catalyst activators and may be used according to the present disclosure. Such cocatalysts are disclosed in U.S. Pat. No. 5,296,433.

Suitable activating cocatalysts for use herein also include polymeric or oligomeric alumoxanes (also called aluminoxanes), especially methylalumoxane (MAO), triisobutyl aluminum modified methylalumoxane (MMAO), or isobutylalumoxane; Lewis acid modified alumoxanes, especially perhalogenated tri(hydrocarbyl)aluminum- or perhalogenated tri(hydrocarbyl)boron modified alumoxanes, having from 1 to 10 carbons in each hydrocarbyl or halogenated hydrocarbyl group, and most especially tris(pentafluorophenyl)borane modified alumoxanes. Such co-catalysts are previously disclosed in U.S. Pat. Nos. 6,214,760, 6,160,146, 6,140,521, and 6,696,379.

A class of co-catalysts comprising non-coordinating anions generically referred to as expanded anions, further disclosed in U.S. Pat. No. 6,395,671, may be suitably employed to activate the metal complexes of the present disclosure for olefin polymerization. Generally, these co-catalysts (illustrated by those having imidazolide, substituted imidazolide, imidazolinide, substituted imidazolinide, benzimidazolide, or substituted benzimidazolide anions) may be depicted as follows:

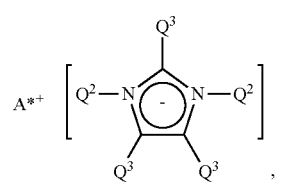

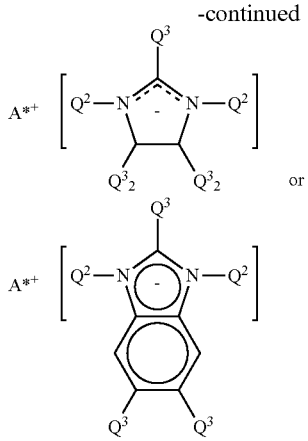

wherein:

A*+ is a cation, especially a proton containing cation, and can be trihydrocarbyl ammonium cation containing one or two $C_{10-40}$ alkyl groups, especially a methyldi($C_{4-20}$ alkyl) ammonium cation, $Q^3$, independently in each occurrence, is hydrogen or a halo, hydrocarbyl, halocarbyl, halohydrocarbyl, silylhydrocarbyl, or silyl, (including for example mono-, di- and tri(hydrocarbyl)silyl) group of up to 30 atoms not counting hydrogen, such as $C_{1-20}$ alkyl, and $Q^2$ is tris(pentafluorophenyl)borane or tris(pentafluorophenyl)alumane).

Examples of these catalyst activators include trihydrocarbylammonium-salts, especially, methyldi($C_{i4-20}$ alkyl)ammonium-salts of:
bis(tris(pentafluorophenyl)borane)imidazolide,
bis(tris(pentafluorophenyl)borane)-2-undecylimidazolide,
bis(tris(pentafluorophenyl)borane)-2-heptadecylimidazolide,
bis(tris(pentafluorophenyl)borane)-4,5-bis(undecyl)imidazolide,
bis(tris(pentafluorophenyl)borane)-4,5-bis(heptadecyl)imidazolide,
bis(tris(pentafluorophenyl)borane)imidazolinide,
bis(tris(pentafluorophenyl)borane)-2-undecylimidazolinide,
bis(tris(pentafluorophenyl)borane)-2-heptadecylimidazolinide,
bis(tris(pentafluorophenyl)borane)-4,5-bis(undecyl)imidazolinide,
bis(tris(pentafluorophenyl)borane)-4,5-bis(heptadecyl)imidazolinide,
bis(tris(pentafluorophenyl)borane)-5,6-dimethylbenzimidazolide,
bis(tris(pentafluorophenyl)borane)-5,6-bis(undecyl)benzimidazolide,
bis(tris(pentafluorophenyl)alumane)imidazolide,
bis(tris(pentafluorophenyl)alumane)-2-undecylimidazolide,
bis(tris(pentafluorophenyl)alumane)-2-heptadecylimidazolide,
bis(tris(pentafluorophenyl)alumane)-4,5-bis(undecyl)imidazolide,
bis(tris(pentafluorophenyl)alumane)-4,5-bis(heptadecyl) imidazolide,
bis(tris(pentafluorophenyl)alumane)imidazolinide,
bis(tris(pentafluorophenyl)alumane)-2-undecylimidazolinide,
bis(tris(pentafluorophenyl)alumane)-2-heptadecylimidazolinide,
bis(tris(pentafluorophenyl)alumane)-4,5-bis(undecyl)imidazolinide,
bis(tris(pentafluorophenyl)alumane)-4,5-bis(heptadecyl) imidazolinide,
bis(tris(pentafluorophenyl)alumane)-5,6-dimethylbenzimidazolide, and
bis(tris(pentafluorophenyl)alumane)-5,6-bis(undecyl)benzimidazolide.

Other activators include those described in the PCT publication WO 98/07515, such as tris(2,2',2"-nonafluorobiphenyl)fluoroaluminate. Combinations of activators are also contemplated by the disclosure, for example, alumoxanes and ionizing activators in combinations, see for example, EP-A-0 573120, PCT publications WO 94/07928 and WO 95/14044, and U.S. Pat. Nos. 5,153,157 and 5,453,410. For example, and in general terms, WO 98/09996 describes activating catalyst compounds with perchlorates, periodates and iodates, including their hydrates. WO 99/18135 describes the use of organoboroaluminum activators. WO 03/10171 discloses catalyst activators that are adducts of Brønsted acids with Lewis acids. Other activators or methods for activating a catalyst compound are described in, for example, U.S. Pat. Nos. 5,849,852, 5,859,653, and 5,869,723, in EP-A-615981, and in PCT publication WO 98/32775. All of the foregoing catalyst activators as well as any other known activator for transition metal complex catalysts may be employed alone or in combination according to the present disclosure. In one aspect, however, the co-catalyst can be alumoxane-free. In another aspect, for example, the co-catalyst can be free of any specifically-named activator or class of activators as disclosed herein.

In a further aspect, the molar ratio of catalyst/co-catalyst employed generally ranges from 1:10,000 to 100:1, for example, from 1:5000 to 10:1, or from 1:1000 to 1:1. Alumoxane, when used by itself as an activating co-catalyst, can be employed in large quantity, generally at least 100 times the quantity of metal complex on a molar basis.

Tris(pentafluorophenyl)borane, where used as an activating co-catalyst can be employed generally in a molar ratio to the metal complex of from 0.5:1 to 10:1, such as from 1:1 to 6:1 and from 1:1 to 5:1. The remaining activating co-catalysts are generally, employed in approximately equimolar quantity with the metal complex.

In exemplary embodiments of the present disclosure, the co-catalyst is [($C_{16-18}H_{33-37})_2CH_3NH$] tetrakis(pentafluorophenyl)borate salt.

Polymerization Process

The compositions of the present disclosure and catalyst systems using the compositions described herein are suitable for use in any prepolymerization and/or polymerization process over a wide range of temperatures and pressures. Such temperatures and pressures, as well as other polymerization process information, described herein can be referred to as "polymerization conditions." The temperatures may be in the range of from −60° C. to about 280° C., preferably from 50° C. to about 200° C. In another embodiment, the polymerization temperature is above 0° C., above 50° C., above 80° C., above 100° C., above 150° C. or above 200° C. In an embodiment, the pressures employed may be in the range from 1 atmosphere to about 500 atmospheres or higher. Polymerization processes include solution, gas phase, slurry phase and a high pressure process or a combination thereof.

In one embodiment, the process of the present disclosure is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The present disclosure is particularly well suited to the polymerization of two or more olefin monomers of ethylene, propylene, butene-1, pentene-1, 4-methyl-pentene-1, hexene-1, octene-1 and decene-1. Other monomers useful in the process of the present disclosure include ethylenically unsaturated monomers, diolefins having 4 to 18 carbon atoms, conjugated or nonconjugated dienes, polyenes, vinyl monomers and cyclic olefins. Non-limiting monomers useful in the present disclosure may include norbornene, norbornadiene, isobutylene, isoprene, vinylbenzocyclobutane, styrenes, alkyl substituted styrene, ethylidene norbornene, dicyclopentadiene and cyclopentene. In another embodiment of the process of the present disclosure, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a solution process. In another embodiment of the process of the present disclosure, ethylene or propylene is polymerized with at least two different comonomers, optionally one of which may be a diene, to form a terpolymer.

In embodiments of the process of this present disclosure, the catalyst system may be employed in liquid phase (solution, slurry, suspension, bulk phase or combinations thereof), in high pressure liquid, or supercritical fluid or gas phase processes. Each of these processes may be employed in single, parallel or series reactors. The liquid processes comprise contacting the ethylene and/or α-olefin and at least one vicinally disubstituted olefin monomer with the catalyst system described herein in a suitable diluent or solvent and allowing the monomers to react for a sufficient time to produce embodiments of the invention copolymers. One or more of the monomers used in the polymerization may be utilized as a solvent and/or diluent, generally in homogeneous polymerizations in the liquid monomer or monomers. Hydrocarbyl solvents are also suitable, both aliphatic and aromatic, including hexane and toluene. Bulk and slurry processes may typically be accomplished by contacting the catalysts with a slurry of liquid monomer, the catalyst system being supported. Gas phase processes may use the supported catalyst and may be conducted in any manner known to be suitable for producing ethylene homopolymers or copolymers via coordination polymerization. Illustrative examples may be found in U.S. Pat. Nos. 4,543,399; 4,588,790; 5,028,670; 5,382,638; 5,352,749; 5,436,304; 5,453,471; 5,463,999; and WO 95/07942. Each is incorporated by reference for purposes of U.S. patent practice.

Generally, the polymerization reaction temperature may vary from −50° C. to 250° C. The reaction temperature conditions may be from −20° C. to 220°, or below 200° C. The pressure may vary from 1 mm Hg to 2500 bar, or from 0.1 bar to 1600 bar, or from 1.0 to 500 bar. Where lower molecular weight copolymers, e.g., $M_n$<10,000, are sought, it may be suitable to conduct the reaction processes at temperatures above 0° C. and pressures under 500 bar.

In one aspect of this disclosure, there is provided a process and the resulting polymer, the process comprising polymerizing one or more olefin monomers in the presence of an olefin polymerization catalyst and the composition having the formula (I) in a polymerization reactor or zone thereby causing the formation of at least some quantity of a polymer joined with the remnant of the composition having the formula (I). Exemplary, non-limiting polymerization processes include those known in the art, those disclosed in U.S. Pat. No. 8,501,885 B2, as well as those known in the art for producing random copolymers. Exemplary, non-limiting polymerization processes include those conducted in a single reactor or two reactors.

In yet another aspect, there is provided a process and the resulting polymer, the process comprising polymerizing one or more olefin monomers in the presence of an olefin polymerization catalyst and the composition having the formula (I) in a polymerization reactor or zone thereby causing the formation of at least some quantity of an initial polymer joined with the remnant of the composition having the formula (I) within the reactor or zone; discharging the reaction product from the first reactor or zone to a second polymerization reactor or zone operating under polymerization conditions that are distinguishable from those of the first polymerization reactor or zone; transferring at least some of the initial polymer joined with the remnant of the composition having the formula (I) to an active catalyst site in the second polymerization reactor or zone by means of at least one remaining shuttling site of the composition having the formula (I); and conducting polymerization in the second polymerization reactor or zone so as to form a second polymer segment bonded to some or all of the initial polymer by means of a remnant of the composition having the formula (I), the second polymer segment having distinguishable polymer properties from the initial polymer segment.

During the polymerization, the reaction mixture is contacted with the activated catalyst composition according to any suitable polymerization conditions. The process can be generally characterized by use of elevated temperatures and pressures. Hydrogen may be employed as a chain transfer agent for molecular weight control according to known techniques, if desired. As in other similar polymerizations, it is generally desirable that the monomers and solvents employed be of sufficiently high purity that catalyst deactivation or premature chain termination does not occur. Any suitable technique for monomer purification such as devolatilization at reduced pressure, contacting with molecular sieves or high surface area alumina, or a combination of the foregoing processes may be employed.

Supports may be employed in the present methods, especially in slurry or gas-phase polymerizations. Suitable supports include solid, particulated, high surface area, metal oxides, metalloid oxides, or mixtures thereof (interchangeably referred to herein as an inorganic oxide). Examples include, but are not limited to talc, silica, alumina, magnesia, titania, zirconia, $Sn_2O_3$, aluminosilicates, borosilicates, clays, and any combination or mixture thereof. Suitable supports preferably have a surface area as determined by nitrogen porosimetry using the B.E.T. method from 10 to 1000 $m^2$/g, and preferably from 100 to 600 $m^2$/g. The average particle size typically is from 0.1 to 500 μm, preferably from 1 to 200 μm, more preferably 10 to 100 μm.

In one aspect of the present disclosure, the catalyst composition and optional support may be spray dried or otherwise recovered in solid, particulated form to provide a composition that is readily transported and handled. Suitable methods for spray drying a liquid containing slurry are well known in the art and usefully employed herein. Preferred techniques for spray drying catalyst compositions for use herein are described in U.S. Pat. Nos. 5,648,310 and 5,672,669.

The polymerization is desirably carried out as a continuous polymerization, for example, a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context include those processes in which there are intermittent additions of reactants and removal of products at small regular or irregular intervals, so that, over time, the overall process is substantially continuous. The composition having the formula (I) (if used) may be added at any point during the polymerization including in the first reactor or zone, at the exit or slightly before the exit of the first reactor, between the first reactor or zone and any subsequent reactor or zone, or even solely to the second reactor or zone. If there exists any difference in monomers, temperatures, pressures or other polymerization conditions within a reactor or between two or more reactors or zones connected in series, polymer segments of differing composition such as comonomer content, crystallinity, density, tacticity, regio-regularity, or other chemical or physical differences, within the same molecule can be formed in the polymers of this disclosure. In such event, the size of each segment or block is determined by the polymer reaction conditions and typically is a most probable distribution of polymer sizes.

If multiple reactors are employed, each can be independently operated under high pressure, solution, slurry, or gas phase polymerization conditions. In a multiple zone polymerization, all zones operate under the same type of polymerization, such as solution, slurry, or gas phase, but, optionally, at different process conditions. For a solution polymerization process, it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion wherein normally either the metal complex or the co-catalyst is only poorly soluble is disclosed in U.S. Pat. No. 5,783,512. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. For example, typical temperatures in a slurry polymerization are from 30° C., generally from 60° C. up to 115° C., including up to 100° C., depending on the polymer being prepared. Pressures typically range from atmospheric (100 kPa) to 500 psi (3.4 MPa).

In all of the foregoing processes, continuous or substantially continuous polymerization conditions generally are employed. The use of such polymerization conditions, especially continuous, solution polymerization processes, allows the use of elevated reactor temperatures which results in the economical production of the present block copolymers in high yields and efficiencies.

The catalyst may be prepared as a homogeneous composition by addition of the requisite metal complex or multiple complexes to a solvent in which the polymerization will be conducted or in a diluent compatible with the ultimate reaction mixture. The desired co-catalyst or activator and, optionally, a composition having the formula (I) may be combined with the catalyst composition either prior to, simultaneously with, or after combination of the catalyst with the monomers to be polymerized and any additional reaction diluent. Desirably, if present, the composition having the formula (I) is added at the same time.

At all times, the individual ingredients as well as any active catalyst composition are protected from oxygen, moisture, and other catalyst poisons. Therefore, the catalyst components, the composition having the formula (I), and activated catalysts are prepared and stored in an oxygen and moisture free atmosphere, generally under a dry, inert gas such as nitrogen.

Without limiting in any way the scope of the disclosure, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization. Examples of suitable loop reactors and a variety of suitable operating conditions for use therewith, including the use of multiple loop reactors, operating in series, are found in U.S. Pat. Nos. 5,977,251, 6,319,989 and 6,683,149.

Catalyst along with co-catalyst and the composition having the formula (I) are continuously or intermittently introduced in the reactor liquid phase or any recycled portion thereof at a minimum of one location. The reactor temperature and pressure may be controlled, for example, by adjusting the solvent/monomer ratio or the catalyst addition rate, as well as by use of cooling or heating coils, jackets or both. The polymerization rate can be controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned composition having the formula (I), or a chain terminating agent such as hydrogen, as is known in the art.

In one aspect of the disclosure, a second reactor is connected to the discharge of a first reactor, optionally by means of a conduit or other transfer means, such that the reaction mixture prepared in the first reactor is discharged to the second reactor without substantial termination of polymer growth. Between the first and second reactors, a differential in at least one process condition may be established. Generally, for use in formation of a copolymer of two or more monomers, the difference is the presence or absence of one or more comonomers or a difference in comonomer concentration. Additional reactors, each arranged in a manner similar to the second reactor in the series may be provided as well. Further polymerization is ended by contacting the reactor effluent with a catalyst kill agent such as water, steam or an alcohol or with a coupling agent if a coupled reaction product is desired.

The resulting polymer product is recovered by flashing off volatile components of the reaction mixture such as residual monomer(s) or diluent at reduced pressure, and, if necessary, conducting further devolatilization in equipment such as a devolatilizing extruder. In a continuous process the mean residence time of the catalyst and polymer in the reactor generally is from 5 minutes to 8 hours, for example, from 10 minutes to 6 hours.

In a further aspect of this disclosure, alternatively, the foregoing polymerization may be carried out in a plug flow reactor optionally with a monomer, catalyst, the composition having the formula (I), temperature or other gradient established between differing zones or regions thereof, further optionally accompanied by separate addition of catalysts and/or the composition having the formula (I), and operating under adiabatic or non-adiabatic polymerization conditions.

In yet a further aspect, the catalyst composition may also be prepared and employed as a heterogeneous catalyst by adsorbing the requisite components on an inert inorganic or organic particulated solid, as previously disclosed. For example, a heterogeneous catalyst can be prepared by co-precipitating the metal complex and the reaction product of an inert inorganic compound and an active hydrogen containing activator, especially the reaction product of a tri($C_{1-4}$ alkyl) aluminum compound and an ammonium salt of a hydroxyaryltris(pentafluorophenyl)borate, such as an ammonium salt of (4-hydroxy-3,5-ditertiarybutylphenyl)tris (pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Generally, the diluent for slurry polymerization is one or more hydrocarbons with less than 5 carbon atoms. If desired, saturated hydrocarbons such as ethane, propane, or butane may be used in whole or part as the diluent. As with a solution polymerization, the α-olefin comonomer or a combination of different α-olefin monomers may be used in whole or part as the diluent. Most preferably at least a major part of the diluent comprises the α-olefin monomer or monomers to be polymerized.

In this aspect, for use in gas phase polymerization processes, the support material and resulting catalyst typically can have a median particle diameter from 20 to 200 μm, generally from 30 μm to 150 μm, and typically from 50 μm to 100 μm. For use in slurry polymerization processes, the support can have a median particle diameter from 1 μm to 200 μm, generally from 5 μm to 100 μm, and typically from 10 μm to 80 μm.

Suitable gas phase polymerization process for use herein are substantially similar to known processes used commercially on a large scale for the manufacture of polypropylene, ethylene/α-olefin copolymers, and other olefin polymers. The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported or suspended above a perforated plate or fluidization grid, by a flow of fluidization gas. Suitable gas phase processes which are adaptable for use in the process of this disclosure are disclosed in, for example, U.S. Pat. Nos. 4,588,790; 4,543, 399; 5,352,749; 5,436,304; 5,405,922; 5,462,999; 5,461, 123; 5,453,471; 5,032,562; 5,028,670; 5,473,028; 5,106, 804; 5,556,238; 5,541,270; 5,608,019; and 5,616,661.

The use of functionalized derivatives of polymers are also included within the present disclosure. Examples include metallated polymers wherein the metal is the remnant of the catalyst or the composition having the formula (I) employed, as well as further derivatives thereof. Because a substantial fraction of the polymeric product exiting the reactor is terminated with metal, further functionalization is relatively easy. The metallated polymer species can be utilized in well known chemical reactions such as those suitable for other alkyl-aluminum, alkyl-gallium, alkyl-zinc, or alkyl-Group 1 compounds to form amine-, hydroxy-, epoxy-, silane, vinylic, and other functionalized terminated polymer products. Examples of suitable reaction techniques that are adaptable for use herein are described in Negishi, "Organometallics in Organic Synthesis", Vol. 1 and 2, (1980), and other standard texts in organometallic and organic synthesis.

Olefin Monomers

Suitable monomers for use in preparing the polymer products of the present disclosure in polymerization processes include any addition polymerizable monomer, generally any olefin or diolefin monomer. Suitable monomers can be linear, branched, acyclic, cyclic, substituted, or unsubstituted. In one aspect, the olefin can be any α-olefin, including, for example, ethylene and at least one different copolymerizable comonomer, propylene and at least one different copolymerizable comonomer having from 4 to 20 carbons, or 4-methyl-1-pentene and at least one different copolymerizable comonomer having from 4 to 20 carbons. Examples of suitable monomers include, but are not limited to, straight-chain or branched α-olefins having from 2 to 30 carbon atoms, from 2 to 20 carbon atoms, or from 2 to 12 carbon atoms. Specific examples of suitable monomers include, but are not limited to, ethylene, propylene, 1-butene, 1-pentene, 3-methyl-1-butene, 1-hexane, 4-methyl-1-pentene, 3-methyl-1-pentene, 1-octene, 1-decene, 1-dodecene, 1-tetradecene, 1-hexadecene, 1-octadecene, and 1-eicosene. Suitable monomers for use in preparing the copolymers disclosed herein also include cycloolefins having from 3 to 30, from 3 to 20 carbon atoms, or from 3 to 12 carbon atoms. Examples of cycloolefins that can be used include, but are not limited to, cyclopentene, cycloheptene, norbornene, 5-methyl-2-norbornene, tetracyclododecene, and 2-methyl-1,4,5,8-dimethano-1,2,3,4,4a,5, 8,8a-octahydronaphthalene. Suitable monomers for preparing the copolymers disclosed herein also include di- and poly-olefins having from 3 to 30, from 3 to 20 carbon atoms, or from 3 to 12 carbon atoms. Examples of di- and poly-olefins that can be used include, but are not limited to, butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1, 4,8-decatriene. In a further aspect, aromatic vinyl compounds also constitute suitable monomers for preparing the copolymers disclosed here, examples of which include, but are not limited to, mono- or poly-alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene and α-methylstyrene, vinylchloride, 1,2-difluoroethylene, 1,2-dichloroethylene, tetrafluoroethylene, and 3,3,3-trifluoro-1-propene, provided the monomer is polymerizable under the conditions employed.

Further, in one aspect, suitable monomers or mixtures of monomers for use in combination with the composition having the formula (I) disclosed here include ethylene; propylene; mixtures of ethylene with one or more monomers selected from propylene, 1-butene, 1-hexene, 4-methyl-1-pentene, 1-octene, and styrene; and mixtures of ethylene, propylene and a conjugated or non-conjugated diene. In this aspect, the copolymer or interpolymer can contain two or more intramolecular regions comprising differing chemical or physical properties, especially regions of differentiated comonomer incorporation, joined in a dimeric, linear, branched or, polybranched polymer structure. Such polymers may be prepared by altering the polymerization conditions during a polymerization that includes a composition having the formula (I), for example by using two reactors with differing comonomer ratios, multiple catalysts with differing comonomer incorporation abilities, or a combination of such process conditions, and optionally a polyfunctional coupling agent.

Polymer Products

As disclosed herein, the polymer products refer to polymer products, after polymerization, that are typically subjected to chemical treatment to consume reactive metal alkyl groups and liberate the polymer products from attachment to transition group or main group metals. This process comprises hydrolysis with water to generate saturated polymer end groups. Alternatively, addition of various organic or inorganic reagents may be added to both consume the metal alkyl groups and generate reactive functional end groups on the polymer chains.

The polymers produced by the processes of the present disclosure can be used in a wide variety of products and end-use applications. The polymers produced can be homo- and co-polymers of ethylene and propylene and include linear low density polyethylene, elastomers, plastomers, high-density polyethylenes, medium density polyethylenes, low density polyethylenes, polypropylene, and polypropylene copolymers. Propylene based polymers produced include isotactic polypropylene, atactic polypropylene, and random, block or impact copolymers.

Utilizing the polymerization processes disclosed here, novel polymer compositions, including block copolymers of one or more olefin monomers having the present molecular weight distribution, are readily prepared. Exemplary polymers comprise in polymerized form at least one monomer selected from ethylene, propylene, and 4-methyl-1-pentene. Illustratively, the polymers are interpolymers comprising in polymerized form ethylene, propylene, or 4-methyl-1-pentene and at least one different $C_{2-20}$ α-olefin comonomer, and optionally one or more additional copolymerizable comonomers. Suitable comonomers are selected from diolefins, cyclic olefins, and cyclic diolefins, halogenated vinyl compounds, vinylidene aromatic compounds, and combinations thereof. Exemplary polymers are interpolymers of ethylene with propylene, 1-butene, 1-hexene or 1-octene. Illustratively, the polymer compositions disclosed here have an ethylene content from 1 to 99 percent, a diene content from 0 to 10 percent, and a styrene and/or $C_{3-8}$ α-olefin content from 99 to 1 percent, based on the total weight of the polymer. The polymers of the present disclosure may have a weight average molecular weight (Mw) from 10,000 to 2,500,000. Typically, the polymers of the present disclosure have a weight average molecular weight (Mw) from 500 to 250,000 (e.g., from 2,000 to 150,000, from 3,000 to 100,000, from 1,000 to 25,000, from 5,000 to 25,000, etc.).

The polymers prepared according to this disclosure can have a melt index, $I_2$, from 0.01 to 2000 g/10 minutes, typically from 0.01 to 1000 g/10 minutes, more typically from 0.01 to 500 g/10 minutes, and especially from 0.01 to 100 g/10 minutes. Desirably, the disclosed polymers can have molecular weights, $M_w$, from 1,000 g/mole to 5,000,000 g/mole, typically from 1000 g/mole to 1,000,000, more typically from 1000 g/mole to 500,000 g/mole, and especially from 1,000 g/mole to 300,000 g/mole.

The density of the polymers of this disclosure can be from 0.80 to 0.99 g/cm³ and typically, for ethylene containing polymers, from 0.85 g/cm³ to 0.97 g/cm³ (e.g., from 0.853 to 0.970 g/cm³).

The polymers according to this disclosure may be differentiated from conventional, random copolymers, physical blends of polymers, and block copolymers prepared via sequential monomer addition, fluxional catalysts, or by anionic or cationic living polymerization techniques, by, among other things, their narrow molecular weight distributions. In this aspect, for example, the polymer composition prepared according to this disclosure can be characterized by a polydispersity index (PDI) of from 1.5 to 10.0 (e.g, from 2.0 to 8.0, from 2.0 to 6.0, from 2.0 to 5.0, from 2.0 to 4.0, etc.). For example, the polydispersity index (PDI) of the polymer composition can be from 1.5 to 2.8, from 1.5 to 2.5, or from 1.5 to 2.3.

If present, the separate regions or blocks within each polymer are relatively uniform, depending on the uniformity of reactor conditions, and chemically distinct from each other. That is, the comonomer distribution, tacticity, or other property of segments within the polymer are relatively uniform within the same block or segment. However, the average block length can be a narrow distribution, but is not necessarily so. The average block length can also be a most probable distribution.

Illustratively, these interpolymers can be characterized by terminal blocks or segments of polymer having higher tacticity or crystallinity from at least some remaining blocks or segments. Illustratively, the polymer can be a triblock copolymer containing a central polymer block or segment that is relatively amorphous or even elastomeric.

In a still further aspect of this disclosure, there is provided a polymer composition comprising: (1) an organic or inorganic polymer, preferably a homopolymer of ethylene or of propylene and/or a copolymer of ethylene or propylene with one or more copolymerizable comonomers, and (2) a polymer or combination of polymers according to the present disclosure or prepared according to the process disclosed here.

The inventive polymer products include combinations of two or more polymers comprising regions or segments (blocks) of differing chemical composition. In addition, at least one of the constituents of the polymer combination can contain a linking group which is the remnant of the composition having the formula (I), causing the polymer to possess certain physical properties.

Various additives may be usefully incorporated into the present compositions in amounts that do not detract from the properties of the resultant composition. These additives include, for example, reinforcing agents, fillers including conductive and non-conductive materials, ignition resistant additives, antioxidants, heat and light stabilizers, colorants, extenders, crosslinkers, blowing agents, plasticizers, flame retardants, anti-drip agents, lubricants, slip additives, anti-blocking aids, anti-degradants, softeners, waxes, pigments, and the like, including combinations thereof.

The resultant polymers may be block interpolymers that can be characterized by an average block index, e.g., as discussed in U.S. Pat. Nos. 7,947,793, 7,897,698, and 8,293,859. The resultant polymers may be block composites that can be characterized by a block composite index, e.g., as discussed in U.S. Pat. Nos. 8,563,658, 8,476,366, 8,686,087, and 8,716,400. The resultant polymers may be crystalline block composites that can be characterized by a crystalline block composite index, e.g., as discussed in U.S. Pat. Nos. 8,785,554, 8,822,598, and 8,822,599. The resultant polymers may be specified block composites that can be characterized by a microstructure index, e.g., as discussed in WO 2016/028957. The resultant polymers may be specified block composites that can be characterized by a modified block composite index, e.g., as discussed in WO 2016/028970.

In certain embodiments, the process for preparing the composition having the formula (I) may be combined with functionalization chemistry to develop telechelic olefin prepolymers. In certain embodiments, the composition having the formula (I) can generate and grow telechelic polymer chains with both ends bonded to the composition having the formula (I); subsequent transformation of the terminal polymeryl-metal bonds to desired di-end-functional groups may then occur to form the telechelic polymer.

Applications of the combination of the process for preparing the composition having the formula (I) of the present disclosure with functionalization chemistry are in no way limited to development of telechelic olefin prepolymers and the above example. In certain embodiments, the process for preparing the composition having the formula (I) of the present disclosure may be combined with, e.g., coordinative chain transfer polymerization, to produce functionalized polyolefins.

The polymers of the present disclosure may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

Polymers produced by the process of the present disclosure and blends thereof are useful in such forming operations as film, sheet, and fiber extrusion and coextrusion as well as blow molding, injection molding, roto-molding. Films include blown or cast films formed by coextrusion or by lamination useful as shrink film, cling film, stretch film, sealing film or oriented films.

EXAMPLES

Methodologies $^1$H NMR: $^1$H NMR spectra are recorded on a Bruker AV-400 spectrometer at ambient temperature. $^1$H NMR chemical shifts in benzene-$d_6$ are referenced to 7.16 ppm ($C_6D_5H$) relative to TMS (0.00 ppm).

$^{13}$C NMR: $^{13}$C NMR spectra of polymers are collected using a Bruker 400 MHz spectrometer equipped with a Bruker Dual DUL high-temperature CryoProbe. The polymer samples are prepared by adding approximately 2.6 g of a 50/50 mixture of tetrachloroethane-$d_2$/orthodichlorobenzene containing 0.025M chromium trisacetylacetonate (relaxation agent) to 0.2 g of polymer in a 10 mm NMR tube. The samples are dissolved and homogenized by heating the tube and its contents to 150° C. The data is acquired using 320 scans per data file, with a 7.3 second pulse repetition delay with a sample temperature of 120° C.

GCMS: Tandem gas chromatography/low resolution mass spectroscopy using electron impact ionization (EL) is performed at 70 eV on an Agilent Technologies 6890N series gas chromatograph equipped with an Agilent Technologies 5975 inert XL mass selective detector and an Agilent Technologies Capillary column (HP1MS, 15 m×0.25 mm, 0.25 micron) with respect to the following:

Programed Method:
Oven Equilibration Time 0.5 min
50° C. for 0 min
then 25° C./min to 200° C. for 5 min
Run Time 11 min DSC Standard Method: Differential Scanning Calorimetry results are determined using a TAI model Q1OOO DSC equipped with an RCS cooling accessory and an autosampler. A nitrogen purge gas flow of 50 ml/min is used. The sample is pressed into a thin film and melted in the press at 175° C. and then air-cooled to room temperature (25° C.). About 10 mg of material in the form of a 5-6 mm diameter disk is accurately weighed and placed in an aluminum foil pan (ca 50 mg) which is then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Molecular Weight Determination: Molecular weights are determined by optical analysis techniques including deconvoluted gel permeation chromatography coupled with a low angle laser light scattering detector (GPC-LALLS) as described by Rudin, A., "Modern Methods of Polymer Characterization", John Wiley & Sons, New York (1991) pp. 103-112.

GPC Method: The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000 and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. ScL, Polym. Let., 6, 621 (1968)):

$M_{polyethylene}$=0.431($M_{polystyrene}$). Polyethylene equivalent molecular weight calculations are performed using Viscotek TriSEC software Version 3.0.

Density: Density measurements are conducted according to ASTM D792.

Mooney viscosity: Mooney Viscosity (ML1+4 at 125° C.) is measured in accordance with ASTM 1646, with a one minute preheat time and a four minute rotor operation time. The instrument is an Alpha Technologies Mooney Viscometer 2000.

Melt viscosity (Brookfield viscosity): Melt viscosity is measured in accordance with ASTM D 3236 (177° C., 350° F.), using a Brookfield Digital Viscometer (Model DV-III, version 3), and disposable aluminum sample chambers. The spindle is a SC-31 hot-melt spindle, suitable for measuring viscosities in the range from 10 to 100,000 centipoise. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate which leads to a torque reading in the range of 40 to 60 percent of the total torque capacity, based on the rpm output of the viscometer. Readings are taken every minute for about 15 minutes, or until the values stabilize, at which point, a final reading is recorded.

Zn content in polymer: The zinc content is measured by XRF analysis using the PANalytical 2400 wavelength dispersive X-ray spectrometer under helium atmosphere. A channel mask of 24 mm is used. The counting times for peak and background are 30 s. The AUSMON-He monitor is used to correct for any drift over time. The polymer samples are hot pressed into plaques using a Leco PR-32 mounting press at a constant temperature of 150° C. and pressure of about 4000 psi. Ten grams of polymer are used to mold a plaque with a diameter of 31 mm.

P wt %: The propylene content is measured by $^{13}$C NMR, described above.

Materials

The following materials are principally used in the examples of the present disclosure.

Anhydrous toluene is obtained from Sigma-Aldrich and is further dried over alumina, which is activated in a 275° C. oven for about 5 hours. 1,2,4-trivinylcyclohexane ("TVCH") is obtained from Sigma-Aldrich and is dried over activated alumina before use. Diethylzinc ("DEZ" or "ZnEt2") and triethylaluminum ("TEA" or "AlEt3") are obtained from Sigma-Aldrich. [($C_{16-18}H_{33-37}$)$_2$CH$_3$NH]tetrakis(pentafluorophenyl)borate salt ("Co-catalyst A") is obtained from Boulder Scientific Co. Isopar™ E is obtained from Exxon. MMAO-3A is obtained from Akzo. 5-ethylidene-2-norbornene ("ENB," mixture of endo and exo) is obtained from Sigma-Aldrich and dried over DD6 before use. 1,9-decadiene is obtained from Sigma-Aldrich. Silica ES757-875 is obtained from INEOS Silicas and is dehydrated at high temperature (about 700-800° C.). Norbornene ("NBN") is obtained from Sigma-Aldrich.

(E)-((2,6-diisopropylphenyl)(2-methyl-3-(octylimino)butan-2-yl)amino)trimethyl hafnium ("Catalyst (A2)") is obtained from Boulder Scientific Co. and prepared according to methods known in the art. The structure of Catalyst (A2) is illustrated below:

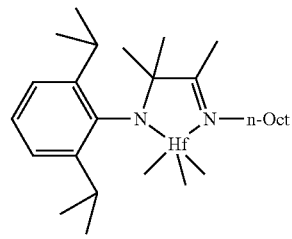

The following examples are provided as further illustrations of the present disclosure and are not to be construed as limiting. The term "overnight", if used, refers to a time of approximately 16-18 hours, and the term "room temperature" refers to a temperature of 20-25° C. In the event the name of a compound herein does not conform to the structural representation thereof, the structural representation shall control. The synthesis of all metal complexes and the preparation of all screening experiments are carried out in a dry nitrogen atmosphere using dry box (glove box) techniques, including running reactions entirely within a dry box under a nitrogen atmosphere. All solvents used are HPLC grade and are dried before their use.

Reference Example

In a drybox under an atmosphere of nitrogen, TVCH (0.327 ml, 1.68 mmol), DEZ (0.2 ml, 1.94 mmol) and Co-catalyst A (0.06 mmol in 1 ml methylcyclohexane) are added to 7 ml of toluene in a 2 oz. glass vial equipped with a stir-bar. A sample is taken for $^1$H NMR in C6D6, as seen in the "before reaction" spectrum in FIG. 1. Catalyst (A2) (19 mg in 2 ml toluene, 0.032 mmol) is added to initiate the reaction and to form a first solution containing the composition of the Reference Example. The first solution is stirred at room temperature overnight and has a [Zn] of 0.22 M.

A sample of the first solution is diluted in benzene-d6 for "after overnight reaction" $^1$H NMR analysis as seen in FIG. 1. As seen in FIG. 1, only trace amounts of vinyl unsaturation are left in the "after overnight reaction" spectrum, indicating that the vinyl groups of TVCH are consumed after overnight reaction. Concurrently, the ZnEt peak is also diminished, but a small amount remains as seen on the $^1$H NMR spectra. Accordingly, $^1$H NMR analysis provides proof of the coordination and insertion of TVCH into the transition metal catalyst precursor followed by chain transfer to zinc.

Further samples of the first solution are also analyzed via GCMS. More specifically, as seen in FIGS. 3A and 3B, aliquots of the first solution are quenched by water and deuterium oxide separately. As seen in FIGS. 3A and 3B, the water quenched sample shows major peaks at m/z of about 222, while the D2O quenched sample shows major peaks at m/z of about 224; these peaks are consistent with the expected hydrolyzed products shown below in exemplary, non-limiting Scheme 5. The multiplicity of peaks is believed to be the result of multiple chiral centers in the structure.

Scheme 5.

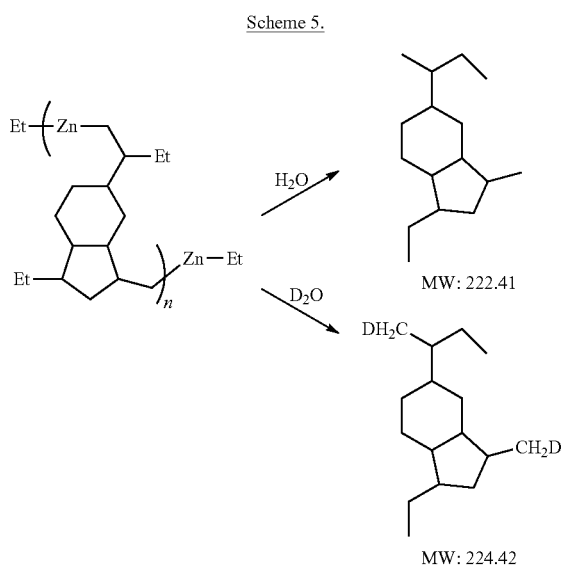

Furthermore, GCMS analysis shows the surprising and unexpected nature of the present disclosure. It was hypothesized that TVCH might form a three-headed organometallic species since TVCH has three vinyl groups; such a three-headed organometallic species would generate a hydrolyzed product with a molecular weight of about 252, as illustrated below in exemplary, non-limiting Scheme 6. Surprisingly, GCMS does not detect peaks at m/z of about 252. Instead, it unexpectedly shows groups of peaks at m/z of about 222, which is consistent with the double-ring structures formed by intramolecular insertion of two neighboring vinyl groups. Accordingly, an exemplary mechanism is insertion of the first vinyl group on the transition metal followed by the consecutive insertion of the neighboring vinyl in 2,1-fashion to form a 6/6 ring structure or in 1,2-fashion to form a 6/5 ring structure as shown in exemplary, non-limiting Scheme 4. The minor peaks at m/z of about 192 are presumably half reacted TVCH with only one vinyl group inserted.

The D2O quenched sample confirms the dual-headed nature of the organometallic species. As anticipated, the 222 peaks on the GCMS shift to about 224 for the D2O quenched sample, indicating that the alkane moiety is attached to two zinc atoms before hydrolysis.

To further probe the structure, a further sample of the first solution is hydrolyzed with deuterium oxide, and $^{13}$C NMR analysis is performed on the isolated hydrolyzed product, as seen in FIG. 2. As seen in FIG. 2, $^{13}$C NMR analysis shows that the isolated hydrolyzed product is consistent with the structure shown in exemplary, non-limiting Scheme 5. Specifically, as seen in FIG. 2, the deuterium labelled carbons shift slightly up-field and split into three peaks and are, thus, easily distinguished from the unlabeled carbons. As indicated in exemplary, non-limiting Scheme 7, the 6/6 ring structure would have one labelled primary carbon and one labelled secondary carbon (CH2D:CHD=1), and the 6/5 ring structure would have two labelled primary carbons with different chemical shift (CH2D(1):CH2D(2)=1). If the product is a mixture of the two, we would get CH2D(1):[CH2D(2)+CHD]=1. As shown by the $^{13}$C NMR spectra in FIG. 2, no CHD (D on secondary carbon) is detected; there are two CH$_2$D peaks with similar intensity. The result indicates that the product has a 6/5 ring structure. It is noted that the D-labelling is not complete, possibly due to residual water in the D2O reagent.

Scheme 7.

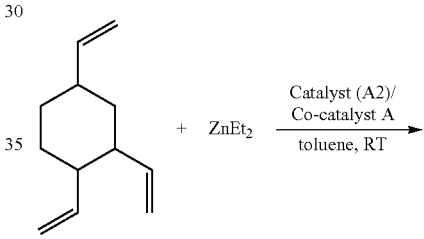

Scheme 6.

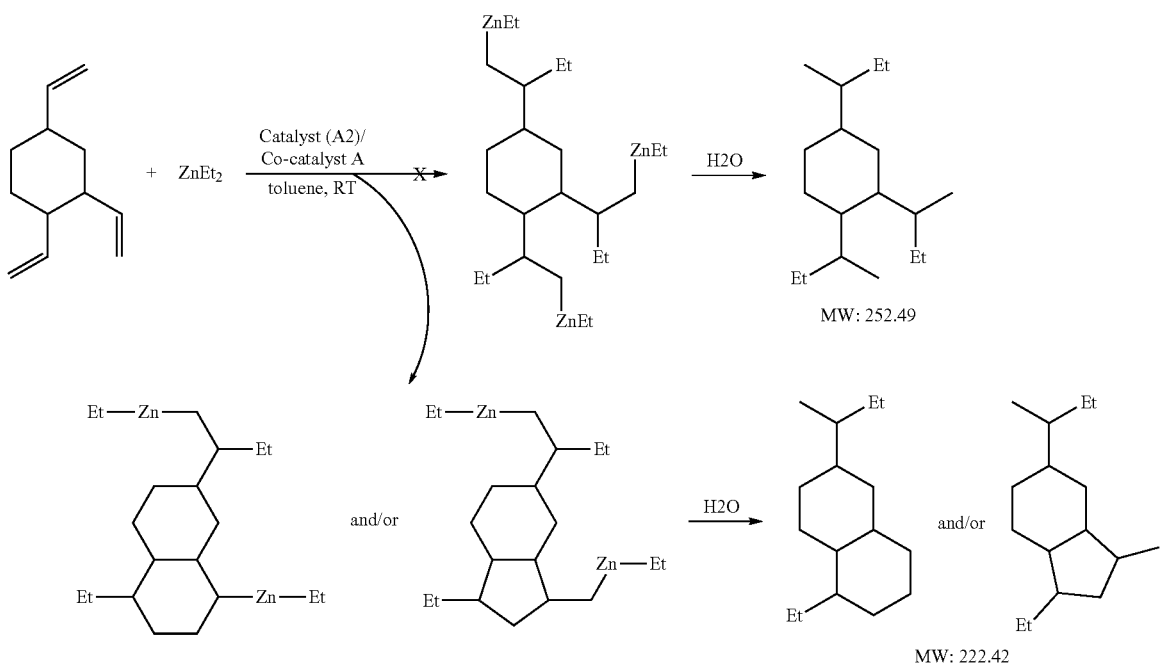

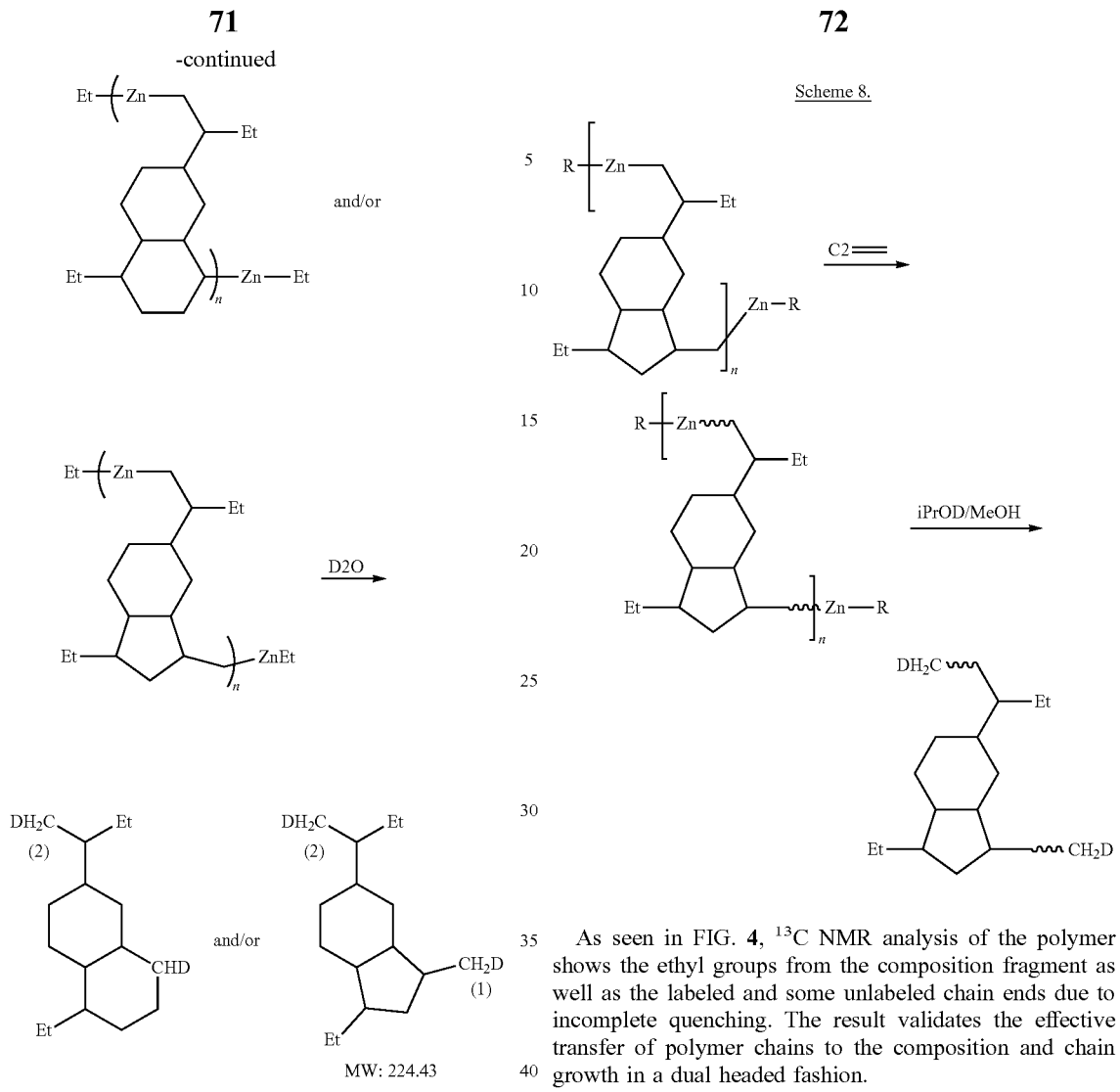

As seen in FIG. 4, $^{13}$C NMR analysis of the polymer shows the ethyl groups from the composition fragment as well as the labeled and some unlabeled chain ends due to incomplete quenching. The result validates the effective transfer of polymer chains to the composition and chain growth in a dual headed fashion.

Ethylene Polymerization with the composition of the Reference Example: To validate the dual-headed composition of the Reference Example, ethylene polymerization is performed using the composition in a polymerization setup.

ISOPAR™ E (10 ml), MMAO-3A (0.03 mmol) and Co-catalyst A (0.0013 mmol) are added to a 40 ml glass vial equipped with a stirbar in the drybox. The vial is capped with a septum lined lid and connected to an ethylene line via a needle. Another needle is inserted on the lid to let ethylene slowly purge the vial for 2 min. The vial is placed in a heating block at 100° C. The first solution of the Reference Example (2 ml, 0.4 mmol) and Catalyst (A2) (0.001 mmol) are injected, and the purge needle is removed to maintain a total pressure at 12 psig. The reaction is maintained for 30 min. After polymerization, 0.5 ml of deuterated isopropyl alcohol (iPrOD) is added to quench the reaction. The mixture is moved out of the drybox and poured into a large amount of MeOH. The precipitated polymer is filtered, dried under vacuum at RT overnight then at 70° C. for 3 hr. 0.5 g of white polyethylene is obtained. Such a procedure is cursorily illustrated below in exemplary, non-limiting Scheme 8.

Working Example 1

Figure 5:
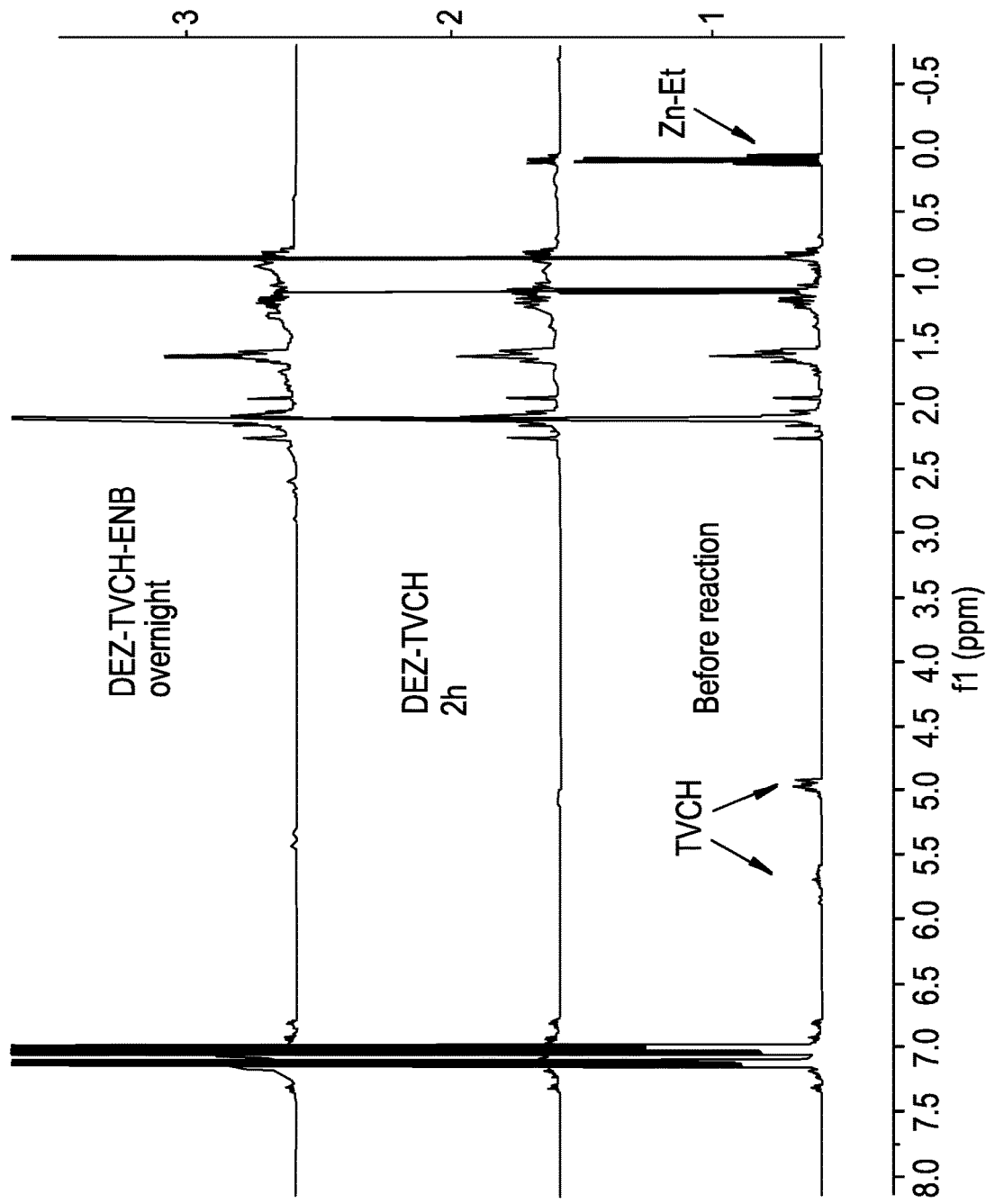
FIG. 5 provides the $^1$H NMR spectra of the composition of Working Example 1.

TVCH (0.19 ml, 0.97 mmol), DEZ (0.2 ml, 1.94 mmol) and Co-catalyst A (0.48 ml of 0.0644 M solution, 0.03 mmol) are added to toluene (7 ml) in a 20 ml glass vial under nitrogen atmosphere. A sample is taken for $^1$H NMR in C6D6, as seen in the "before reaction" spectrum in FIG. 5. Catalyst (A2) (10 mg dissolved in 2 ml toluene, 0.02 mmol) is added and the mixture is stirred at room temperature to form a first solution. After 2 hours, the reaction is completed as indicated by the disappearance of the vinyl peaks on $^1$H NMR as seen in the "2 h" spectrum of FIG. 5. The ZnEt peak is reduced but still present. ENB (0.234 g, 1.94 mmol) is added and the mixture is stirred overnight to form a final solution containing the composition of Working Example 1. As seen in the "overnight" spectrum of FIG. 5, $^1$H NMR shows all the remaining ZnEt and all the ENB are consumed. The final solution has a [Zn] of 0.22 M. Accordingly, $^1$H NMR analysis shows that the synthesis reaction proceeded as intended. All the remaining ZnEt is replaced by ENB. The process for preparing the composition of Working Example 1 is illustrated below in exemplary, non-limiting Scheme 9.

Scheme 9.

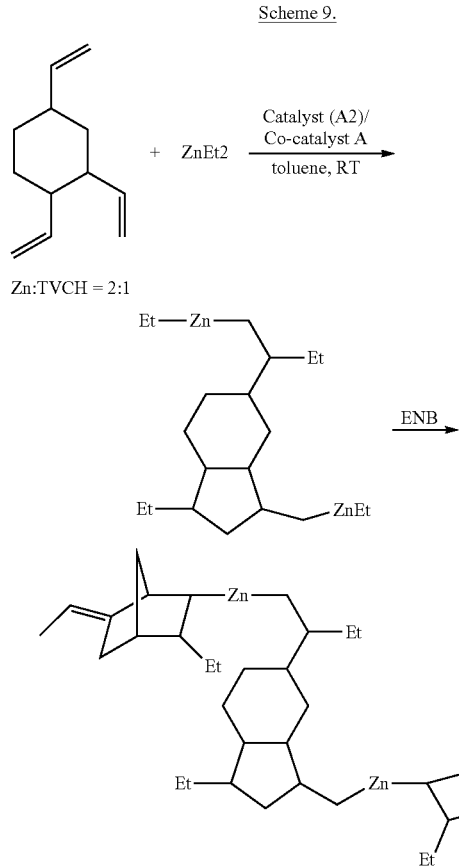

Zn:TVCH = 2:1

YY structure (i.e., the derivative of the TVCH linking group) at m/z=222. There are multiple small peaks at m/z of 164-166, presumably belonging to the oxidized capping group due to incomplete hydrolysis. Accordingly, the GCMS results indicate that the desired capped structure is obtained.

Ethylene Polymerization with the composition of Working Example 1: To validate the dual-headed composition of Working Example 1, ethylene polymerization is performed using the composition in a polymerization setup in a glovebox via the reactions illustrated in exemplary, non-limiting Scheme 10. ISOPAR™ E (10 ml) and Co-Catalyst A (0.0039 mmol) are added to a 40 ml glass vial equipped with a stirbar in the drybox. The vial is capped with a septum lined lid and connected to an ethylene line via a needle. Another needle is inserted on the lid to let ethylene slowly purge the vial for 2 min. The vial is placed in a heating block at 100° C. The final solution of Working Example 1 (2 ml, 0.44 mmol) and Catalyst (A2) (0.003 mmol) are injected, and the purge needle is removed to maintain a total pressure at 10 psig. The reaction is maintained for 30 min. After polymerization, 0.5 ml of deuterated methanol (MeOD) is added to quench the reaction. The mixture is moved out of the drybox and poured into a large amount of MeOH. The precipitated polymer is filtered, dried under vacuum at RT overnight then at 70° C. for 3 hr. 0.42 g of white polyethylene is obtained. The process for ethylene polymerization is shown below in exemplary, non-limiting Scheme 10.

Scheme 10.

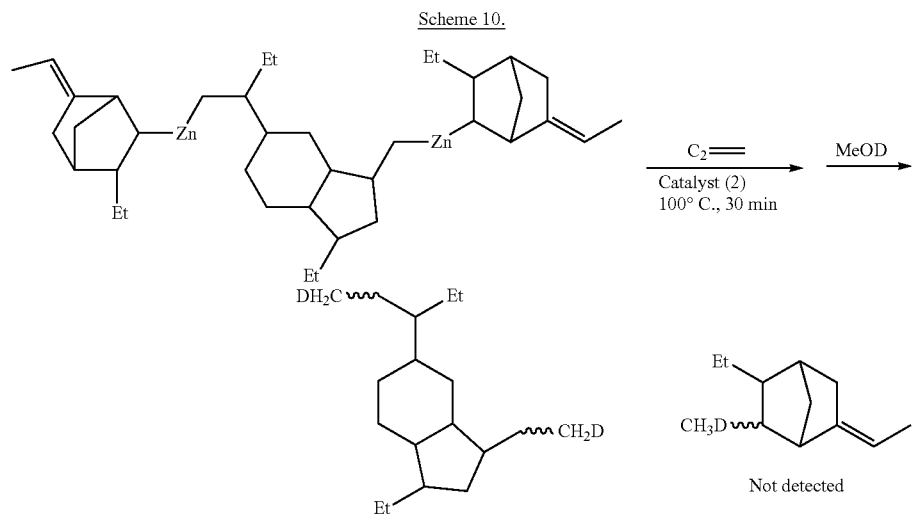

Figure 8:
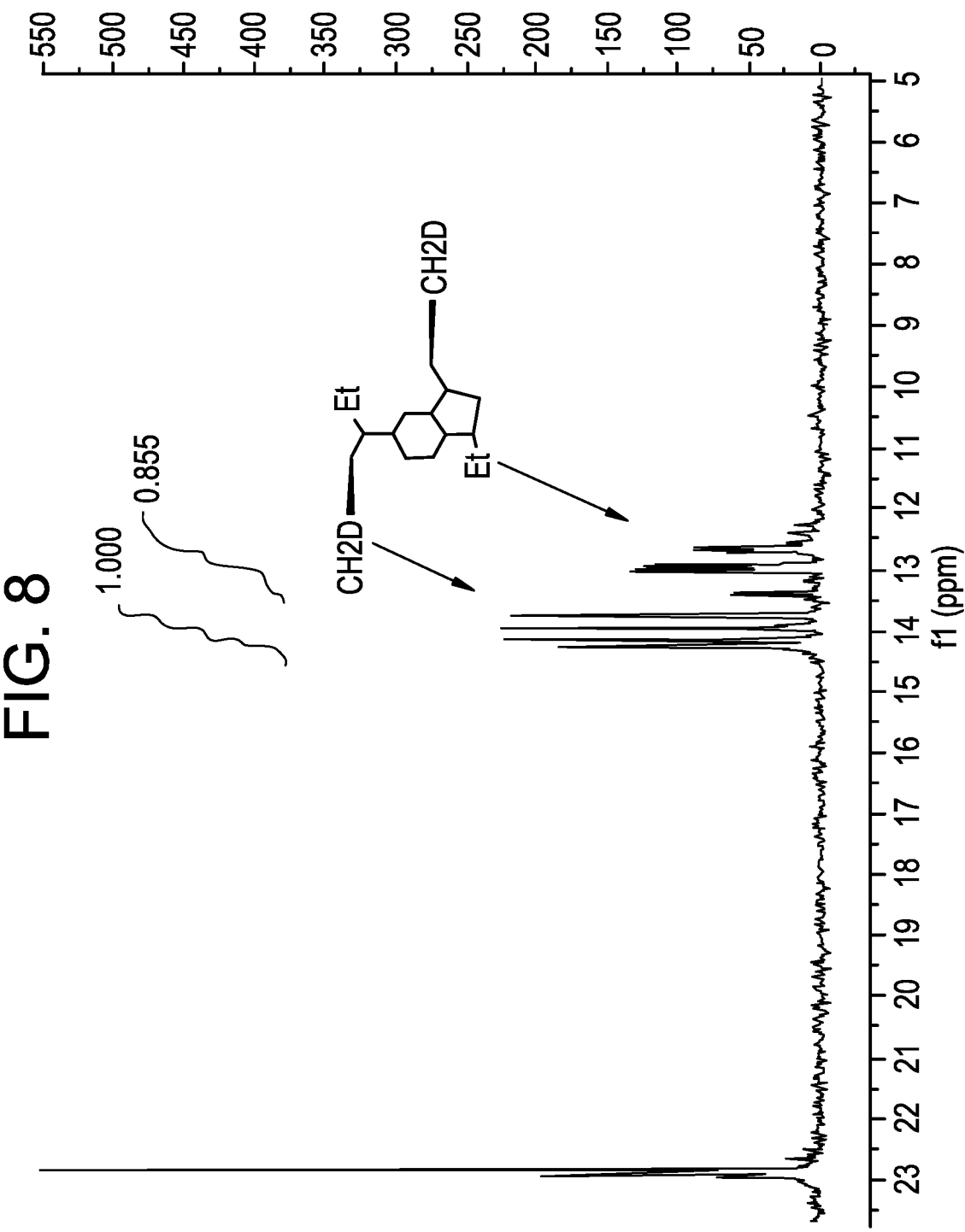
FIG. 8 provides the $^{13}$C NMR spectra of deuterium labeled polyethylene polymerized in the presence of the composition of Working Example 1.

The intended structure of the dual-headed composition of Working Example 1 is confirmed via GCMS analysis. As seen in FIG. 6, GCMS of a hydrolyzed sample of the first solution confirms the formation of the expected, uncapped TVCH-based composition at m/z=222 and the presence of some half converted TVCH. As seen in FIG. 7, GCMS of a hydrolyzed sample of the final solution confirms the formation of the expected capping group at m/z=150 and the core The main objective of ethylene polymerization is to verify that the polymer chain would selectively grow from the core YY structure (i.e., the derivative of the TVCH linking group) and would not grow from the capping groups. This is proven by $^{13}$C NMR analysis (FIG. 8), as no ENB end group is found in the polymer. An ENB group would have two distinct methyl peaks at ca. 14.0 and 14.5 ppm and four double bond peaks at 110-112 ppm and 146-148 ppm. None of these peaks are detected. FIG. 8 shows the peaks in the methyl region. The four sharp peaks at 13.7-14.3 ppm are the chain end methyl groups. The smaller peak on the left (14.25 ppm) is the unlabeled $CH_3$ group, and the three peaks on the right (13.7-14.2 ppm) are D-labelled $CH_2D$ groups. Apparently, the deuterated methanol quench did not result in complete labelling. The broader peaks at 12-13 ppm belong to the $CH_3$ from the ethyl branches on the core YY structure (i.e., the derivative of the TVCH linking group). The integration of the peaks confirms the presence of roughly equal amounts of Et branches and the chain end methyl groups, i.e., Et:$(CH_3+CH_2D)\approx1$. This result confirms that polymer quantitatively grows from the core YY structure (i.e., the derivative of the TVCH linking group) of the dual-headed composition. The absence of methyl peaks at 16 ppm and 19 ppm excludes the possibility that the detected Et branches were from a dead composition fragment that did not grow polymer.

Figure 9:
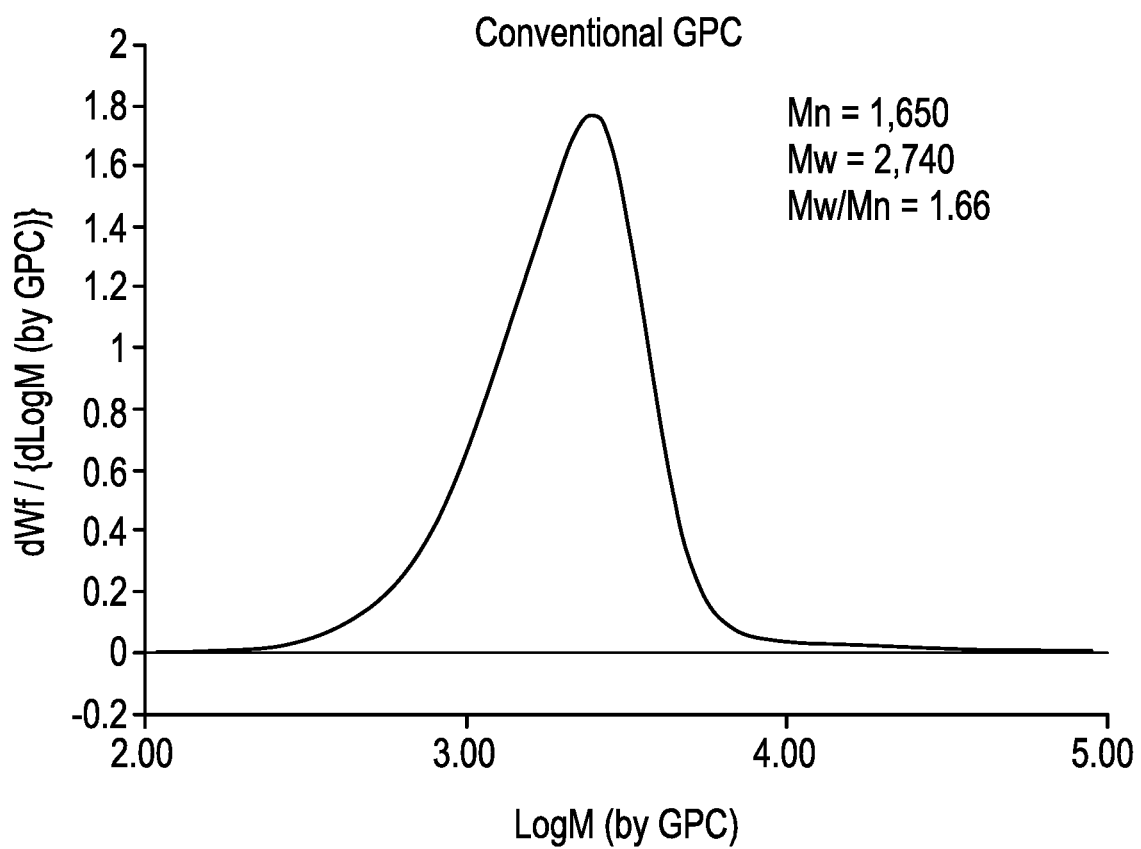
FIG. 9 provides the GPC curve of polyethylene polymerized in the presence of the composition of Working Example 1.

In addition, the molecular weights of the polymer are measured by GPC, as seen in FIG. 9. The Mn value is reasonably close to the theoretical Mn value of 1900 based on the polymer yield and dosage of dual-headed composition, suggesting that the dual-headed composition is fully utilized for chain transfer reaction. The very narrow molecular weight distribution also supports that only one type of polymer chains are produced. The molecular weight distribution would be broader if polymer also grew from the capping group. Accordingly, the narrow molecular weight distribution further confirms the presence of only one type of polymer chain grown from the core YY structure (i.e., the derivative of the TVCH linking group).

Furthermore, the one-pot nature of the process of the present disclosure is validated, as the final solution is directly used in subsequent polymerization without any isolation, purification, or separation requirements.

Working Example 2

Figure 10:
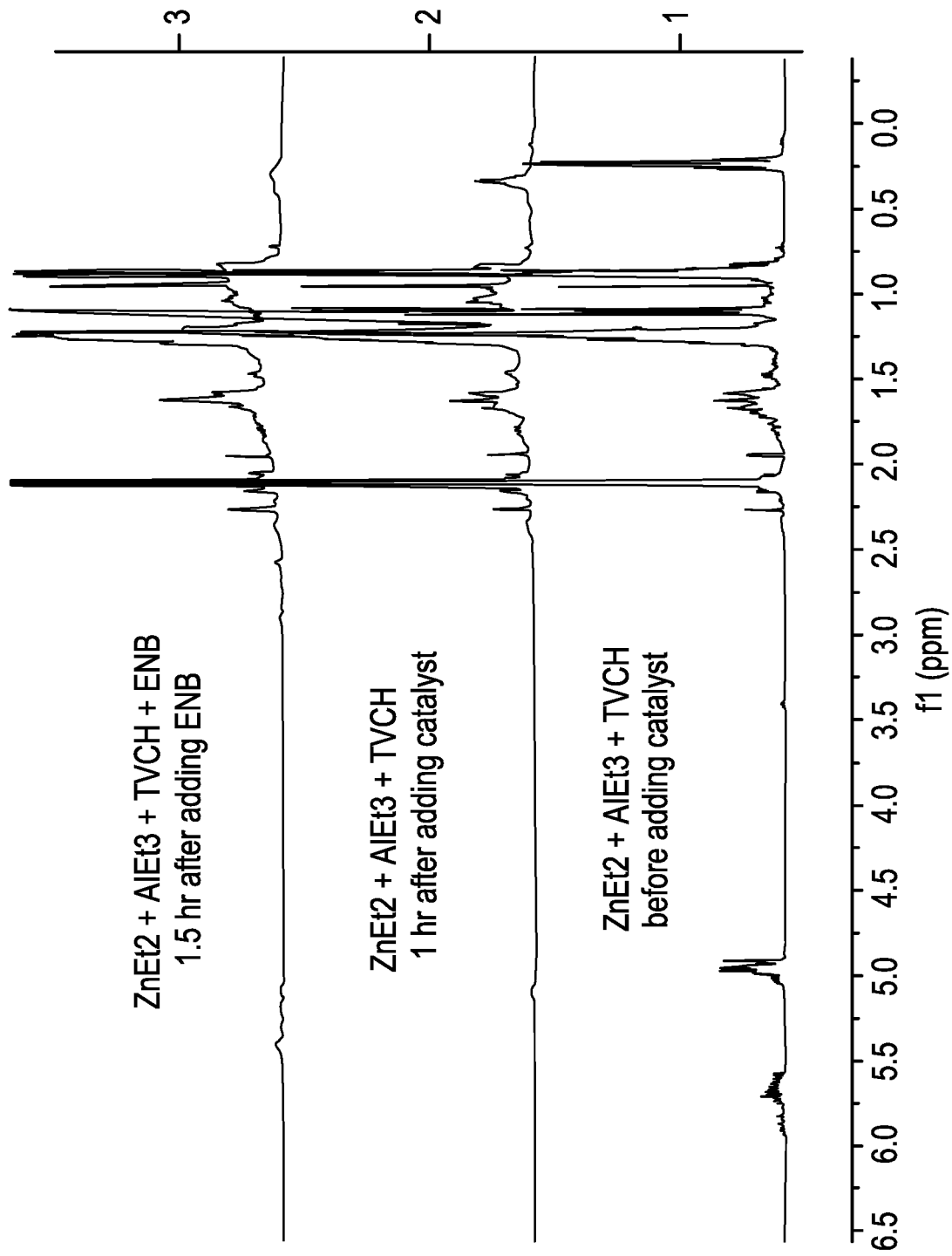
FIG. 10 provides the $^1$H NMR spectra of the composition of Working Example 2.

In a glovebox under nitrogen atmosphere, TVCH (0.47 ml, 2.53 mmol), DEZ (0.1 ml, 0.97 mmol), TEA (1.94 ml, 1.94 mmol) and Co-catalyst A (0.362 ml of 0.0644 M solution in methylcyclohexane, 0.023 mmol) are mixed in 6 ml of toluene. A sample is taken for $^1H$ NMR in C6D6, as seen in the "before adding catalyst" spectrum in FIG. 10. Catalyst (A2) (10 mg, 0.02 mmol) is dissolved in 1 ml of toluene and added to the mixture to initiate the reaction to form a first solution. After 1 hr, 1,2,4-trivinylcyclohexane is all reacted as evidenced by the disappearance of vinyl peaks (4.9-5.8 ppm), but some metal-Et remains (ca. 0.3 ppm), as shown in the "1 hr after adding catalyst" spectrum of FIG. 10. The first solution is brownish and clear, showing no sign of gel formation. ENB (0.327 g, 2.72 mmol) is added to form a final solution containing the composition of Working Example 2. After another 1.5 hrs, samples are taken for $^1H$ NMR showing that metal-Et is completely consumed and a small new peak at 5.4 ppm attributed to the tri-substituted double bond from ENB, as seen in the "1.5 hrs after adding ENB" spectrum of FIG. 10. The process of preparing the composition of Working Example 2 is illustrated below in exemplary, non-limiting Scheme 11. Accordingly, $^1H$ NMR analysis shows that the synthesis reactions proceeded as intended.

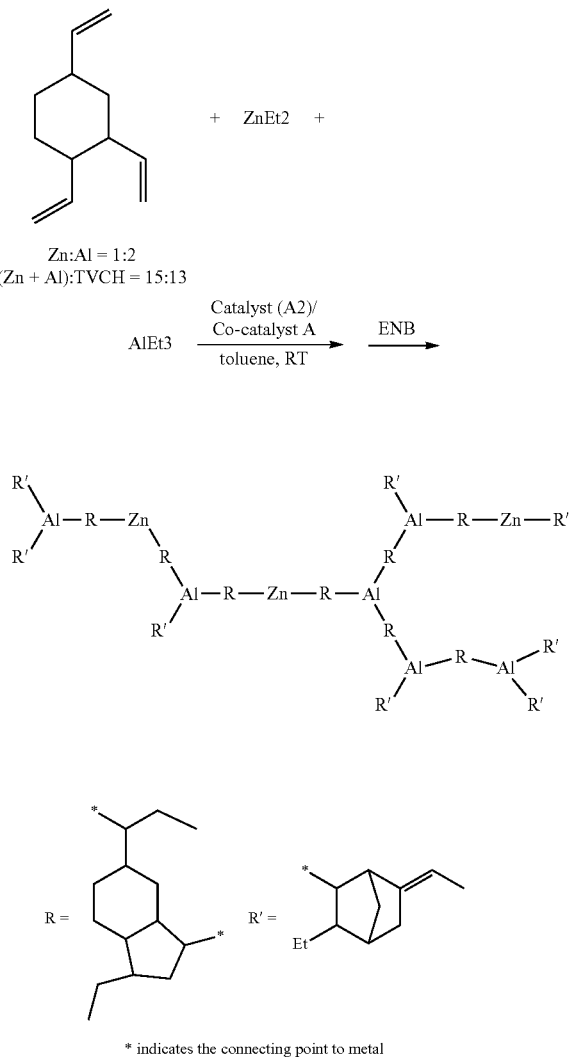

Figure 11:
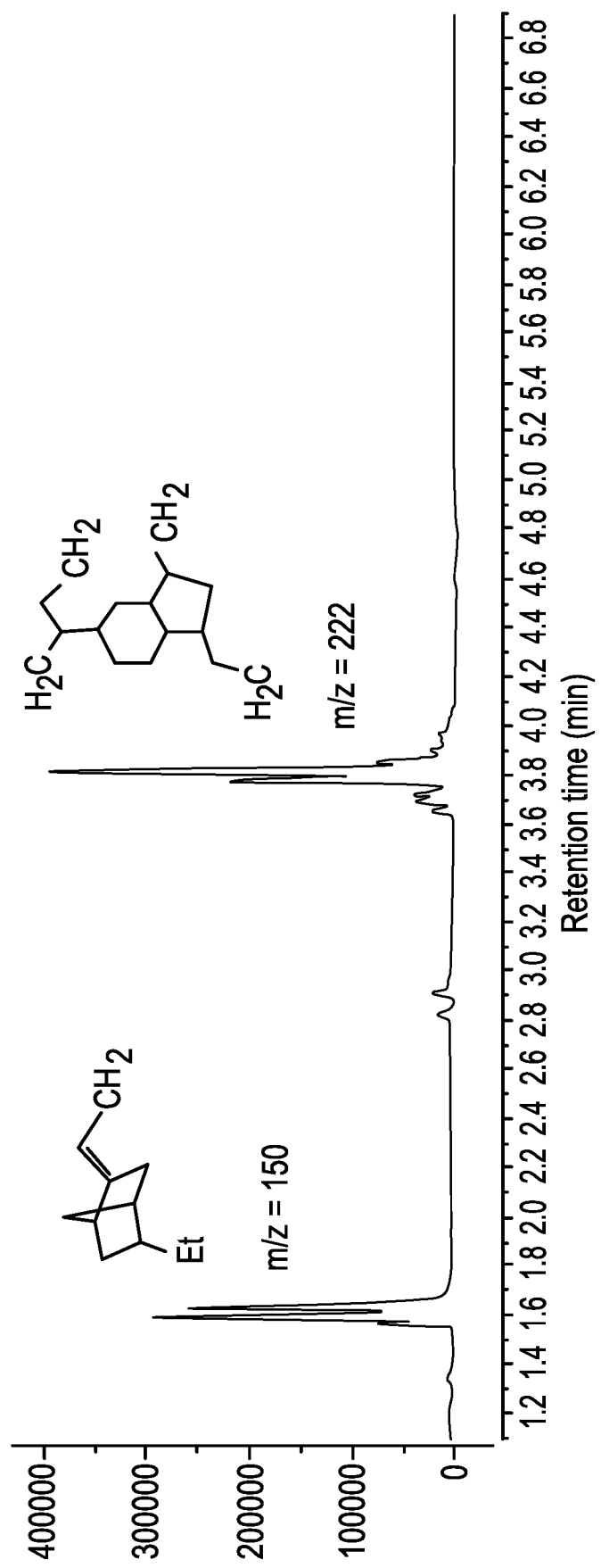
FIG. 11 provides the GCMS of the composition of Working Example 2.

Furthermore, an aliquot of the final solution is quenched by water and analyzed by GCMS (FIG. 11), showing a major group of peaks at m/z=150 and a clean single peak at 222, consistent to the expected hydrolyzed norbornyl capping group and the core YY structure (i.e., the derivative of the TVCH linking group).

Working Example 3

In a glovebox protected under nitrogen atmosphere, 1,9-decadiene (4.66 ml, 25.3 mmol), DEZ (3.0 nil, 29.1 mmol) and Co-catalyst A (1.81 ml, 0.12 mmol) are mixed in 80 ml toluene in a 200 ml flask equipped with a magnetic stirbar; catalyst (A2) (47 mg in 10 ml toluene, 0.097 mmol) is added to initiate the reaction and to form a first solution. After 2 hr, norbornene (1.46 g, 15.5 mmol) is added to the first solution and stirred at RT overnight to form a final solution containing the composition of Working Example 3. The process for preparing the composition of Working Example 3 (including a hydrolysis step at the end) is illustrated below in exemplary, non-limiting Scheme 12.

Scheme 12.

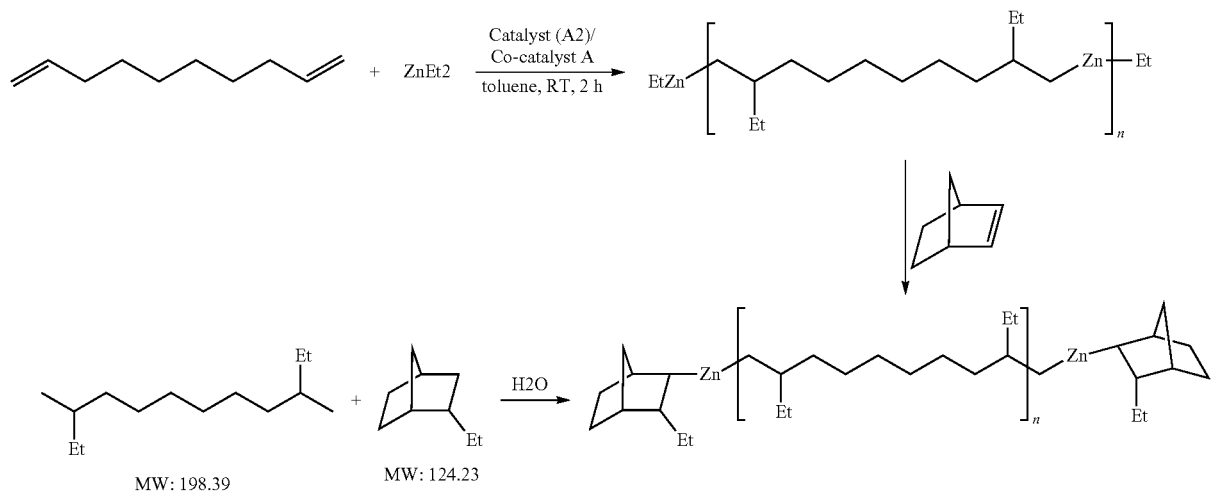

Figure 12:
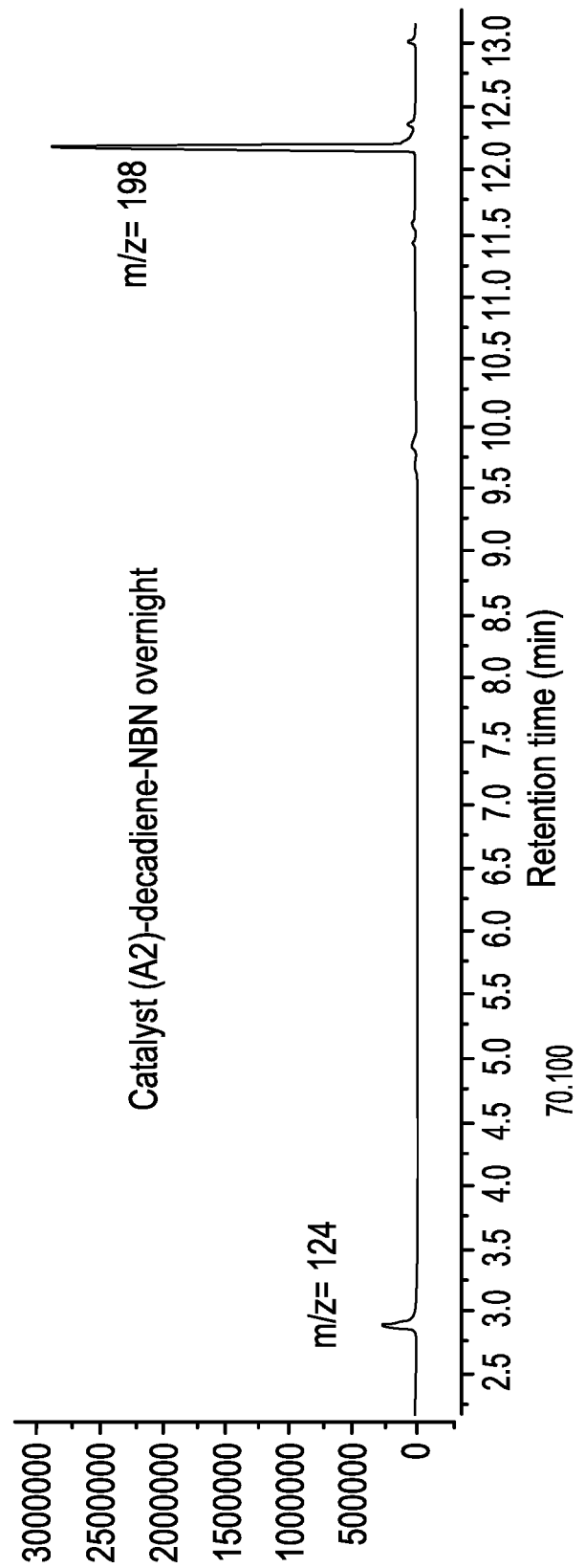
FIG. 12 provides the GCMS of the composition of Working Example 3.

A sample of the final solution is hydrolyzed with water/HCl. As seen in FIG. 12, GCMS shows a small peak at m/z=124 corresponding to the expected capping group in addition to the major peak at m/z=198 corresponding to the core YY structure (i.e., the derivative of the decadiene linking group). Accordingly, GCMS analysis confirms the formation of the intended capped composition.

Working Example 4

Figure 13:
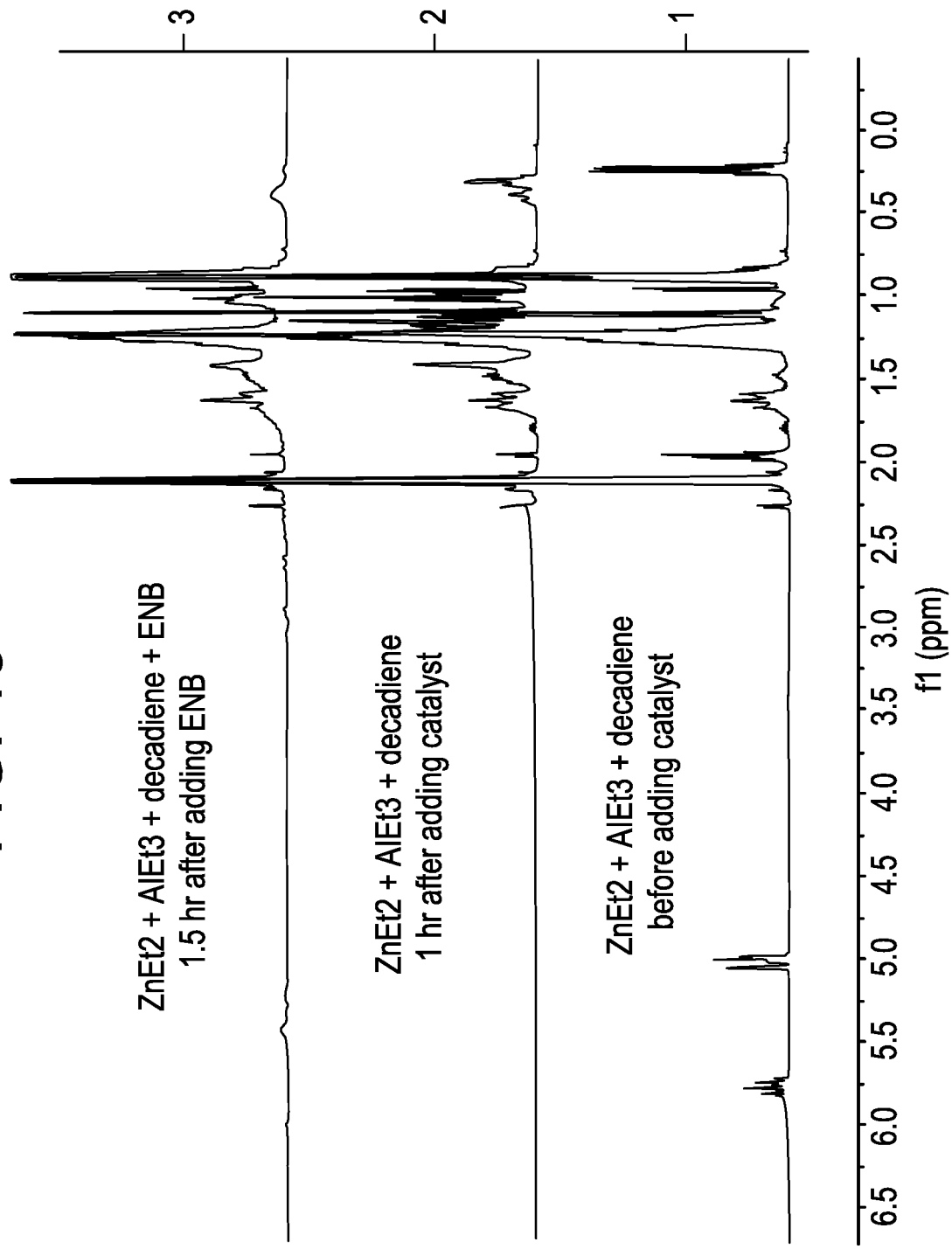
FIG. 13 provides the $^1$H NMR spectra of the composition of Working Example 4.

In a glovebox under nitrogen atmosphere, 1,9-decadiene (0.47 ml, 2.53 mmol), DEZ (0.1 ml, 0.97 mmol), TEA (1.94 ml, 1.94 mmol) and Co-catalyst A (0.362 ml of 0.0644 M solution in methylcyclohexane, 0.023 mmol) are mixed in 6 ml of toluene. A sample is taken for $^1$H NMR in C6D6, as seen in the "before adding catalyst" spectrum in FIG. 13. Catalyst (A2) (10 mg, 0.02 mmol) is dissolved in 1 ml of toluene and added to the mixture to initiate the reaction and to form a first solution. After 1 hr, decadiene is all reacted as evidenced by the disappearance of vinyl peaks (4.9-5.8 ppm) with some M-Et remaining (ca. 0.3 ppm), as shown in the "1 hr after adding catalyst" $^1$H NMR spectrum of FIG. 13. The first solution is brownish and clear showing no sign of gel formation. ENB (0.327 g, 2.72 mmol) is added to form a final solution containing the composition of Working Example 4. After another 1.5 h, samples are taken for $^1$H NMR showing that M-Et is completely consumed, and a small new peak at 5.4 ppm attributed to the trisubstituted double bond from ENB, as seen in the "1.5 hr after adding ENB" spectrum of FIG. 13. The process for preparing the composition of Working Example 4 is illustrated below in exemplary, non-limiting Scheme 13.

Scheme 13.

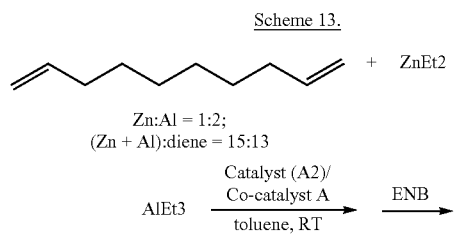

Zn:Al = 1:2;
(Zn + Al):diene = 15:13

-continued

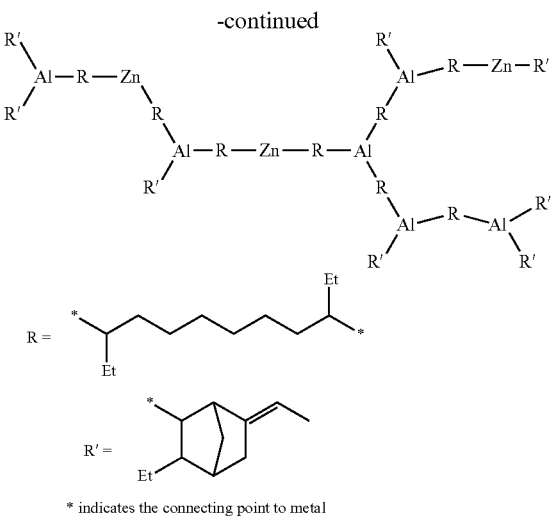

* indicates the connecting point to metal

Figure 14:
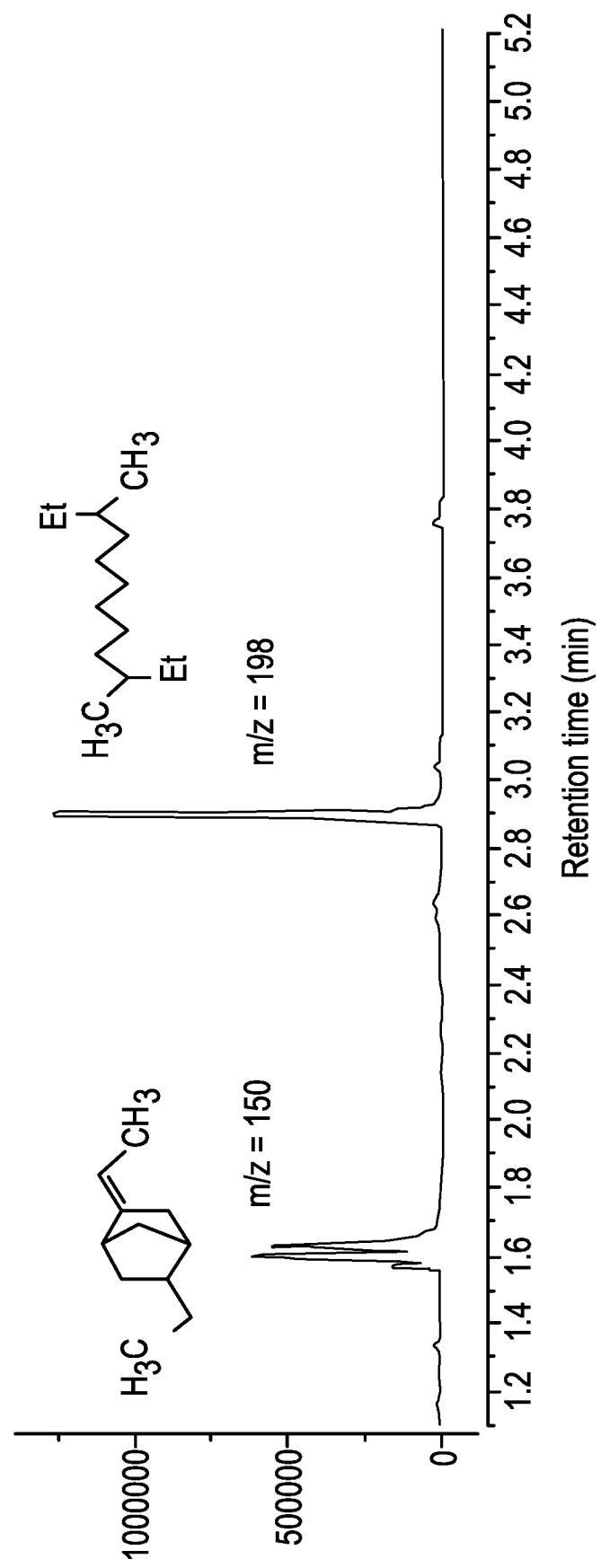
FIG. 14 provides the GCMS of the composition of Working Example 4.

An aliquot of the final solution is quenched with water and analyzed by GCMS, as seen in FIG. 14. As seen in FIG. 14, GCMS shows a major group of peaks at m/z=150 and a clean single peak at 198, consistent to the expected hydrolyzed norbornyl capped group and the core YY structure (i.e., the derivative of the decadiene linking group).

Ethylene Polymerization with the composition of Working Example 4: To validate the composition of Working Example 4, ethylene polymerization is performed using the composition in a polymerization setup in a glovebox via the reactions illustrated in exemplary, non-limiting Scheme 14. ISOPAR™ E(10 ml), and Co-catalyst A (0.0026 mmol) are added to a 40 ml glass vial equipped with a stirbar in the drybox. The vial is capped with a septum lined lid and connected to an ethylene line via a needle. Another needle is inserted on the lid to let ethylene slowly purge the vial for 2 min. The vial is placed in a heating block at 100° C. The final solution of Working Example 4 (1 ml, 0.3 mmol) and Catalyst (A2) (0.002 mmol) are injected, and the purge needle is removed to maintain a total pressure at 10 psig. The reaction is maintained for 30 min. After polymerization, 0.5 ml of deuterated methanol (MeOD) is added to quench the reaction. The mixture is moved out of the drybox and poured into a large amount of MeOH. The precipitated polymer is filtered, dried under vacuum at RT overnight then at 70° C. for 3 hr. 0.68 g white polyethylene is obtained. Such a procedure is demonstrated below in exemplary, non-limiting Scheme 14.

mmol), DEZ (20 wt % in toluene, 1.7 liter, 2.5 mmol) and Co-catalyst A (0.0699M in methylcyclohexane, 231 ml, 16.2 mmol) are added to 2000 ml of toluene in a 6 liter three-neck flask equipped with a mechanic agitator and cooling jacket. Catalyst (A2) (4.1 g in 216 ml toluene, 6.9 mmol) is added over a period of 20 minutes to maintain the temperature

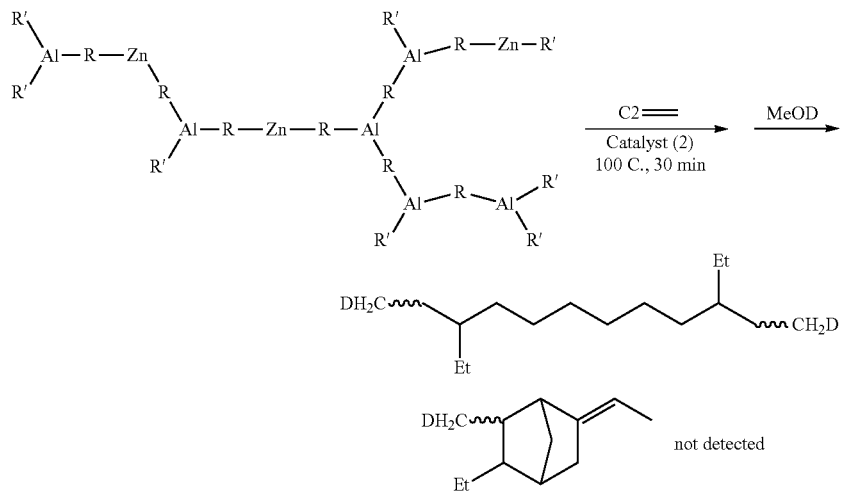

Scheme 14.

Figure 15:
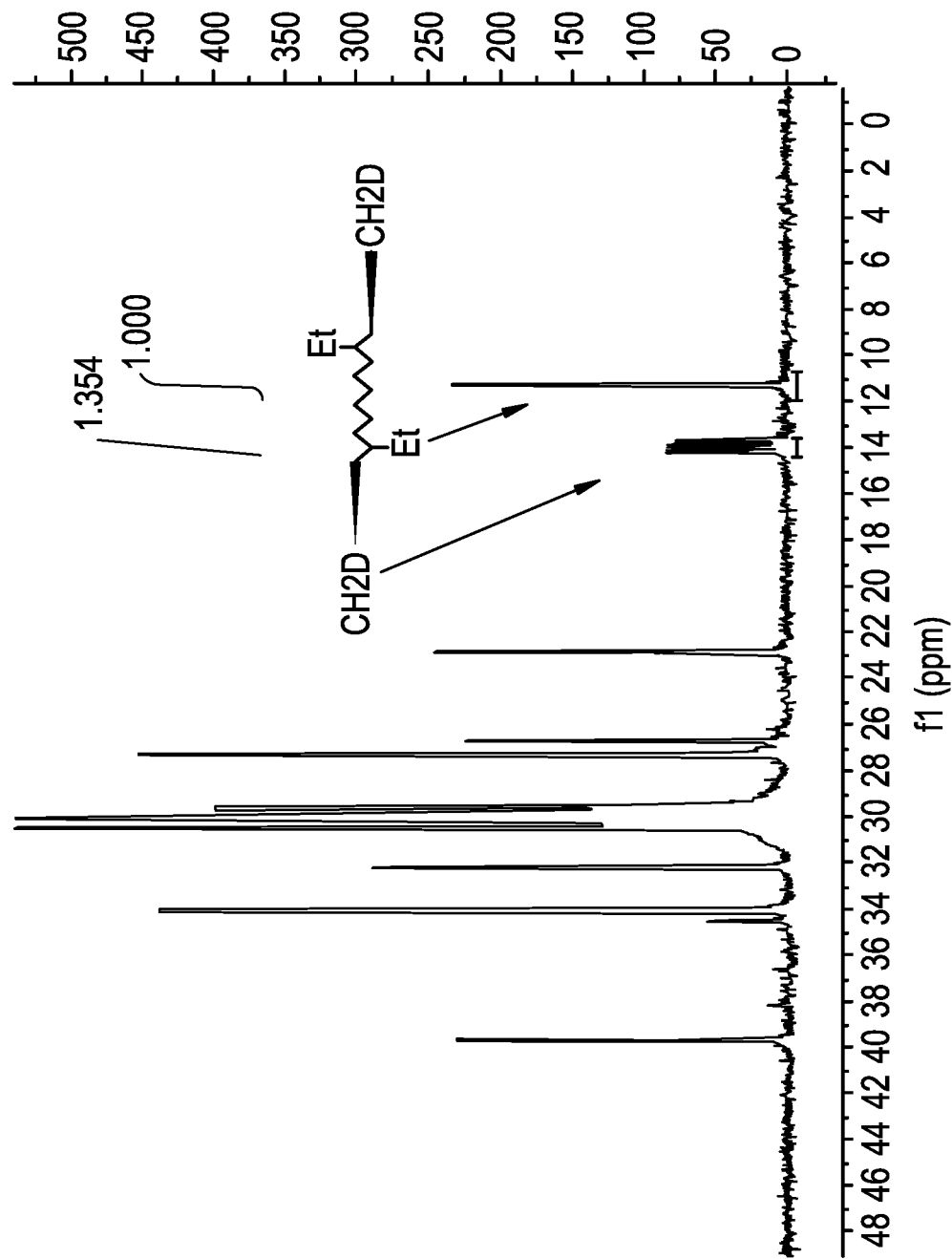
FIG. 15 provides the $^{13}$C NMR spectra of deuterium labeled polyethylene polymerized in the presence of the composition of Working Example 4.

The main objective of ethylene polymerization is to verify that the polymer chain would selectively grow from the core YY structure (i.e., the derivative of the decadiene linking group) and would not grow from the capping groups. This is proven by $^{13}C$ NMR analysis (FIG. 15). As seen in FIG. 15, $^{13}C$ NMR analysis of the polymer shows the ethyl groups from the composition core YY structure as well as the labeled and some unlabelled chain ends due to incomplete quenching. The capping ENB groups are not detected, indicating that polymer did not grow from the capping groups. The result confirms the effective and selective transfer of polymer chains to the core YY structure of the composition resulting in chain growth in the dual headed fashion.

Figure 16:
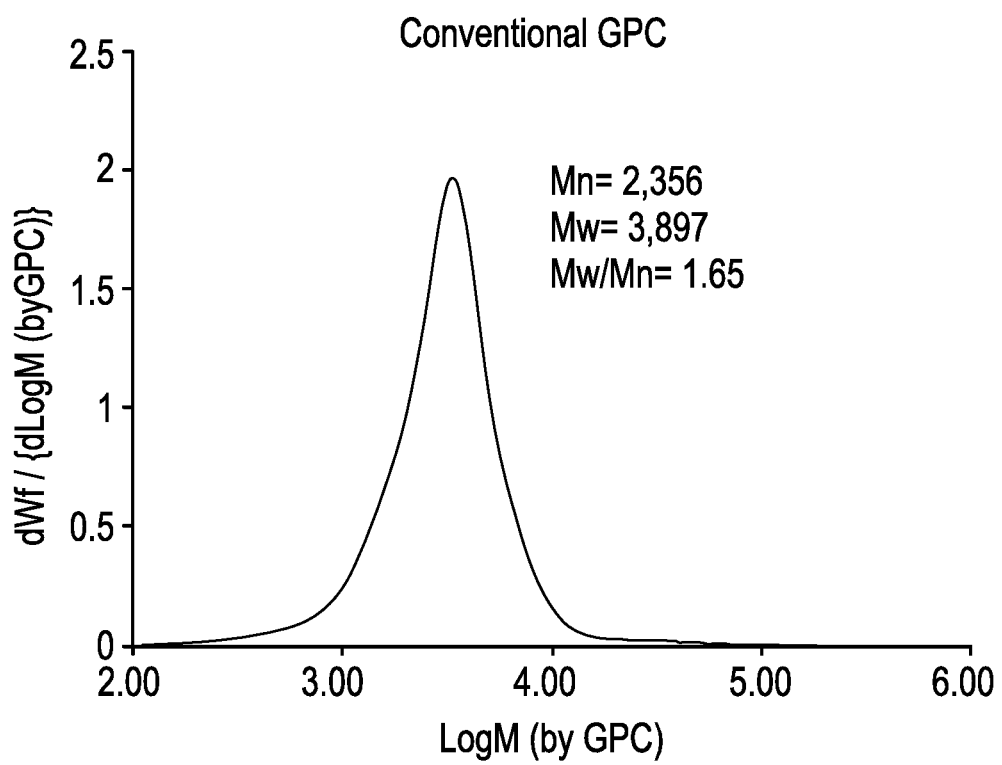
FIG. 16 provides the GPC curve of polyethylene polymerized in the presence of the composition of Working Example 4.

The GPC curve and molecular weights are shown in FIG. 16. The narrow molecular weight distribution further confirms the presence of only one type of polymer chain. A broader MWD would have been obtained had the polymer chains grew from both the core YY structure and the capping groups.

Furthermore, the one-pot nature of the process of the present disclosure is validated, as the final solution is directly used in subsequent polymerization without any isolation, purification, or separation requirements.

Working Example 5

"Composition 1" (an exemplary, non-limiting composition having the . . . formula (I)) is synthesized as follows: In a glovebox under nitrogen atmosphere, TVCH (404 ml, 2.08 under 50° C. Samples are taken periodically for $^1H$ NMR and GCMS to monitor the progress of the reaction. After 6 hours, ENB (112 ml, 0.833 mol) is added and the reaction is stirred overnight. Additional toluene is added to make the total volume 5000 ml. The final solution has a zinc concentration of 0.5 M.

Figure 17:
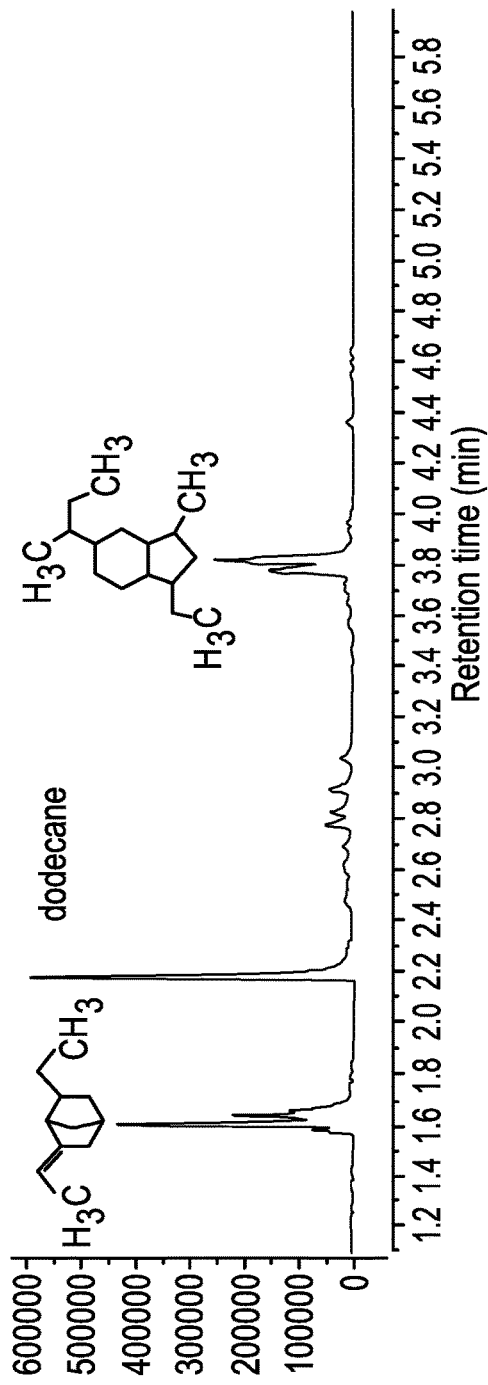
FIG. 17 provides the GCMS of the composition of Working Example 5 before silica treatment.

The final solution of Composition 1 as prepared above has a light brown color, which indicates the presence of the catalyst precursor, Catalyst (A2). A small amount of dodecane is added to 20 ml of the final solution of Composition 1, and a GCMS chromatogram is taken for reference after hydrolysis, as seen in FIG. 17.

Figure 18:
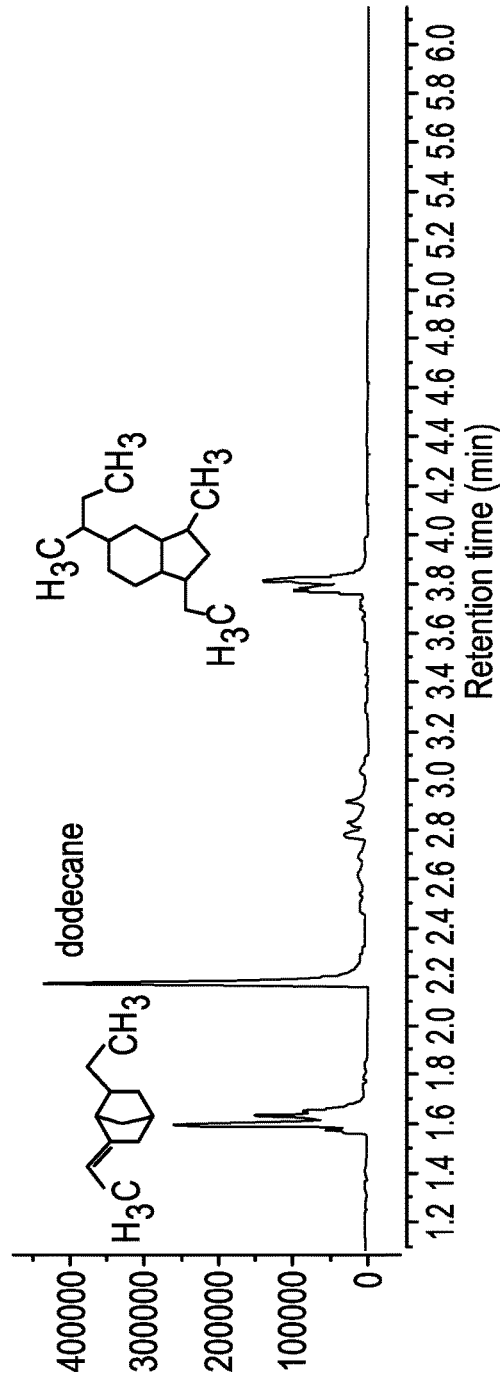
FIG. 18 provides the GCMS of the composition of Working Example 5 after silica treatment.

Subsequently, the final solution of Composition 1 is passed through a plug of silica ES757-875; the solution becomes colorless after filtration, thereby indicating that the catalyst is removed. A GCMS chromatogram of the filtered final solution is taken after hydrolysis, as seen in FIG. 18. By comparing the GCMS chromatograms of before and after silica treatment (i.e., by comparing FIGS. 17 and 18), the same amounts of the capping and core YY structures of Composition 1 are seen relative to the dodecane peak, thereby indicating no loss of Composition 1 by the silica treatment.

Batch Reactor Polymerization with Composition 1: The final solutions of Composition 1 both before and after silica treatment are tested in ethylene-propylene polymerization to confirm the removal of the active catalyst. The results are shown in Table 1 below. MMAO-3A is added as a scavenger at 7.5 micromol, 100° C., 10 min, and 150 psig.

TABLE 1

| Run | Catalyst (A2) (moles) | Composition 1 (mmoles) | Silica Treatment | Ethylene (g) | Propylene (g) | Yield (g) | Mn | Mw | Mw/Mn | Mol % C3 |
|---|---|---|---|---|---|---|---|---|---|---|
| 1 | 0.75 | 0 | — | 25 | 103 | 35 | 161,921 | 403,560 | 2.49 | — |
| 2 | 0 | 3 | No | 25 | 103 | 29 | 10,758 | 18,994 | 1.77 | 16.0 |

TABLE 1-continued

| Run | Catalyst (A2) (moles) | Composition 1 (mmoles) | Silica Treatment | Ethylene (g) | Propylene (g) | Yield (g) | Mn | Mw | Mw/Mn | Mol % C3 |
|---|---|---|---|---|---|---|---|---|---|---|
| 3 | 0 | 3 | Yes | 22 | 103 | Trace | — | — | — | — |
| 4 | 0.75 | 3 | Yes | 21 | 104 | 15 | 7,189 | 17,824 | 2.48 | 15.0 |

As seen in Table 1, Run 1 (the control run) is made with Catalyst (A2) but without Composition 1. Run 2 is made with Composition 1 without silica treatment and without additional Catalyst (A2); 29 grams of polymer with lower molecular weight than that of the control run is produced. Run 3 is made by the silica treated Composition 1 without additional Catalyst (A2); no polymer is produced, thereby confirming the successful removal of active catalyst from the final solution of Composition 1. Run 4 is made by the silica treated Composition 1 with additional Catalyst (A2); 15 grams of polymer is collected with low molecular weight relative to the polymer made by the untreated Composition 1, thereby confirming that the silica treated Composition 1 is consistent with the behavior expected for a chain shuttling agent.

Working Example 6

"Composition 1" is synthesized as described above in Working Example 5.

"Composition 2" (another exemplary, non-limiting composition having the formula (I)) is synthesized as follows: The same procedure is used as the synthesis of Composition 1, except that MMAO-3A ("Cocat-2") is added in addition to Co-catalyst A ("Cocat-1"). Thus, in the glovebox under nitrogen atmosphere, TVCH (404 ml, 2.08 mmol), MMAO-3A (1.68 M in heptanes, 248 ml, 0.416 mol), DEZ (20 wt % in toluene, 1.7 liter, 2.5 mmol) and Co-catalyst A (0.0699M in methylcyclohexane, 231 ml, 16.2 mmol) are added to 2000 ml of toluene in a 6 liter three-neck flask equipped with a mechanic agitator and cooling jacket. Catalyst (A2) (8 g in 336 ml toluene, 13.4 mmol) is added over a period of 20 minutes to maintain the temperature under 50° C. Samples are taken periodically for $^1$H NMR and GCMS to monitor the progress of the reaction. After 6 hours, ENB (168 ml, 1.24 mol) is added, and the reaction is stirred overnight. Additional toluene is added to make the total volume 5000 ml. The final solution has a zinc concentration of 0.5 M.

Figure 19:
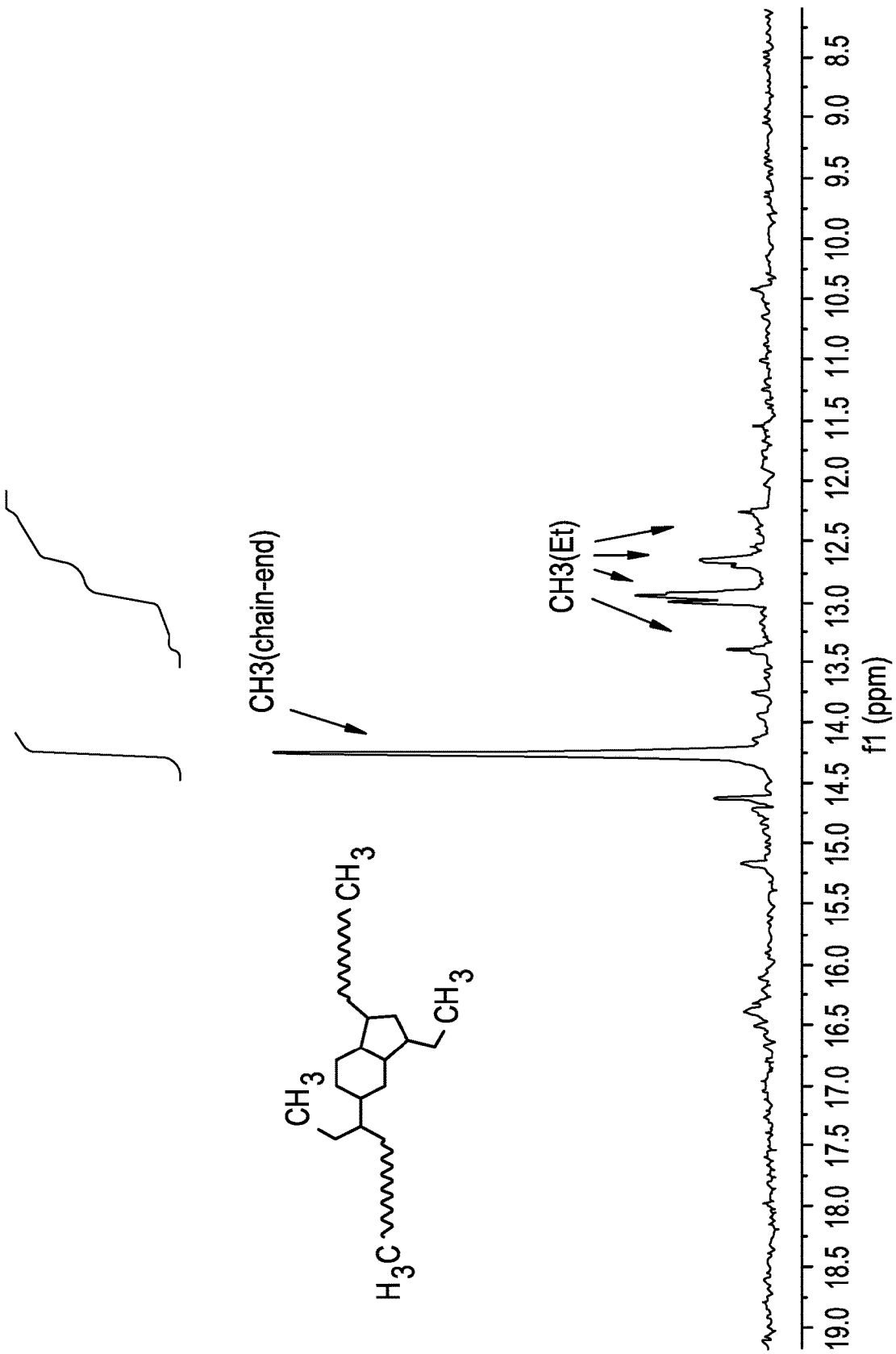
FIG. 19 provides the $^{13}$C NMR spectra of the polymer produced with regard to Working Example 6.
Figure 20:
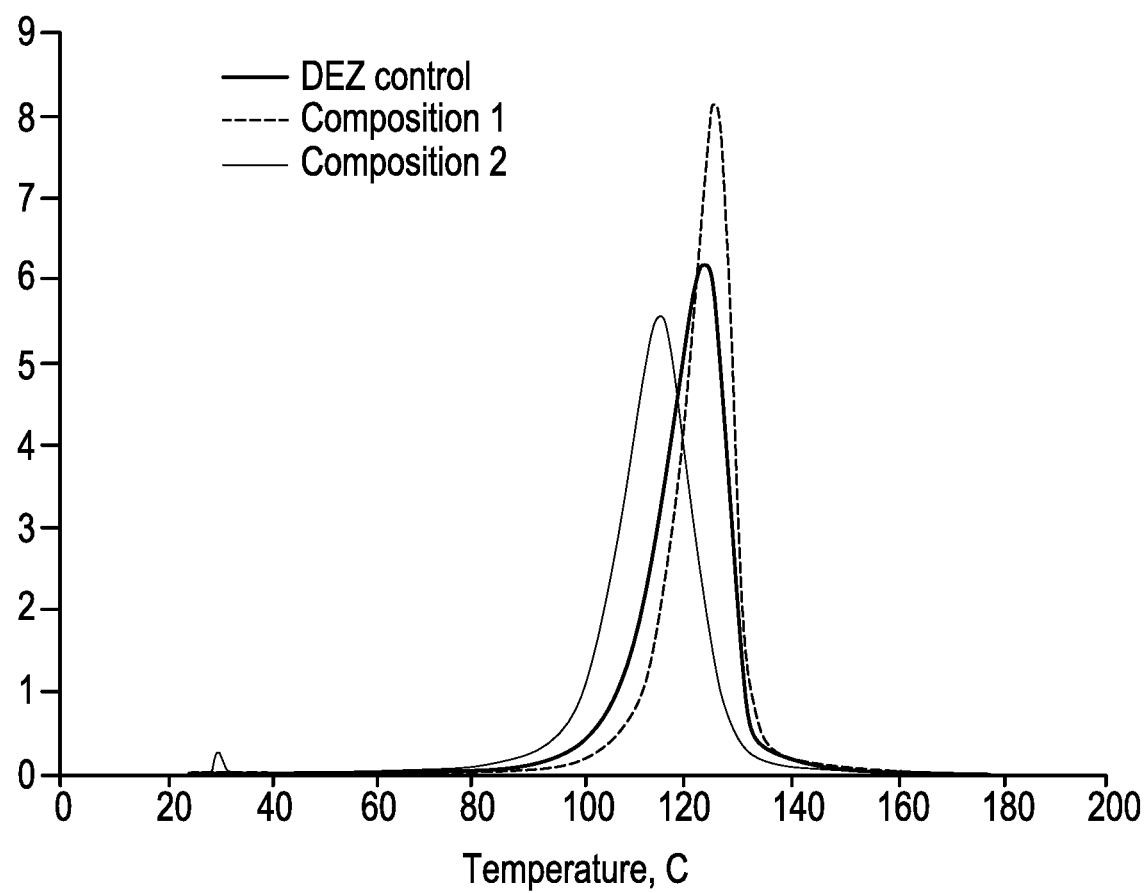
FIG. 20 provide the TGIC curve of the polymer produced with regard to Working Example 6.

Continuous solution polymerizations are carried out in a computer controlled autoclave reactor equipped with an internal stirrer. Purified mixed alkanes solvent (Isopar™ E available from ExxonMobil), ethylene, propylene, and molecular weight regulator (hydrogen or chain transfer agent) are supplied to a 3.8 L reactor equipped with a jacket for temperature control. The solvent feed to the reactor is measured by a mass-flow controller. A variable speed diaphragm pump controls the solvent flow rate and pressure to the reactor. At the discharge of the pump, a side stream is taken to provide flush flows for the catalyst, cocatalyst and CSA injection lines. These flows are measured by Micro-Motion mass flow meters and controlled by control valves. The remaining solvent is combined with ethylene, propylene and hydrogen and fed to the reactor. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is liquid full at 500 psig with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. The process conditions and results are listed in Tables 2 and 3. Selected polymer properties are provided in Table 4. A $^{13}$C NMR spectrum of a selected product is shown in FIG. 19. The TGIC curves of selected products are shown in FIG. 20.

TABLE 2

| Run | MW regulator | Solvent, lbs/hr | C2, lbs/hr | C3, kg/hr | H2, sccm | C2 conversion, % | Production rate, lbs/hr | Reactor Control Temperature, C. | Catalyst concentration, ppm |
|---|---|---|---|---|---|---|---|---|---|
| 1 | H2 | 51.68 | 4.13 | 2.18 | 1599 | 91.4 | 3.77 | 102.2 | 60.8 |
| 2 | H2 | 50.4 | 4.12 | 1.69 | 719 | 90.7 | 3.74 | 103.3 | 60.8 |
| 3 | H2 | 48.8 | 4.13 | 1.3 | 184 | 89.9 | 3.72 | 109.9 | 60.8 |
| 4 | H2 | 49.6 | 4.13 | 1.17 | 199 | 91.5 | 3.78 | 109.7 | 60.8 |
| 5 | DEZ | 50.9 | 4.12 | 2.11 | 0.43 | 90.5 | 3.81 | 103.6 | 60.8 |
| 6 | DEZ | 52.05 | 4.11 | 2.63 | 0.40 | 91 | 3.85 | 102.3 | 60.8 |
| 7 | Comp. 2 | 52.94 | 4.13 | 2.87 | 0.49 | 89.5 | 4.84 | 101.2 | 60.8 |
| 8 | Comp. 2 | 54.11 | 4.12 | 4.31 | 0.56 | 89.40 | 6.27 | 105.1 | 60.8 |
| 9 | Comp. 2 | 55.34 | 4.12 | 4.95 | 0.45 | 89.6 | 6.88 | 105.0 | 60.8 |
| 10 | Comp. 1 | 43.34 | 3.09 | 4.65 | 0.45 | 90.6 | 6.12 | 114.9 | 60.8 |
| 11 | Comp. 1 | 41.18 | 3.48 | 2.40 | 0.45 | 92.6 | 4.31 | 105.0 | 60.8 |
| 12 | Comp. 1 | 41.25 | 3.47 | 3.20 | 0.47 | 90.2 | 5.05 | 105.3 | 60.8 |

TABLE 3

| Run | Catalyst flow, lbs/hr | Cocat-1 concentration, ppm | Cocat-1 flow, lbs/hr | Cocat-2 concentration, ppm | Cocat-2 flow, lbs/hr | Comp. ½ concentration, ppm | Comp. ½ flow, lbs/hr | Catalyst eff. MM-lb/lb |
|---|---|---|---|---|---|---|---|---|
| 1 | 0.199 | 215.0 | 0.450 | 20.0 | 0.460 | | | 0.31 |
| 2 | 0.189 | 215.0 | 0.429 | 20.0 | 0.430 | | | 0.32 |
| 3 | 0.164 | 215.0 | 0.373 | 20.0 | 0.379 | | | 0.37 |
| 4 | 0.153 | 215.0 | 0.347 | 20.0 | 0.350 | | | 0.41 |
| 5 | 0.219 | 215.0 | 0.496 | 99.6 | 0.204 | 32699 | 0.397 | 0.29 |
| 6 | 0.258 | 461.0 | 0.271 | 99.6 | 0.238 | 32699 | 0.463 | 0.25 |
| 7 | 0.431 | 461.0 | 0.453 | 99.6 | 0.395 | 32699 | 0.649 | 0.19 |
| 8 | 0.348 | 461.0 | 0.371 | 99.6 | 0.318 | 32699 | 0.740 | 0.30 |
| 9 | 0.509 | 461.0 | 0.543 | 99.6 | 0.467 | 32699 | 1.000 | 0.22 |
| 10 | 0.609 | 461.0 | 0.644 | 99.6 | 0.550 | 32699 | 0.688 | 0.17 |
| 11 | 0.535 | 461.0 | 0.568 | 99.6 | 0.490 | 32699 | 0.693 | 0.13 |
| 12 | 0.469 | 461.0 | 0.501 | 99.6 | 0.430 | 32699 | 0.693 | 0.18 |

TABLE 4

| Run | MW regulator | Product Density [g/cc] | Mooney, MU | Melt Index, I2 | Brookfield Viscosity, cP | Zn in polymer, ppm | Mn | Mw | Mw/Mn | Tm, C. | Tc, C. | Hf, J/g | P wt % |
|---|---|---|---|---|---|---|---|---|---|---|---|---|---|
| 1 | H2 | 0.909 | | | 16346 | | 8,534 | 20,910 | 2.45 | 94.0, 81.2 | 79.4 | 112.4 | |
| 2 | H2 | 0.912 | | 17.3 | 379359 | | 20,834 | 51,178 | 2.46 | 100.3 | 85.5 | 106.3 | |
| 3 | H2 | 0.911 | 37.45 | | | | 55,508 | 143,374 | 2.58 | 104.6 | 92.9 | 104.6 | |
| 4 | H2 | 0.914 | 49.2 | | | | 62,884 | 166,923 | 2.65 | 106.8 | 95.3 | 106.4 | |
| 5 | DEZ | 0.916 | | | 76750 | | 13,085 | 27,646 | 2.11 | 98.9, 87.8 | 85.4 | 114.1 | 11.5 |
| 6 | DEZ | 0.909 | | | 24943 | 2710 | 10,323 | 20,696 | 2.00 | 96.2, 84.2 | 82.8 | 111.8 | 12.5 |
| 7 | Comp. 2 | 0.915 | | 40.7 | | 4670 | 16,482 | 38,652 | 2.35 | 94.8 | 80.5 | 96.2 | 12.9 |
| 8 | Comp. 2 | 0.906 | | | 190631 | 4900 | 14,567 | 34,533 | 2.37 | 83.2 | 68.9 | 80.4 | 17.1 |
| 9 | Comp. 2 | 0.906 | | | 95102 | 7060 | 10,433 | 24,469 | 2.35 | 80.2 | 67.6 | 83.1 | 18.2 |
| 10 | Comp. 1 | 0.890 | | | 64402 | 5830 | 11,170 | 26,171 | 2.34 | 64.1, 44.1 | 55.1 | 63.9 | 22.8 |
| 11 | Comp. 1 | 0.890 | | | 30404 | 5610 | 10,351 | 23,172 | 2.24 | 65, 44.6 | 57.8 | 66 | 23.2 |
| 12 | Comp. 1 | 0.911 | | | 65703 | 5367 | 12,742 | 29,065 | 2.28 | 85.7, 74.0 | 70.9 | 88.1 | 16.9 |

As seen in Table 3, the results showed that the Compositions 1 and 2 of Working Example 6 are effective chain transfer agents to produce polymer with desired the molecular weights. The $^{13}$C NMR analysis confirmed the presence of core YY group (i.e., the derivative of a linking group) in the polymer. The ratio of the chain end methyl groups to the ethyl groups from the core structure is approximately one, suggesting that there is one "core" structure fragment in each polymer chain.

Furthermore, the one-pot nature of the process of the present disclosure is validated, as the final solution is directly used in subsequent polymerization without any isolation, purification, or separation requirements.

What is claimed is:

1. A composition having the formula (I):

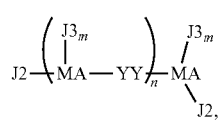

(I)

wherein:
each MA independently is Al, B, Ga, Zn, or Mg;
when MA is Al, B, or Ga, then m is 1;
when MA is Zn or Mg, then m is 0;
n is a number from 1 to 100;
YY is a derivative of a linking group, wherein the linking group is a $C_{4\text{-}100}$ hydrocarbon comprising at least two vinyl groups and optionally includes at least one heteroatom; and
each J2 and J3 is a derivative of a strained olefin.

2. The composition of claim 1 having the following structural formulae:

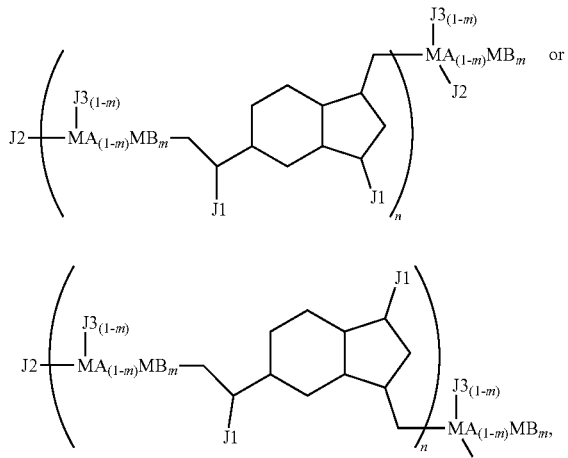

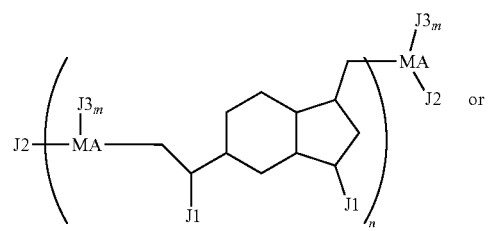

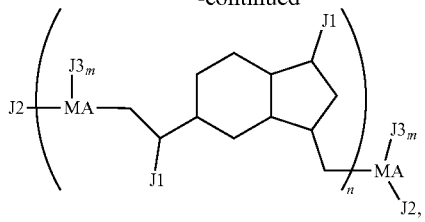

wherein J1 is hydrogen or a $C_{1-20}$ alkyl group.

3. The composition of claim 1, wherein each J2 and J3 is selected from the group consisting of the following structural formulae:

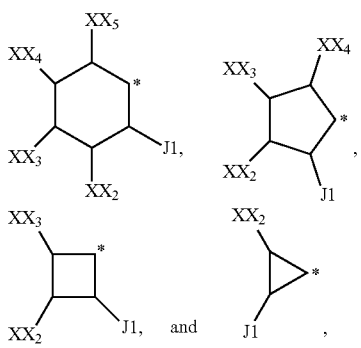

wherein:
J1 is hydrogen or a $C_{1-20}$ alkyl group; and
each XX2, XX3, XX4, and XX5 is hydrogen, a substituted or unsubstituted $C_{1-20}$ alkyl group, or a substituted or unsubstituted $C_{6-20}$ aryl group,
wherein XX2, XX3, XX4, and XX5 may be the same or different,
wherein each XX2, XX3, XX4, and XX5 optionally includes at least one heteroatom, and
wherein two of XX2, XX3, XX4, and XX5 may optionally form cyclic structures.

4. The composition of claim 1, wherein each J2 and J3 is selected from the group consisting of the following structural formulae:

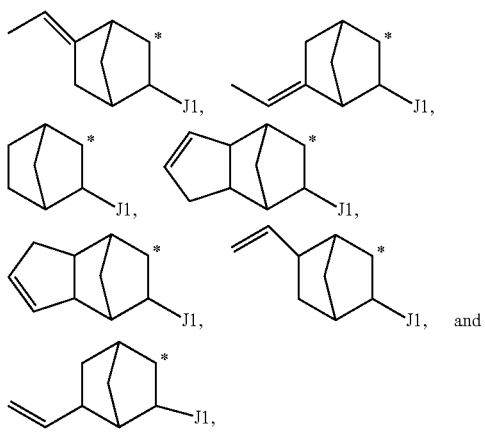

wherein J1 is hydrogen or a $C_{1-20}$ alkyl group.

5. The composition of claim 1 having the following structural formula:

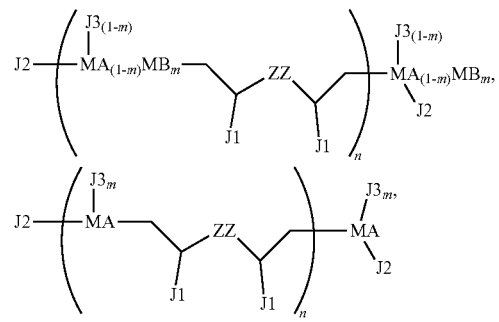

wherein:
J1 is hydrogen or a $C_{1-20}$ alkyl group; and
ZZ is a linear or branched $C_{4-100}$ hydrocarbyl group that optionally includes at least one heteroatom, and wherein ZZ may be aliphatic or aromatic.

6. The composition of claim 5, wherein YY is a derivative of an alpha,omega-diene.

7. The composition of claim 5, wherein each J2 and J3 is selected from the group consisting of the following structural formulae:

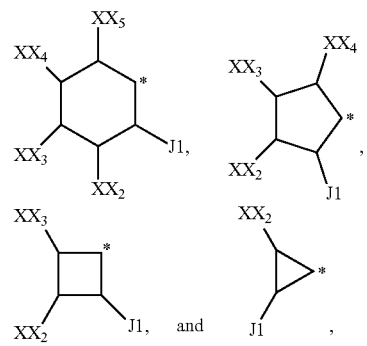

wherein:
J1 is hydrogen or a $C_{1-20}$ alkyl group; and
each XX2, XX3, XX4, and XX5 is hydrogen, a substituted or unsubstituted $C_{1-20}$ alkyl group, or a substituted or unsubstituted $C_{6-20}$ aryl group,
wherein XX2, XX3, XX4, and XX5 may be the same or different,
wherein each XX2, XX3, XX4, and XX5 optionally includes at least one heteroatom, and
wherein two of XX2, XX3, XX4, and XX5 may optionally form cyclic structures.

8. The composition of claim 5, wherein each J2 and J3 is selected from the group consisting of the following structural formulae:

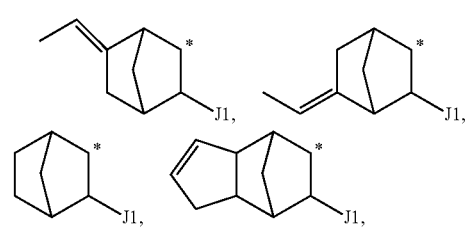

-continued

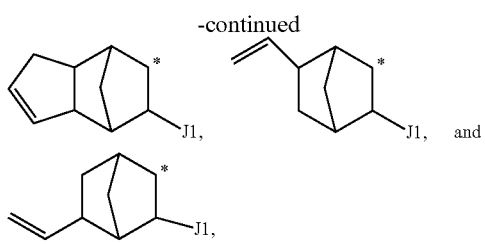

wherein J1 is hydrogen or a $C_{1-20}$ alkyl group.

9. A process for preparing the composition having the formula (I):

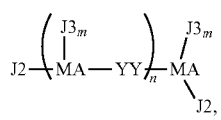  (I)

wherein:
each MA independently is Al, B, Ga, Zn, or Mg;
when MA is Al, B, or Ga, then m is 1;
when MA is ZN or Mg, then m is 0;
n is a number from 1 to 100;
YY is a derivative of a linking group, wherein the linking group is a $C_{4-100}$ hydrocarbon comprising at least two vinyl groups and optionally includes at least one heteroatom; and
each J2 and J3 is a derivative of a strained olefin, the process comprising:
(a) combining a linking group, an organometallic compound, a co-catalyst, a solvent, a first catalyst precursor, and a strained olefin, and (b) obtaining a final solution comprising the composition having the formula (I), wherein the linking group is a $C_{4-100}$ hydrocarbon comprising at least two vinyl groups and optionally includes at least one heteroatom.

10. The process of claim 9, wherein the linking group is 1,2,4-trivinylcyclohexane and the strained olefin is selected from the group consisting of the following structural formulae:

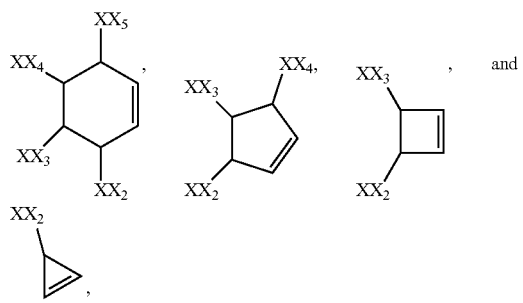

wherein:
each XX2, XX3, XX4, and XX5 is hydrogen, a substituted or unsubstituted $C_{1-20}$ alkyl group, or a substituted or unsubstituted $C_{6-20}$ aryl group,
wherein XX2, XX3, XX4, and XX5 may be the same or different,
wherein each XX2, XX3, XX4, and XX5 optionally includes at least one heteroatom, and
wherein two of XX2, XX3, XX4, and XX5 may optionally form cyclic structures.

11. The process of claim 9, wherein the strained olefin is selected from the group consisting of the following structural formulae:

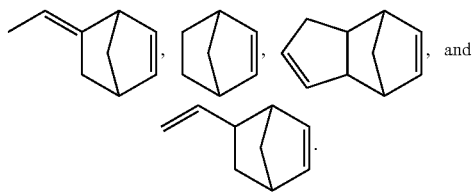

12. The process of claim 9, wherein the linking group is an alpha,omega-diene and the strained olefin is selected from the group consisting of:

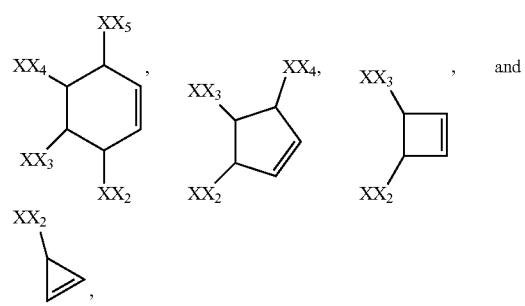

wherein:
each XX2, XX3, XX4, and XX5 is hydrogen, a substituted or unsubstituted $C_{1-20}$ alkyl group, or a substituted or unsubstituted $C_{6-20}$ aryl group,
wherein XX2, XX3, XX4, and XX5 may be the same or different,
wherein each XX2, XX3, XX4, and XX5 optionally includes at least one heteroatom, and
wherein two of XX2, XX3, XX4, and XX5 may optionally form cyclic structures.

13. The process of claim 12, wherein the strained olefin is selected from the group consisting of:

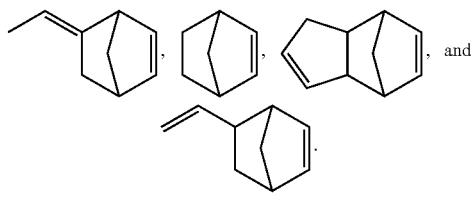

14. The process of claim 9, wherein the organometallic compound comprises a trivalent metal, a divalent metal, or a mixture of a trivalent metal and a divalent metal.

15. A polymerization process for preparing a polymer composition, the process comprising:
contacting at least one olefin monomer with a catalyst composition; wherein
the catalyst composition comprises the reaction product of a second catalyst precursor, a co-catalyst, and the composition of claim 1.

16. A polymerization process for preparing a polymer composition, the process comprising:

contacting at least one olefin monomer with a catalyst composition; wherein the catalyst composition comprises the reaction product of a second catalyst precursor, a co-catalyst, and the composition prepared according to the process of claim 9.

17. A polymerization process for preparing a polymer composition, the process comprising:

contacting at least one olefin monomer with a catalyst composition;

wherein the catalyst composition comprises the reaction product of a second catalyst precursor, a co-catalyst, and the composition prepared by the process of claim 9, and wherein the second catalyst precursor is the same compound as the first catalyst precursor.

18. A polymer composition obtained by the process of claim 15.

19. A catalyst composition comprising the reaction product of at least one catalyst precursor, at least one co-catalyst, and the composition of claim 1.

20. A process for preparing a telechelic functional polymer comprising performing functional group conversion reactions at carbon-metal bonds of the composition of claim 1.

* * * * *